(12) United States Patent
Pepper et al.

(10) Patent No.: US 12,539,378 B2
(45) Date of Patent: Feb. 3, 2026

(54) NASAL DEVICES

(71) Applicant: ASAP BreatheAssist Pty Ltd, Cremorne (AU)

(72) Inventors: Elizabeth Jane Pepper, Brunswick (AU); Michael Ralph Burgess Johnson, Hawthorn (AU); Justin Robert Armistead, The Basin (AU); Toby James Hartley, Ferntree Gulley (AU)

(73) Assignee: ASAP BREATHEASSIST PTY LTD, Cremorne (AU)

( * ) Notice: Subject to any disclaimer, the term of this patent is extended or adjusted under 35 U.S.C. 154(b) by 896 days.

(21) Appl. No.: 17/423,699

(22) PCT Filed: Jan. 24, 2020

(86) PCT No.: PCT/AU2020/050048
§ 371 (c)(1),
(2) Date: Jul. 16, 2021

(87) PCT Pub. No.: WO2020/150787
PCT Pub. Date: Jul. 30, 2020

(65) Prior Publication Data
US 2022/0080138 A1     Mar. 17, 2022

(30) Foreign Application Priority Data
Jan. 25, 2019 (AU) .............................. 2019900241

(51) Int. Cl.
*A61M 16/00*     (2006.01)
*A61F 5/08*      (2006.01)
(Continued)

(52) U.S. Cl.
CPC ............. *A61M 15/085* (2014.02); *A61F 5/08* (2013.01); *A61K 36/185* (2013.01); *A61K 36/35* (2013.01);
(Continued)

(58) Field of Classification Search
CPC .... A61M 15/08; A61M 15/085; A61M 15/00; A61M 15/0028; A61M 15/0063;
(Continued)

(56) References Cited

U.S. PATENT DOCUMENTS

| 1,077,574 A | 11/1913 | Woodward |
| 1,431,177 A | 10/1922 | Palmer |

(Continued)

FOREIGN PATENT DOCUMENTS

| AT | 412444 B | 3/2005 |
| AU | 2013204827 A1 | 2/2014 |

(Continued)

OTHER PUBLICATIONS

Australian Patent Office, International Search Report and Written Opinion issued in corresponding Application No. PCT/AU2020/050048 mailed Apr. 14, 2020.
(Continued)

*Primary Examiner* — Margaret M Luarca
*Assistant Examiner* — Sarah B Lederer
(74) *Attorney, Agent, or Firm* — Stites & Harbison, PLLC; Mandy Wilson Decker

(57) ABSTRACT

A delivery device capable of being mounted or attached outside the nose to a nasal device, wherein said delivery device is adapted to deliver, spread or emit inhalable compositions or substances such as inhalable fumes from said delivery device to the nasal passages of the nose so as to be inhaled by the user, such as during respiration, when in use.

(Continued)

Nasal devices such as nasal dilator devices comprising same, and cases for storing and housing same.

19 Claims, 35 Drawing Sheets

(51) Int. Cl.
| | |
|---|---|
| *A61K 36/185* | (2006.01) |
| *A61K 36/35* | (2006.01) |
| *A61K 36/53* | (2006.01) |
| *A61K 36/534* | (2006.01) |
| *A61K 36/61* | (2006.01) |
| *A61K 36/752* | (2006.01) |
| *A61M 15/08* | (2006.01) |
| *B65D 1/24* | (2006.01) |
| *B65D 25/10* | (2006.01) |

(52) U.S. Cl.
CPC .......... *A61K 36/53* (2013.01); *A61K 36/534* (2013.01); *A61K 36/61* (2013.01); *A61K 36/752* (2013.01); *B65D 1/24* (2013.01); *B65D 25/108* (2013.01); *A61M 2205/123* (2013.01); *A61M 2209/045* (2013.01); *A61M 2209/06* (2013.01)

(58) Field of Classification Search
CPC ............. A61M 15/009; A61M 16/00; A61M 16/0666; A61M 24/02; A61M 16/0683; A61M 2205/123; A61M 2209/045; A61F 5/08; A62B 23/06
See application file for complete search history.

(56) References Cited

U.S. PATENT DOCUMENTS

| | | | |
|---|---|---|---|
| 1,481,581 A | 1/1924 | Woodward | |
| 5,931,852 A | 8/1999 | Brennan | |
| 6,645,172 B1 | 11/2003 | Gueret | |
| 7,837,649 B1 * | 11/2010 | Aboff | .................... A61M 15/08 604/93.01 |
| 8,834,512 B1 | 9/2014 | Brown et al. | |
| 2004/0059368 A1 | 3/2004 | Maryanka | |
| 2004/0237967 A1 | 12/2004 | Davis | |
| 2006/0185677 A1 | 8/2006 | Brown | |
| 2006/0207598 A1 | 9/2006 | Thomas | |
| 2010/0042134 A1 | 2/2010 | Wien | |
| 2011/0118775 A1 | 5/2011 | Brown | |
| 2012/0330345 A1 | 12/2012 | Tasca | |
| 2014/0128904 A1 | 5/2014 | Mezzoli et al. | |
| 2014/0246023 A1 | 9/2014 | Maryanka | |
| 2015/0000675 A1 | 1/2015 | Kallikounis et al. | |

FOREIGN PATENT DOCUMENTS

| | | | |
|---|---|---|---|
| AU | 2013205674 A1 | 2/2014 | |
| DE | 20 2013 000774 U1 | 4/2013 | |
| GB | 165 537 A | 6/1921 | |
| WO | 88/03788 | 6/1988 | |
| WO | 2003/088627 A2 | 10/2003 | |
| WO | 2004/026391 A1 | 4/2004 | |
| WO | 2012/137182 A2 | 10/2012 | |
| WO | 2015/192162 A1 | 12/2015 | |
| WO | 2015/192173 A1 | 12/2015 | |
| WO | WO-2017034862 A1 * | 3/2017 | ............ A61M 15/08 |

OTHER PUBLICATIONS

United States Patent No. RE.35,408 for Nasal Devices, re-issued Dec. 24, 1996.

European Patent Office, Search Report issued in corresponding Application No. EP 20744806, dated Oct. 26, 2022.

* cited by examiner

NASAL DEVICES

TECHNICAL FIELD OF THE INVENTION

The present invention relates to nasal devices, such as nasal dilator devices, for facilitating or enhancing respiration of a user, and particularly to nasal devices that include a delivery device to provide an inhalable substance for inhalation by a user. The present invention also relates to cases and/or containers for storing such nasal dilator devices.

Described embodiments generally relate to nasal devices for facilitating respiration and/or for delivery of agents or compositions such as those containing a medicament and/or fragrance by inhalation during respiration, and to cases for storing and/or recharging or refilling the said devices. Some embodiments relate to an agent delivery device for delivery of inhalable substances or compositions by inhalation through the nose e.g., by inhalation of fumes, vapours, and/or dry or semi-dry compositions from outside the nose during wear of the device. The inhalable compositions may comprise compounds such as fragrances and/or medicaments, and the agent delivery device may be capable of being mounted or attached outside the nose to a nasal device adapted to be fitted within the nose. The agent delivery device may also be rechargeable or refillable with the inhalable compositions. Other embodiments relate to nasal devices to be fitted to the nose to facilitate or improve respiration and/or clear blocked or stuffy nose during sleeping and/or sporting activities and/or for general day-to-day wear. Some embodiments relate to nasal devices including agent delivery mechanisms for delivery of inhalable substances or compositions such as those comprising fragrances and/medicaments (for example, in the form of fumes, vapours, and/or dry or semi-dry compositions) to the nose such as by inhalation of the inhalable substances or compositions through the nose (e.g., by inhalation of fumes) during respiration from a location outside the nose.

BACKGROUND OF THE INVENTION

All references, including any patents or patent applications, cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents forms part of the common general knowledge in the art, in Australia or worldwide.

Some nasal devices such as nasal dilator devices are worn by users to dilate their nasal cavities when sleeping and/or participating in sporting activities to thereby facilitate or improve respiration. However, many nasal devices are uncomfortable to wear and/or become easily dislodged from a user's nose during such activities. For example, a person with rhinitis or nasal congestion who uses such nasal devices e.g., during their sleep, may particularly find existing nasal devices uncomfortable to wear, especially if those nasal device do nothing by way of contributing to alleviating the symptoms of the rhinitis or nasal congestions. Rhinitis and nasal congestion are commonly associated with irritated, runny, blocked and/or stuffy nose, and may be caused due to many different factors such as viral infection and/or bacterial infection and/or allergic reaction and/or inflammation or physical bruising to the nasal passages. For example nasal congestion or nasal irritation is often associated in users who have or are suffering from allergic rhinitis such as seasonal or non-seasonal hay fever and/or non-allergic rhinitis and/or when the user is suffering or having cold or flu symptoms which result in irritated, runny, blocked or stuffy nose such as during the night when the user is asleep and attempts wear the nasal device.

Furthermore, activities that are percussive, such as running, can cause nasal dilator devices to move from their intended position, requiring readjustment by the user. In the field of professional sports, such adjustments are a physical and mental distraction that can negate any benefits of such a device. Similarly, comfort and positioning of nasal devices are important factors during sleeping, especially if the user is suffering from rhinitis and/or nasal congestion, such as associated with irritated, runny, blocked and/or stuffy nose.

Other existing ways to assist in clearing nasal passageways or dilating the nasal passageways or facilitating better respiration include inhaling substances that provide this function. Certain medicaments, such as those associate with aiding or clearing rhinitis and nasal congestion, for example, are typically delivered or administered to a subject by inhalation of the medicament through the nose, either by inhalation of fumes or vapours and/or by inhalation of suspensions of dry or semi-dry compositions.

Any discussion of the background art as outlined above or throughout the specification sections that follow as well as any discussion of documents, acts, materials, devices, articles or the like which has been included in the present specification are not to be taken as an admission that any or all of these matters form part of the prior art base or were widely known or were common general knowledge in the field relevant to the present disclosure as it existed before the priority date of each claim of this application either in Australia or worldwide.

SUMMARY OF THE INVENTION

It is an object of the present invention to provide a new nasal device for facilitating or enhancing respiration of a user having a delivery device for providing an inhalable substance or composition for inhalation by a user that substantially overcomes or at least ameliorates one or more of the disadvantages of the prior art, or at least provides a useful alternative.

According to one aspect, the present invention provides a delivery device for delivery of inhalable substances or compositions capable of being mounted or attached outside the nose to a nasal device, wherein said delivery device for delivery of inhalable substances or compositions is adapted to spread or emit the inhalable substances or compositions e.g., in a form of fumes from said delivery device to the nasal passages of the nose so as to be inhaled by the user by respiration through the nose when in use.

In one embodiment, the delivery device comprises material which is a source material adapted to emit or diffuse an inhalable composition such as a fume emitting material. The source provides a supply or material for emitting or diffusing the inhalable composition. For example, the material adapted to emit or diffuse an inhalable composition, such as fume or vapour emitting material, may be selected from a fluid or liquid or gel or solid or semi-solid composition (e.g., gelatinous compositions) capable of emitting inhalable compositions such as in the form of vapours or fumes or solid or semi-solid suspensions. In one such preferred embodiment, the delivery device is adapted to refill or recharge the source material (such as the fume emitting material) adapted to emit or diffuse an inhalable composition (such as in the form of fume) in said delivery device.

In another embodiment, the delivery device is releasably mountable or attachable outside the nose to a nasal device. In an alternative embodiment, the delivery device is permanently mountable or attachable outside the nose to a nasal device.

In yet another example, the nasal device is at least partially inserted into at least one nostril.

In yet another example, the nasal device attaches to the nose by frictional engagement.

Throughout the specification the term "nasal device" is used. As used herein the term "nasal device" will be understood to include any nasal device which in use is capable of attaching to the nose of the user, including but not limited to nasal devices which, in use, attach to the nose and span the septum of the nose. As used herein a nasal device includes but is not limited to any nasal clip which is capable of attaching to the nose and span the septum of the nose. For example, a nasal device suitable for use in the present invention may be a nasal dilator device. Alternatively or in addition, the nasal device may be attached to the nose by frictional engagement.

Accordingly, in one example according to any aspect or embodiment or example described herein, the nasal device is a device which in use is capable of attaching to the nose of the user and spans the septum of the nose. For example, the nasal device is or comprises a nasal clip which in use attaches to the nose and spans the septum of the nose. In one particularly preferred example, the nasal device according to any, aspect, embodiment or example described herein is a nasal dilator device. According to this example, the nasal dilator device expands or dilates the nostrils of the nose of the user when inserted into the nose.

According to another aspect, the present invention provides a nasal device for facilitating or enhancing respiration of a user, the nasal device comprising: a delivery device for providing an inhalable composition for inhalation by the user, the delivery device comprising a holder for a source of the inhalable composition to be received and/or supported on a frame member of the nasal device such that the source of the inhalable composition, when provided in the holder in use, is located outside of, and adjacent to, at least one nostril of the user, wherein the source is configured to emit or diffuse the inhalable composition for inhalation by the user.

In one embodiment, the holder is provided on one or more frame members of the nasal device and comprises at least one of: a receptacle configured to be filled with the source of the inhalable composition; a substrate, preferably an absorbent substrate, configured to be filled with the source of the inhalable composition; and/or means for mounting or attaching a receptacle or a substrate configured to be filled with the source of the inhalable composition.

In one embodiment, the means for mounting or attaching the receptacle or substrate forms a recess for receiving and accommodating or housing the receptacle or substrate on one or more frame members of the nasal device; and optionally for removably receiving and accommodating or housing the receptacle or substrate. In one example, the receptacle and/or substrate form(s) a cartridge. For example, the cartridge is configured to be re-filled with the source of the inhalable composition. Alternatively, or in addition, the cartridge may be a replaceable cartridge of the inhalable composition such that it may be replaced for example once the source of the inhalable composition is depleted from the cartridge.

In a preferred embodiment, the source of the inhalable composition comprises a liquid, a gel, a solid, or a semisolid material that comprises or contains the inhalable composition and/or which emits or diffuses the inhalable composition when the nasal device is used or worn by the user. In this regard, therefore, the holder of the delivery device is preferably configured to be filled with the source material that comprises or contains the inhalable composition and/or which emits or diffuses the inhalable composition. If the holder comprises an absorbent substrate, that substrate may, for example, be provided in the form of a fibrous or porous member, such as a wick. In a preferred embodiment, the holder may comprise a cartridge, e.g. a replaceable cartridge, of the inhalable composition.

In one embodiment, the nasal device comprises at least one dilation member for dilating a nasal passage of the user. To this end, the dilation member may be configured to be at least partially received or inserted within a nostril of the user. In one particularly preferred example or any aspect, embodiment or example described herein, the nasal device is a nasal dilator device.

In one embodiment, the source of the inhalable composition is releasably mounted on the frame member. In one embodiment, the frame member is arranged such that the source of the inhalable composition is mounted to extend proximate or adjacent to a septum of the user e.g., between the nostrils.

According to another aspect, the present invention provides a nasal device comprising a portion or member located outside the nose and arranged to span a septum of a nose when worn by a user; and a delivery device located on or associated with said portion or member external to the nose and arranged to emit inhalable compositions such as fumes inhalable by the user when said nasal device is worn by the user.

In one embodiment, the nasal device comprises a substantially U-shaped body including: a central portion or member arranged to span a septum of a nose when worn by a user; and the delivery device located on the U-shaped body arranged to emit or diffuse the inhalable composition such as fumes from the U-shaped body external to the user in use.

In one example, the nasal device is a nasal dilator device.

Preferably, the delivery device is arranged to emit or diffuse the inhalable composition such as in the form of fumes using at least one of ultrasonic diffusion heat diffusion, evaporative diffusion; or a nebuliser. In one particularly preferred example, the delivery device is arranged to emit an inhalable composition such as in the form of fumes by evaporation.

Preferably, the delivery device contains at least one of a medicament, a fragrance, an aroma or a compound, and preferably wherein the inhalable composition (e.g., in the form of fumes) comprises the at least one of the medicament, fragrance, aroma or compound such as an aromatic compound. Preferably, the at least one of the medicament, fragrance, aroma or compound is therapeutic in the sense that is provides a therapeutic effect to the user following inhalation of said the medicament, fragrance, aroma or compound. It would be understood that the therapeutic effect may be by way of aroma therapy and/or by way of alleviation, full cessation, treatment and/or prevention alleviation, full cessation, treatment and/or prevention of a disease or medical condition of the user or alleviation, full cessation, treatment and/or prevention alleviation, full cessation, treatment and/or prevention of or one or more symptoms of said disease or medical condition of the user.

For example, the inhalable composition according to any aspect, embodiment or example described herein, further comprises at least one of a carrier, excipient and/or diluent such as a pharmaceutically acceptable carrier, excipient and/or diluent. For example, the inhalable composition of the present invention comprises at least one of the medicament, fragrance, aroma or compound such as an aromatic compound, and further comprises one or more of a carrier, excipient and/or diluent e.g., which is pharmaceutically acceptable. It will be understood that the carrier, excipient and/or diluent may be in the form of carrier, excipient and/or diluent suitable for inhalation.

Preferably, the delivery device is arranged or adapted to facilitate the dilation and/or clearance of the nostrils of the user when in use. For example, the delivery device is arranged or adapted to clear or enhance clearance of nasal passages when in use. In one particular preferred example, the user has or is suffering from nasal congestion or rhinitis and the delivery device is arranged or adapted to alleviate or stop symptoms of irritated, runny, blocked and/or stuffy nose. Preferably, the delivery device is arranged or adapted to clear or enhance clearance of blocked or stuffy nose when in use.

Preferably the delivery device is removably or releasably attachable to the nasal device. Alternatively, the delivery device is permanently attachable to the nasal device and/or is manufactured integrally with the nasal device.

Preferably, the delivery device comprises a wick.

Preferably, the wick is arranged to receive a source material or composition capable of spreading, emitting or emanating an inhalable composition such as a fume, wherein said source material or composition comprises at least one compound for example a therapeutic compound and/or an aromatic compound. In one example, the composition is a medicament. In another example the source material or composition, comprises one or more therapeutic compounds, wherein the source material or composition is capable of spreading, emitting or emanating an inhalable composition such as a fume. Preferably, the inhalable composition such as fume which is spread, emitted or emanating from said composition comprises the at least one compound for example a therapeutic compound and/or an aromatic compound.

In one example, the source of the inhalable composition according to any aspect, embodiment or example described herein, further comprises at least one of a carrier, excipient and/or diluent such as a pharmaceutically acceptable carrier, excipient and/or diluent. For example, the source of the inhalable composition of the present invention comprises at least one of the medicament, fragrance, aroma or compound such as an aromatic compound, and further comprises one or more of a carrier, excipient and/or diluent e.g., which is pharmaceutically acceptable. It will be understood that the carrier, excipient and/or diluent may be in the form of carrier, excipient and/or diluent suitable for inhalation.

Preferably, the delivery device further comprising a film disposed on a surface of the delivery device and a removable seal provided on the film to mitigate release of a compound through the film, thereby preventing or minimizing release of the inhalable composition such as fume from the delivery device and/or wick when the seal is place.

Preferably, the wick is encased in a cover.

Preferably, the cover includes one or more apertures arranged to release the inhalable composition such as fumes in use.

According to a further aspect, the present invention provides a case for a nasal device, comprising: a base for receiving a nasal device thereon; a cover engageable with the base to cover the nasal device and to enclose the nasal device within the case; a reservoir for holding a supply of a source material of an inhalable composition; and a transfer device in communication with the reservoir for transferring the source of the inhalable composition from the reservoir to the nasal device within the case.

As noted above, the nasal device typically has a delivery device for providing an inhalable composition for inhalation by the user, the delivery device comprising a holder for a source of the inhalable composition configured to emit or diffuse the inhalable composition for inhalation by the user. In this context, the holder may comprise a receptacle or an absorbent substrate for holding a liquid, a gel, a solid, or a semi-solid source material that comprises or contains the inhalable composition and/or which emits or diffuses the inhalable composition. The transfer device of the case may thus be configured to transfer the source material of the inhalable composition, for example in a liquid or gel form, from the reservoir to a receptacle and/or an absorbent substrate of the holder for charging or recharging the holder.

In one embodiment, the reservoir may be arranged within the base and the transfer device and may be configured for transferring the inhalable composition from the reservoir to a holder in the nasal device via one or more of capillary action or a pumping action.

In one embodiment, the reservoir may be arranged within the cover and the transfer device may be configured for transferring the inhalable composition from the reservoir to a holder in the nasal device via one or more of capillary action, a pumping action, or gravity feed.

Thus, in at least one embodiment, the invention provides a case for a nasal device, the case including:

- a cover;
- a base engageable with the cover;
- a reservoir for a source of the inhalable composition i.e., a material adapted to emit or diffuse an inhalable composition, such as fume emitting material; and
- a transfer device for transferring the source of the inhalable composition (such as a fume emitting material) to a delivery device of the nasal device; wherein the source materials (such as fume emitting materials) in the reservoir are arranged for transfer to a delivery device in the nasal device when the nasal device is housed in the case.

In one example, the case is for at least storing or housing the nasal device when said device is not in use or worn by the user.

In one example, the nasal device is a nasal dilator device.

In another example, the source of the inhalable composition (such as a fume emitting material) is or includes a composition comprising at least one therapeutic compound and/or at least one aromatic compound.

Preferably, the base includes a retaining wall arranged to accommodate the reservoir of the source of the inhalable composition, such as a fume emitting material.

Preferably, the case includes a cap arranged to cover the reservoir of the source of the inhalable composition such as a fume emitting material.

Preferably, the cap is arranged to engage with the retaining wall to minimise the loss of the inhalable composition (e.g., fumes) from the reservoir of the source of the inhalable composition (e.g., fume emitting material).

Preferably, the device for transferring the source of the inhalable composition passes through the cap in use.

Preferably, the device for transferring the source of the inhalable composition is arranged to transfer the source of the inhalable composition (e.g. fume emitting material) from the reservoir to the delivery device.

Preferably, the delivery device and the transfer device comprise or contain wicks.

Preferably, the reservoir for the source of the inhalable composition, such as fume emitting material, includes fibrous material.

Preferably, the source of the inhalable composition, such as fume emitting material, is arranged to transfer from the reservoir to the delivery device by or through capillary action.

Preferably, the source of the inhalable composition, such as fume emitting material is arranged to transfer from the reservoir to the delivery device by or through contact diffusion.

Preferably, the delivery device and the transfer device comprise sealed containers.

Preferably, the delivery device is arranged to connect to the transfer device through mating valves.

Preferably, the source of the inhalable composition, such as fume emitting material, is transferred from the reservoir to the delivery device using at least one of capillary action, a pump, a motor or heat. In one preferred example, the source of the inhalable composition, such as fume emitting material, is transferred from the reservoir to the delivery device through or by capillaries.

In one example, the case has an overall or a square, or rectangular, or an oval or a round or a clam-shell shape or variations of a square or a rectangular or an oval or a round or a clam-shell shape. Preferably, the case is a clam shell case.

In yet a further broad aspect, the present invention provides a case according to any aspect, embodiment or example described herein comprising the nasal device according to any aspect, embodiment or example described herein stored or housed therein.

In yet a further broad aspect, the present invention provides a method for recharging a delivery device for providing an inhalable composition for inhalation, the includes the steps of placing a nasal device according to any aspect, embodiment or example described herein in a case according to any aspect, embodiment or example described herein; and engaging the delivery device of said nasal device with the transfer device of said case for transferring an amount of the source material of the inhalable composition from said reservoir to said nasal device within the case. In one example, the method comprises placing said nasal device in the base of said case.

Accordingly, in a further broad aspect, the present invention provides a fume delivery device capable of being mounted or attached outside the nose to a nasal device, wherein said fume delivery device is adapted to spread or emit inhalable fumes from said fume delivery device to the nasal passages of the nose so as to be inhaled by the user when in use. For example, fume delivery device comprises a fume emitting material. For example, the fume emitting material is selected from a fluid or liquid or semi-solid composition capable of emitting inhalable fumes.

Preferably, the fume delivery device is adapted to refill or recharge the fume emitting material in said fume delivery device. Preferably, the fume delivery device is releasably or permanently mountable or attachable outside the nose to the nasal device.

Preferably, the nasal device is a nasal dilator device.

In yet a further broad aspect, the present invention provides a nasal device, such as a nasal dilator device, comprising: a portion located outside the nose and arranged to span a septum of a nose when worn by a user; and a fume delivery device located on or associated with said portion external to the nose and arranged to emit fumes inhalable by the user when said nasal device is worn by the user.

Preferably, the nasal device comprising a substantially U shaped body including: a central portion arranged to span a septum of a nose when worn by a user; and the fume delivery device located on the U shaped body arranged to emit fumes from the U shaped body external to the user in use. Preferably, the emitted fumes are emitted from a fume emitting material. For example, the fume emitting material is selected from a fluid or liquid or semi-solid composition that emits an inhalable fume Preferably, wherein the fume delivery device contains at least one of a medicament, a fragrance, an aroma or compound.

In one example, the fume emitting material comprises a fluid or liquid or a gel comprising a medicament and/or fragrance and/or aromatic oil and wherein the fume comprises said medicament and/or fragrance and/or aromatic oil.

In another example, the fume emitting material is an inhalable solid or semi-solid composition comprising a therapeutic compound and/or an aromatic compound which is capable of being inhaled by the user during respiration. For example, wherein the fume being emitted comprises an inhalable suspension of the solid or semi-solid composition.

Preferably the fume delivery device is arranged to emit the fumes using at least one of ultrasonic diffusion; heat diffusion; evaporative diffusion; or a nebuliser.

For example, the nasal device is arranged to emit fumes by evaporation. In another example, the fume delivery device is arranged to deliver the fume to the interior of the nostrils in use.

Preferably, in use of the nasal device, the fume delivery device is arranged or adapted to clear or enhance clearance of the nostrils of the user.

In one example of the nasal device according to this or any other aspect, embodiment or example described herein, the user has or is suffering from nasal congestion or rhinitis and the fume delivery device is arranged or adapted to alleviate or stop symptoms of said nasal congestion or rhinitis.

In on example, in use of a nasal device described herein, the fumes alleviate or clear or stop symptoms of irritated nose, runny nose, blocked nose and/or stuffy nose. For example, in use of eh nasal device, the fumes clear or enhance clearance of blocked or stuffy nose.

Preferably, the fume delivery device is removably or releasably attachable to the nasal device. Alternatively, the fume delivery device is permanently attachable to the nasal device and/or is manufactured integrally with the nasal device.

Preferably, the fume delivery device comprises a wick. For example, the wick is arranged to receive a composition capable of spreading, emitting or emanating a fume, and said composition comprises at least one therapeutic compound and/or an aromatic compound, and wherein said fume comprises the at least one therapeutic compound and/or an aromatic compound. Preferably, the wick is encased in a cover. Optionally, the cover includes one or more apertures arranged to release the fumes in use of the nasal device.

Preferably, the nasal device described herein includes first and second leg members extending from the central portion in a first plane; a first cantilever rib member extending outward from the U-shaped body in a second plane and a second cantilever rib member extending outward from the U-shaped body in a third plane. For example, the first and second cantilever rib members extend away from each other; a first intermediate section connecting an end of the first leg member to a proximal end of the first cantilever rib member; the first intermediate section extends between the first plane to the second plane; a second intermediate section connecting an end of the second leg member to a proximal end of the second cantilever rib member; and the second intermediate section extends between the first plane to the third plane.

In yet a further broad aspect, the present invention provides a nasal device case including: a cover; a base engageable with the cover; a fume emitting material reservoir; and a fume mitting material transfer device; wherein fume emitting material in the fume emitting material reservoir is arranged to transfer to fume delivery device in the nasal when the nasal is housed in the case.

Preferably, the case includes the fume emitting material or includes a composition comprising at least one therapeutic compound and/or at least one aromatic compound.

In one example of a case according to this aspect, the base includes a retaining wall arranged to define the fume emitting material reservoir. In another example, the case may further include a cap arranged to cover the fume emitting material reservoir. The cap may be arranged to engage with the retaining wall to minimise the loss of fumes from the fume emitting material reservoir.

Preferably, the fume emitting material transfer device passes through the cap in use of the case.

In one example, the fume emitting material transfer device is arranged to transfer fume emitting material from the fume emitting material reservoir to the fume delivery device. In another example, the fume delivery device and the fume emitting material transfer device are wicks. In one such example the fume emitting material reservoir includes a fibrous material. Preferably, wherein fume emitting material is arranged to transfer from the fume emitting material reservoir to the fume delivery device through capillary action. For example, the fume emitting material is arranged to become transferred from the fume emitting material reservoir to the fume delivery device through or by contact diffusion. In one example, the fume delivery device and the fume emitting material transfer device are sealed containers. For example, the fume delivery device is arranged to connect to the fume emitting material transfer device through mating valves. For example, the fume emitting material is transferred from the fume emitting material reservoir to the fume delivery device using at least one of a pump, a motor or heat.

In yet a further broad aspect, the present invention provides an agent delivery device capable of being mounted or attached outside the nose to a nasal device, wherein in use said agent delivery device is adapted to spread or emit an inhalable agent from said agent delivery device to the nasal passages of the nose of the user so as to be inhaled by the user during respiration.

In yet a further broad aspect, the present invention provides an agent delivery device capable of being mounted or attached outside the nose to a nasal device, wherein in use said agent delivery device is adapted to spread or emit an inhalable agent from said agent delivery device to the nasal passages of the nose of the user so as to be inhaled by the user during respiration.

In one embodiment, the agent delivery device comprises an agent emitting material. For example, the agent emitting material may be selected from a fluid or liquid or semi-solid composition capable of emitting inhalable compounds. In one such preferred embodiment, the agent delivery device is adapted to refill or recharge the agent emitting material in said agent delivery device.

In one example, the agent delivery device is adapted to spread or emit inhalable fume, and wherein the agent is or comprises inhalable fume.

In another embodiment, the agent delivery device is releasably or removably mountable or attachable outside the nose to a nasal device. In an alternative embodiment, the agent delivery device is permanently mountable or attachable outside the nose to a nasal device. In one example, the nasal device is a nasal dilator device.

In yet a further aspect, the present invention seeks to provide a nasal device comprising a member or portion located outside the nose and arranged to span a septum of a nose when worn by a user, and an agent delivery device located on or associated with said member or portion outside the nose, wherein the agent delivery device comprises an agent emitting material capable of spreading an agent from the agent delivery device into the nasal passages of the nose, and wherein the agent delivery device is arranged to allow the agent to spread from the agent emitting material to the nasal passages of the nose so as to be inhaled by the user.

Preferably, the nasal device comprises a substantially U-shaped body including a central member or portion arranged to span a septum of a nose when worn by a user, and wherein the agent delivery device is for delivering an inhalable composition and is located on or associated with the substantially U-shaped body outside the nose.

Preferably the agent comprises or consists of the inhalable composition.

Preferably, the nasal device is a nasal dilator device.

Preferably the agent delivery device is removably attachable to the nasal device.

Preferably the agent emitting material is selected from a fluid or liquid or gel or semi-solid composition that emits inhalable fumes. In one example, the inhalable fumes are vapours and/or comprise an inhalable solid or semi-solid composition.

Preferably, the agent emitting material comprises a fluid or liquid or a gel comprising a therapeutic compound and/or an aromatic compound and wherein said fluid or liquid or gel emits a fume comprising said therapeutic compound and/or an aromatic compound.

Preferably, the agent emitting material comprises a fluid or liquid or a gel comprising a medicament and/or fragrance and/or aromatic oil and wherein the fume comprises said medicament and/or fragrance and/or aromatic oil.

Preferably, the agent emitting material is an inhalable solid or semi-solid composition comprising a therapeutic compound and/or an aromatic compound which is capable of being inhaled by the user during respiration.

Preferably, the agent emitting material is an inhalable solid or semi-solid composition comprising a medicament and/or fragrance and/or aromatic oil.

Preferably, the agent is an inhalable fume. In one example the fume comprises an inhalable vapour or an inhalable solid or an inhalable semi-solid composition.

Preferably, the agent is an inhalable fume comprising a therapeutic compound and/or an aromatic compound.

Preferably, the agent is an inhalable fume comprising a medicament and/or fragrance and/or aromatic oil.

Preferably, in use the agent is capable of clearing or enhancing clearing of the nostrils upon inhalation of said agent by the user.

In one preferred example, the user has or is suffering from nasal congestion or rhinitis and the agent is capable of or adapted to alleviate or stop symptoms of irritated, runny, blocked and/or stuffy nose. Preferably, the agent clears or enhance clearance of blocked or stuffy nose upon inhalation of said agent during respiration by the user.

In one example according to any embodiment or aspect of the agent delivery device or the nasal device described herein, the agent delivery device and/or the nasal device is worn or used by the user when the user is a sleep or in a state of relaxation.

Preferably, the agent delivery device is arranged to spread or emit the agent using at least one of: evaporation; ultrasonic diffusion; heat diffusion; or a nebuliser.

In one preferred example, the agent delivery device is arranged to spread or emit the agent by evaporation.

Preferably, wherein the agent delivery device comprises a wick and wherein the agent emitting material is located within the wick.

Preferably the wick is arranged to emit agent from the agent emitting material in use for at least one hour.

Preferably the wick is arranged to emit agent for at least four hours.

Preferably, the wick is arranged to emit agent for at least 8 hours.

Preferably, the wick is arranged to receive the composition.

Preferably, the agent delivery device is rechargeable with an agent emitting material. Preferably, the agent is fume.

Preferably, the agent delivery device further comprising a film disposed on a surface of the agent delivery device and a removable seal provided on the film to prevent or minimise release of the agent from the agent delivery device.

Preferably the film is foil.

Preferably, the wick is encased in a cover.

Preferably, the cover includes apertures arranged to release the agent when said nasal dilator device is worn by the user.

Preferably the agent emitting material includes any one or more of the following: Peppermint oil; Lavender oil; *Eucalyptus* oil; Menthol oil; Lemon oil; Tea tree oil; Rosemary oil; Valerian oil; Clary oil; and *Pelagonium graveolens* oil.

In one example, the agent emitting material comprises a blend of peppermint oil, menthol oil, lemon peel oil, *eucalyptus* leaf oil, tea tree leaf oil, and rosemary leaf oil.

In another example, the agent emitting material comprises lavender oil, *eucalyptus* leaf oil, valerian root oil and tea tree leaf oil.

In another example, the agent emitting material comprises orange peel extract oil, *Pelagonium graveolens* oil, and clary oil.

Preferably, the user is an adult, a young adult, a teenager or a child.

Preferably, the child is at least 7 years old.

Preferably, the nasal device according to any aspect, embodiment or example hereof is a nasal dilator device comprising
- a substantially U-shaped body including:
- first and second leg members extending from the central member or portion substantially in a first plane;
- a first cantilever rib member extending outward from the U-shaped body substantially in a second plane and a second cantilever rib member extending outward from the U-shaped body substantially in a third plane.

In one example, the first and second cantilever rib members extend away from each other.

In one example, the nasal device further comprises a first intermediate section connecting an end of the first leg member to a proximal end of the first cantilever rib member, wherein the first intermediate section extends between the first plane to the second plane; and a second intermediate section connecting an end of the second leg member to a proximal end of the second cantilever rib member; wherein the second intermediate section extends between the first plane to the third plane.

In one example, the nasal device according to any aspect, embodiment or example described hereof is a nasal dilator device and comprises:
- a substantially U-shaped body including:
  - a central member or portion arranged to span a septum of a nose when worn by a user; and
  - first and second leg members extending from the central member or portion substantially in a first plane;
- a first cantilever rib member extending outward from the U-shaped body substantially in a second plane;
- a second cantilever rib member extending outward from the U-shaped body substantially in a third plane;
- wherein the first and second cantilever rib members extend away from each other;
- a first intermediate section connecting an end of the first leg member to a proximal end of the first cantilever rib member;
- wherein the first intermediate section extends from the first plane to the second plane;
- a second intermediate section connecting an end of the second leg member to a proximal end of the second cantilever rib member;
- wherein the second intermediate section extends from the first plane to the third plane; and
- an agent delivery device according to any embodiment or example described herein for delivery of an inhalable composition, wherein the agent delivery device is mounted on the central member or portion of the U-shaped body.

In one example, the nasal device according to any aspect, embodiment or example described hereof is a nasal dilator device and comprises:
- a substantially U-shaped body including:
  - a central member or portion arranged to span a septum of a nose when worn by a user; and
  - first and second leg members extending from the central member or portion substantially in a first plane;
- a first cantilever rib member extending outward from the U-shaped body in a second plane;
- a second cantilever rib member extending outward from the U-shaped body in a third plane;
- wherein the first and second cantilever rib members extend away from each other;
- a first intermediate section connecting an end of the first leg member to a proximal end of the first cantilever rib member;
- wherein the first intermediate section extends from the first plane to the second plane;
- a second intermediate section connecting an end of the second leg member to a proximal end of the second cantilever rib member;
- wherein the second intermediate section extends from the first plane to the third plane; and
- at least one projection protruding from and extending along at least a portion of a length of each of the first and second cantilever rib members; and
- an agent delivery device according to any embodiment or example described herein for delivery of an inhalable composition, wherein said agent delivery device is mounted on the central member or portion of the U-shaped body.

In a further embodiment, the present invention provides a case for storing or housing a nasal device, said case including:

a cover;

a base engageable with the cover;

a reservoir for an agent emitting material; and a transfer device for the agent emitting material;

wherein the transfer device is configured or arranged to transfer an agent emitting material in the reservoir to the agent delivery device in the nasal device when the nasal device is stored or housed in the case.

In one example, the agent emitting material includes a composition comprising at least one therapeutic compound and/or at least one aromatic compound. Preferably, the agent emitting material emits an inhalable composition, such as in the form of inhalable fumes, comprising the at least one therapeutic compound and/or at least one aromatic compound.

Preferably, the base includes a retaining wall arranged to receive or define the reservoir for the agent emitting material.

Preferably, the case includes a cap arranged to cover the reservoir.

Preferably the cap is arranged to engage with the retaining wall to minimise the loss of agent from the reservoir of the agent emitting material.

Preferably, the agent emitting material transfer device passes through the cap in use.

Preferably, the agent emitting material transfer device is arranged to transfer the agent emitting material from the reservoir to the agent delivery device.

Preferably, the agent delivery device and the agent emitting material transfer device are, consist of, or comprise wicks.

Preferably, the agent delivery device and the agent emitting material transfer device are, consist of, or comprise wicks.

Preferably, the reservoir for the agent emitting material includes fibrous material.

Preferably, the agent emitting material is arranged to be transferred from the reservoir to the agent delivery device by or through capillary action.

Preferably, the agent delivery device and the agent emitting material transfer device are sealed containers.

Preferably, the agent delivery device is arranged to connect to the agent emitting material transfer device through mating valves.

Preferably, the agent emitting material is transferred from the reservoir to the delivery device using at least one of a capillaries, pump, a motor or heat.

In one example, the case has an overall or a square, or rectangular, or an oval or a round or a clam-shell shape or variations of a square or a rectangular or an oval or a round or a clam-shell shape. Preferably, the case is a clam shell case.

Preferably, the case is arranged to transfer the agent emitting material from the reservoir to the delivery device to fill the delivery device at least 10 times or at least 11 times or at least 12 times or at least 13 times or at least 14 times or at least 15 times or at least more than 15 times.

Preferably, the case is arranged to transfer agent emitting material from the reservoir to the agent delivery device to fill the delivery device at least 15 times.

In a further aspect, the present invention provides a method for recharging an agent delivery device including the steps of:

placing the agent delivery device in a case, wherein the case includes a cover, a base engageable with the cover, a reservoir for an agent emitting material, and a transfer device for the agent emitting material; and engaging the agent delivery device with the transfer device so that agent emitting material transfers from the reservoir to the agent emitting device.

Preferably the agent emitting material transfers using a capillary action.

Preferably, the agent delivery device engages the transfer device so that a seal, such as a sealing film, between the transfer device and the reservoir is broken.

The nasal devices or the agent or fume delivery devices for providing an inhalable composition or agent according to any aspect, embodiment or example described herein and the nasal devices comprising the agent or fume delivery devices according to any aspect, embodiment or example described herein, provide a significant advance over the previously existing devices. For example, the devices of the present invention are able to emit inhalable compositions e.g., in the form of fumes which comprise aromatic and/or therapeutic compounds which are able of being inhaled by the user through the nasal passages during normal respiration of the user even when the user is relaxing or asleep. Using prior art devices, whilst sleeping, a user is unable to self-medicate with a device emitting an inhalable composition such as a vapour or fume emitting device. For example, using prior art devices emitting vapour the user is also typically unable to self-medicate without affecting others in in his/her vicinity, and in most situations the prior art devices which emit inhalable compositions such as in the form of vapours or fumes are difficult or cumbersome to relocate with the user such as when the user moves from room to room or outside. In contrast, the devices described herein used for delivery of inhalable compositions to users of these devices allow continuous or staged delivery of inhalable compositions comprising aromatic and/or therapeutic compounds even whilst a user is relaxing, sleeping or otherwise preoccupied. The inhalable compositions (e.g., fumes) emitted are localised specifically to the nostrils of the user with minimal or no effect on others in the user's vicinity, and are potable with the user when the device is in use by a user. The inhalable compositions (e.g., fumes) delivered by the devices of the present invention as described herein can be continuously delivered to the user and be inhaled during respiration by the user at least until the source material adapted to emit or diffuse an inhalable composition (e.g., fume emitting material) in the device is depleted. Accordingly, the devices describes herein according to any aspect, embodiment or example hereof are able to provide effective therapeutic and/or aromatic relief to user over a continuous period of time even when the user is asleep, relaxing or otherwise preoccupied. Among their many uses the devices of the present invention by delivering inhalable compositions such as agents or fumes are able to, for example, provide effective relief from nasal congestion, and/or aid or induce or enhance calmness or relaxation or a state of sleep in the user such as by employing essential oils and or other suitable therapeutic and/or aromatic compounds as the fume emitting materials within the device. Furthermore, by localising the agent or fume delivery device outside the nose, the delivery devices and the nasal devices described herein avoid or minimise irritation or abrasion to the skin within the nose by avoiding direct contact of the source of the inhalable composition. such that which emits an inhalable composition in the form of fumes, with the inside of the nasal passages thereby minimising discomfort to the user.

Furthermore, because of the set close proximity of the delivery (such as agent or fume) device to the nasal passages of the user, the delivery devices and nasal devices described herein are able to provide reliable and predictable volumes of the inhalable compositions (e.g., in the form of fumes) and therefore deliver predictable and reliable amounts of the therapeutic and/or aromatic agents to the user by inhalation during respiration by the user until depletion of the source material of the of the inhalable composition (such as fume emitting material).

A further problem of prior art nasal devices (such as prior art nasal dilator devices) is that once the medicament or aromatic compound which is delivered by the nasal device is depleted from the prior art nasal devices, the prior art nasal devices cannot be refilled or recharged with more of the medicament or aromatic compounds. Accordingly, at least one additional significant advantage provided by the delivery devices and the nasal devices of the invention described herein is that they provide a recharging solution in a simple assembly that has not been previously available. This is achieved for example by the devices described in some embodiments of the present invention being refillable with a source material adapted to emit or diffuse an inhalable composition such as fume emitting material, thereby providing more than a single application or use of the device for delivery of the medicament or aromatic compound contained in the inhalable composition.

For some embodiments described herein where a nasal dilator device is combined with the delivery device such as an agent or fume delivery device of the present invitation, it would be readily appreciated that the combination provides improved respiration to the user than that which could be achieved by prior art nasal dilators alone or by prior art devices emitting inhalable compositions such fumes alone. This is because the combination allows not only for physical dilation of the nostrils by the nasal dilator device but can also provide delivery of a therapeutic or aromatic effect to facilitate or assist in clearing nasal congestion such as by clearing or enhancing clearance of blocked or stuffy nose. Such combination can provide significant respiratory aid to the user even when the user is asleep, relaxing or otherwise preoccupied. In addition, since the delivery devices such as the agent or fume delivery devices described herein provide significant advantages over prior art fume or vapour emitting devices, it follows that nasal dilator devices of the present invention comprising the delivery device described herein provide previously unavailable advantages.

Some embodiments relate to a nasal dilator device comprising a substantially U-shaped body including a central member or central portion arranged to span a septum of a nose when worn by a user and first and second leg members extending from the central portion in a first plane, a first cantilever rib member extending outward from the U-shaped body in a second plane, a second cantilever rib member extending outward from the U-shaped body in a third plane, wherein the first and second cantilever rib members extend away from each other, a first intermediate section connecting an end of the first leg member to a proximal end of the first cantilever rib member, wherein the first intermediate section extends from the first plane to the second plane and a second intermediate section connecting an end of the second leg member to a proximal end of the second cantilever rib member, wherein the second intermediate section extends from the first plane to the third plane, and at least one projection protruding from and extending along at least a portion of a length of each of the first and second cantilever rib members.

In some embodiments, the at least one projection may comprise first and second projections, each forming a flange disposed at respective elongate edges of a major surface of the nasal dilator device. The at least one projection may be arranged, in use, to engage with an inner surface of a nose.

In some embodiments, the second and third planes may be orthogonal or perpendicular to the first plane. The first intermediate section and the second intermediate section may be right angled sections. The first and second intermediate sections may be arranged, in use, to engage with the septum and extend from the septum behind the columella and alar fibrofatty tissue of the nose, allowing the first and second cantilever rib members, in use, to extend along respective nasal orifices to an inner wall of the nostrils.

The first and second cantilever rib members may be arcuate cantilever rib members, each having a curvature along its length. The first and second intermediate sections may be arcuate intermediate sections, each having a curvature along its length. The second and third planes may be converging planes such that the first and second cantilever rib members are angled and/or extend substantially toward the central portion of the U-shaped body. The second and third planes may be diverging planes such that the first and second cantilever rib members are angled and/or extend substantially toward the central portion of the U-shaped body. The second and third planes may be the same plane.

In some embodiments, the first and second cantilever rib members may exhibit an elongate arched profile which approximates at least a portion of one of a circle, ellipse or parabola. The first and second leg members may be inclined towards each other such that a relatively greater distance is provided between the first and second leg members towards the central portion accommodate a columella of a nose when donned by the user. The first and second intermediate sections may be inclined away from each other to assist in urging the respective first and second cantilever rib members against inner walls of respective nostrils when worn by the user.

In some embodiments, the first and second cantilever rib members may comprise respective first and second nostril engaging elements for engaging with an inner wall of a respective nostril. The first and second nostril engaging elements may extend arcuately from the respective first and second distal ends of the respective first and second rib members. For example, the first and second nostril engaging elements may extend from the first and second planes respectively and in a direction away from the central portion of the U-shaped body. The first and second nostril engaging elements may be disposed at distal ends of the first and second cantilever rib members, respectively.

In some embodiments, a series of protrusions may be disposed on the first and second nostril engaging elements. For example, the first and second nostril engaging elements may be substantially elongate and the series of protrusions may extend along a length of the first and second nostril engaging elements. The series of protrusions may comprise a plurality of elongated v-shaped protrusions.

In some embodiments, enlarged pads may be disposed on the first and second nostril engaging elements to engage with inner walls of the nostrils. For example, the enlarged pads may comprise the series of protrusions and/or the series of protrusions may be formed from an overmould material. In some embodiments, the at least one projection may be integrated with and extend from a corresponding protrusion of the series of protrusions. The at least one projection may be formed from an overmould material.

In some embodiments, the nasal dilator may comprise a first and second releasable attachment mechanism for releasably attaching the first and second cantilever rib members, for example, distal ends of the first and second cantilever rib members, to the U-shaped body and/or the first and second intermediate section respectively. For example, the releasable attachment mechanisms may be arranged to releasably attach first and second nostril engaging elements disposed at distal ends of the first and second cantilever rib members to the first and second leg members, respectively. The releasable attachment mechanisms may be arranged to releasably attach the first and second nostril engaging elements disposed at distal ends of the first and second cantilever rib members to the first and second intermediate sections, respectively.

The releasable attachment mechanisms may each comprise an arm and a socket arranged to receive and engage the arm. A stopper or hook may be disposed at an end of the arm to hinder the arm from withdrawing from the socket. A notch may be disposed on an inner surface of the socket and may be configured to engage with the stopper or hook on the arm to hinder the arm from withdrawing from the socket.

In some embodiments, the arms may be disposed on an inner surface of first and second nostril engaging elements of the first and second cantilever rib members, respectively, and the sockets may be disposed on the first and second leg members. In some embodiments, the arms may be disposed on an inner surface of first and second nostril engaging elements of the first and second cantilever rib members, respectively, and the sockets may be disposed on the first and second intermediate sections. In some embodiments, the sockets may be disposed on an inner surface of first and second nostril engaging elements of the first and second cantilever rib members, respectively, and the arms may be disposed on the first and second leg members. In some embodiments, the sockets may be disposed on an inner surface of first and second nostril engaging elements of the first and second cantilever rib members, respectively, and the arms may be disposed on the first and second intermediate sections. In some embodiments, the nasal dilator device may comprise first and second arm support members projecting from respective first and second intermediate sections, the sockets may be disposed on an inner surface of first and second nostril engaging elements of the first and second cantilever rib members, respectively, and the arms may be disposed on the first and second arm support members.

The sockets may comprise substantially elongate housings which taper along their length and provide a relatively broad opening for receiving the arms. Each of the sockets may be provided with apertures in side walls of the housing.

Some embodiments relate to a nasal dilator device comprising a substantially U-shaped body including a central member or central portion arranged to span a septum of a nose when worn by a user and first and second leg members extending from the central portion in a first plane, a first cantilever rib member extending outward from the U-shaped body in a second plane, a second cantilever rib member extending outward from the U-shaped body in a third plane, wherein the first and second cantilever rib members extend away from each other, a first intermediate section connecting an end of the first leg member to a proximal end of the first cantilever rib member, wherein the first intermediate section extends from the first plane to the second plane, a second intermediate section connecting an end of the second leg member to a proximal end of the second cantilever rib member, wherein the second intermediate section extends from the first plane to the third plane, a first releasable attachment mechanism for releasably attaching a distal end of the first cantilever rib member to the first intermediate section and a second releasable attachment mechanism for releasably attaching a distal end of the second cantilever rib member to the second intermediate section.

The second and third planes may be orthogonal or perpendicular to the first plane. The first intermediate section and the second intermediate section are right angled sections. The first and second cantilever rib members may comprise respective first and second nostril engaging elements for engaging with an inner wall of a respective nostril.

In some embodiments, the releasable attachment mechanisms may be arranged to releasably attach first and second nostril engaging elements disposed at the distal ends of the first and second cantilever rib members to the first and second leg members, respectively. The releasable attachment mechanisms may each comprise an arm and a socket arranged to receive and engage the arm. A stopper or hook may be disposed at an end of the arm to hinder the arm from withdrawing from the socket. A notch may be disposed on an inner surface of the socket and may be configured to engage with the stopper or hook on the arm to hinder the arm from withdrawing from the socket.

In some embodiments, the arms may be disposed on an inner surface of first and second nostril engaging elements of the first and second cantilever rib members, respectively, and the sockets may be disposed on the first and second intermediate sections. In some embodiments, the sockets may be disposed on an inner surface of first and second nostril engaging elements of the first and second cantilever rib members, respectively, and the arms may be disposed on the first and second intermediate sections. In some embodiments, the nasal dilator device may further comprise first and second arm support members projecting from respective first and second intermediate sections and the arms may be disposed on the first and second arm support members.

In some embodiments, the sockets may comprise substantially elongate housings which taper along their length and provide a relatively broad opening for receiving the arms. Each of the sockets may be provided with apertures in side walls of the housing.

Some embodiments relate to a nasal dilator device comprising a substantially U-shaped body including a central member or central portion arranged to span a septum of a nose when worn by a user and first and second leg members extending from the central member or portion in a first plane, a first cantilever rib member extending outward from the U-shaped body in a second plane, a second cantilever rib member extending outward from the U-shaped body in a third plane, wherein the first and second cantilever rib members extend away from each other, a first intermediate section connecting an end of the first leg member to a proximal end of the first cantilever rib member and a second intermediate section connecting an end of the second leg member to a proximal end of the second cantilever rib member.

In some embodiments, the first intermediate section may extend from the first plane to the second plane and the second intermediate section may extend from the first plane to the third plane. The second and third planes may be orthogonal to the first plane.

For example, the first intermediate section and the second intermediate section may be right angled sections. In some embodiments, the first and second intermediate sections are arranged, in use, to engage with the septum and extend from the septum behind the columella and alar fibrofatty tissue of the nose allowing the first and second cantilever rib members, in use, to extend along respective nasal orifices to an inner wall of the nostrils.

In some embodiments, the first intermediate section may extend between the first plane and the second plane and the second intermediate section may extend between the first plane and the third plane. For example, the first and second intermediate sections may be arranged, in use, to extend along a length of the septum and the first and second cantilever rib members are each arranged, in use, to extend from a floor of a respective nasal orifice to an inner wall of the nostrils.

Some embodiments relate to a nasal dilator device comprising a substantially U-shaped body including a central member or portion arranged to span a septum of a nose when worn by a user and first and second leg members extending from the central member or portion in a first plane, a first cantilever rib member extending outward from an end of the first leg member of the U-shaped body in a second plane, a second cantilever rib member extending outward from an end of the second leg member of the U-shaped body in a third plane, wherein the first and second cantilever rib members extend away from each other and at least one projection protruding from and extending along at least a portion of a length of each of the first and second cantilever rib members. For example, the second and third planes may be orthogonal to the first plane.

Some embodiments relate to a nasal dilator device comprising a substantially U-shaped body including a central member or portion arranged to span a septum of a nose when worn by a user and first and second leg members extending from the central member or portion, first and second cantilever rib members extending outward from the U-shaped body and away from one another, a first intermediate section connecting an end of the first leg member to a proximal end of the first cantilever rib member and a second intermediate section connecting an end of the second leg member to a proximal end of the second cantilever rib member, wherein the first and second leg members are arranged, in use, to extend inward of respective nasal orifices along the septum, the first and second intermediate sections are arranged, in use, to engage with the septum and extend from the septum behind the columella and alar fibrofatty tissue of the nose allowing the first and second cantilever rib members, in use, to extend along the respective nasal orifices to an inner wall of the nostrils.

Some embodiments relate to a nasal dilator device comprising a substantially U-shaped body including a central member or central portion arranged to span a septum of a nose when worn by a user and first and second leg members extending from the central member or portion in a first plane a first cantilever rib member extending outward from the U-shaped body in a second plane a second cantilever rib member extending outward from the U-shaped body in a third plane wherein the first and second cantilever rib members extend away from each other a first intermediate section connecting an end of the first leg member to a proximal end of the first cantilever rib member, wherein the first intermediate section extends between the first plane and second plane and a second intermediate section connecting an end of the second leg member to a proximal end of the second cantilever rib member, wherein the second intermediate section extends between the first plane and the third plane.

In some embodiments, the first and second cantilever rib members may be arcuate cantilever rib members, each having a curvature along its length. In some embodiments, the first and second intermediate sections are arcuate intermediate sections, each having a curvature along its length.

The first and second intermediate sections may be arranged, in use, to extend along a length of the septum and the first and second cantilever rib members may be each arranged, in use, to extend from a floor of a respective nasal orifice to an inner wall of the nostrils.

In some embodiments, the first and second intermediate portions may extend obtusely from the ends of the first and second leg members. The second and third planes may be converging planes. In some embodiments, the first and second cantilever rib members may exhibit an elongate arched profile which approximates at least a portion of one of a circle, ellipse or parabola.

In some embodiments, the first and second leg members may be inclined towards each other such that a relatively greater distance is provided between the first and second leg members towards the central portion to accommodate a columella of a nose when donned by the user. In some embodiments, the first and second intermediate sections may be inclined away from each other to assist in urging the respective first and second cantilever rib members against inner walls of respective nostrils when worn by the user.

The first and second cantilever rib members may comprise respective first and second nostril engaging elements for engaging with an inner wall of a respective nostril. The first and second nostril engaging elements may be disposed at distal ends of the first and second cantilever rib members, respectively. A series of protrusions is disposed on the first and second nostril engaging elements. The first and second nostril engaging elements may be substantially elongate and the series of protrusions may extend along a length of the first and second nostril engaging elements. For example, the series of protrusions comprises a plurality of an elongated v-shaped protrusions. Enlarged pads may be disposed on the first and second nostril engaging elements to engage with inner walls of the nostrils. The enlarged pads may comprise the series of protrusions. The series of protrusions are formed from an overmould material.

In some embodiments, the nasal dilator device may comprise at least one projection protruding from and extending along at least a portion of a length of the first and second cantilever rib members. The nasal dilator device may comprise first and second projections, each forming a flange disposed at respective elongate edges of a major surface of the nasal dilator device and extending along at least a portion of a length of the first and second cantilever rib members. The nasal dilator device may comprise at least one projection protruding from and extending along at least a portion of a length of the first and second cantilever rib members, wherein the at least one projection is integrated with and extends from a corresponding protrusion of the series of protrusions. The at least one projection may be formed from an overmould material.

In some embodiments, the nasal dilator device may further comprise a first and second releasable attachment mechanism for releasably attaching the first and second cantilever rib members, respectively, to the U-shaped body. For example, the releasable attachment mechanisms may be arranged to releasably attach the first and second nostril engaging elements to the first and second leg members, respectively. In some embodiments, the releasable attachment mechanisms may be arranged to releasably attach the first and second nostril engaging elements to the first and second intermediate sections, respectively.

The releasable attachment mechanisms may each comprise an arm and a socket arranged to receive and engage the arm. A stopper or hook may be disposed at an end of the arm to hinder the arm from withdrawing from the socket. A notch may be disposed on an inner surface of the socket and is configured to engage with the stopper or hook on the arm to hinder the arm from withdrawing from the socket.

In one embodiment, the arms may be disposed on an inner surface of first and second nostril engaging elements of the first and second cantilever rib members, respectively, and the sockets may be disposed on the first and second leg members. In another embodiment, the arms may be disposed on an inner surface of first and second nostril engaging elements of the first and second cantilever rib members, respectively, and the sockets may be disposed on the first and second intermediate sections. In another embodiment, the sockets may be disposed on an inner surface of first and second nostril engaging elements of the first and second cantilever rib members, respectively, and the arms may be disposed on the first and second leg members. In another embodiment, the sockets may be disposed on an inner surface of first and second nostril engaging elements of the first and second cantilever rib members, respectively, and the arms may be disposed on the first and second intermediate sections. In another embodiment, the nasal dilator device may comprise first and second arm support members projecting from respective first and second intermediate sections and the sockets may be disposed on an inner surface of first and second nostril engaging elements of the first and second cantilever rib members, respectively, and the arms may be disposed on the first and second arm support members.

In some embodiments, the sockets may comprise substantially elongate housings which taper along their length and provide a relatively broad opening for receiving the arms. The socket may be provided with apertures in side walls of the housing.

In some embodiments, a capsule may be provided within the socket and may be arranged to be activated by the arm when the arm is received by the socket. The capsule may include at least one of a medicament or compound. The arm may comprise a coating disposed thereon arranged to release a scent in response to abrasion of the coating. An aperture may be disposed in each of the first and second nostril engaging elements. The aperture may be arranged to receive at least one of a compound, a medicament, and a capsule comprising a medicament or compound emanating a scent.

Some embodiments relate to a nasal dilator device a nasal dilator device comprising a substantially U-shaped body including a central portion arranged to span a septum of a nose when worn by a user and first and second leg members extending from the central portion in a first plane, a first closed loop structure extending outward from a longitudinal axis of the U-shaped body in a second plane and defining a first aperture; a second closed loop structure extending outward from a longitudinal axis of the U-shaped body in a third plane and defining a second aperture, wherein the first and second closed loop structures extend away from each other, a first intermediate section connecting an end of the first leg member to a proximal end of the first loop structure, wherein the first intermediate section extends between the first plane and second plane, and a second intermediate section connecting an end of the second leg member to a proximal end of the second loop structure, wherein the second intermediate section extends between the first plane and the third plane.

In some embodiments, the first loop structure may comprise a first flange portion and the second loop structure may comprise a second flange portion, wherein the first and second flange portions are arranged to form a seal with the walls nasal passage in use. For example, the first and second flange portions may project from an outer surface of the first and second loop structures, respectively, and extend along at least a portion of a circumference of the first and second loop structures, respectively.

In some embodiments, the first loop structure may comprise two or more flange portions and the second loop structure may comprise two or more flange portion, wherein the flange portions are arranged to restrict dislodgement of the nasal dilator from a nose in use.

In some embodiments, the first and second loop structures may each comprise a filter spanning the first and second apertures defined by the first and second loop structures. The filters may be arranged to snap fit into the first and second loop structures. The filters may be welded to the first and second loop structures.

It will be understood that where the nasal dilator device of the present invention comprises a fume delivery device or an agent delivery device attached thereto according to any aspect or embodiment or example described herein, or is used in conjunction with a fume delivery device or an agent delivery device according to any aspect or embodiment or example described herein, then it is preferred that the nasal device of the present invention does not comprise filters in the first and second loop structures, to avoid minimising the delivery of the fume or agent from the delivery device into the nasal passages by the filters.

In some embodiments, the first and second intermediate sections are arcuate intermediate sections, each having a curvature along its length. The first and second intermediate portions may extend obtusely from the ends of the first and second leg members.

The first and second intermediate sections may be arranged, in use, to extend along a length of the septum and the first and second loop structures may be each arranged, in use, to extend from a floor of a respective nasal orifice along an inner wall of the nostrils such that the first and second apertures are aligned with a nasal passage of the nose.

In some embodiments, the second and third planes may be converging planes.

The first and second leg members may be inclined towards each other such that a relatively greater distance is provided between the first and second leg members towards the central portion to accommodate a columella of a nose when donned by the user. The first and second intermediate sections may be inclined away from each other to assist in urging the respective first and second loop structures against inner walls of respective nostrils when worn by the user.

In some embodiments, the nasal dilator device may further comprise an overmould disposed on at least one of the central portion, the leg members, the intermediate sections and the arcuate cantilever rib members. The overmould may be infused with a compound, a medicament, a fragrance or an aroma. The nasal dilator device may be composed of a substrate material infused with a medicament, a fragrance or an aromatic agent.

In some embodiments, the central portion comprises a tab extending in a direction substantially opposite to the first and second leg members to assist with insertion, removal and/or placement of the nasal dilator device. The tab may be removeable from the nasal dilator device.

Some embodiments relate to a nasal dilator device comprising a substantially U-shaped body including: a central portion arranged to span a septum of a nose when worn by a user, and first and second leg members extending from the central portion, first and second cantilever rib members extending outward from a longitudinal axis of the U-shaped body and away from one another, a first intermediate section connecting an end of the first leg member to a proximal end of the first cantilever rib member, and a second intermediate section connecting an end of the second leg member to a proximal end of the second cantilever rib member, wherein the first and second leg members are arranged, in use, to extend inward of respective nasal orifices along the septum, the first and second intermediate sections are arranged, in use, to extend along a length of the septum behind the columella and alar fibrofatty tissue of the nose and the first and second cantilever rib members are each arranged, in use, to extend from a floor of the respective nasal orifices to an inner wall of the nostrils.

Throughout this specification, unless the context requires otherwise, the terms "comprise", "comprises", and "comprising" will be understood to imply the inclusion of a stated step or element or group of steps or elements but not the exclusion of any other step or element or group of steps or elements.

Any one of the terms "including" or "which includes" or "that includes" as used herein is also an open term that also means including at least the elements/features that follow the term, but not excluding others. Thus, "including" is synonymous with and means "comprising".

Throughout the specification the term "inhalable composition" will be understood to include any composition capable of being inhaled by a user, and shall include, for example, one or more of a vapour, a gas, a fluid, a liquid, a smoke and/or a suspended semi-solid or solid material, such as a suspended dry powder.

Throughout the specification the term "agent" will be understood to include any inhalable composition. Accordingly, the term "agent delivery device" as used herein will be understood to include any device adapted to deliver an inhalable composition.

Throughout the specification the terms "fume" and "fumes" will be understood to include any one or more of a vapour, a gas, a smoke and/or a suspended semi-solid or solid material such as a suspended dry powder.

It is to be understood that, in use, the "fumes" are capable of delivering an inhalable composition or compound such as a therapeutically beneficial compound (e.g., a medicament and/or a fragrance) to the user to facilitate an effect on the user for example a therapeutic effect and/or a sedative effect and/or an effect leading to and/or enhancing a state of relaxation and/or a state of sleep on the use. In one such example, the fumes are capable of delivering a physical effect on the user by alleviating one or more nasal symptoms of rhinitis or nasal congestions such as irritates, runny, blocked and/or stuffy nose. For example, the fumes are capable of partially or fully clearing a blocked and/or stuffy nose and/or are capable of partially or fully alleviating sunny nose. In another example, the fumes clear or enhance clearance of the nasal passages. In another example, the fumes may assist in dilating or enhancing dilation of the nasal passages of the user.

Throughout the specification the term "emit" is used. As used herein, the term "emit" will be understood to mean produce or discharge. It will be understood that the term "emit" and variations thereof, such as "emitting", includes emanate and variations thereof such as emanating.

Throughout the specification the term "spread" is used. As used herein, the term "spread" will be understood to mean to move, relocate and/or emanate from one location to another location, including, but not limited to, expanding from a small area or volume into a larger area or volume and/or diffusing from an area of high concentration to an area of low concentration.

Throughout the specification the term "diffuse" is used. As used herein, the term "diffuse" will be understood to mean to move or to relocate, especially from an area of high concentration to an area of low concentration.

Definitions for selected terms used herein can be found within the summary of the invention and throughout the detailed description of the invention and apply throughout. Unless otherwise defined, all other scientific and technical terms used herein have the same meaning as commonly understood to one of ordinary skill in the art to which the invention belongs.

Each example, aspect, embodiment and example described herein and throughout the specification is to be applied mutatis mutandis to each and every other aspect, embodiment and example unless specifically stated otherwise.

REFERENCE TO COLOUR FIGURES

This application contains at least one illustration executed in colour. Copies of this patent application publication with colour illustrations will be provided by the Office upon request and payment of the necessary fee.

BRIEF DESCRIPTION OF DRAWINGS

It should be noted in the following description that like or the same reference numerals in different embodiments denote the same or similar features.

Embodiments are described in further detail below, by way of example, with reference to the accompanying drawings.

Figure 1A:
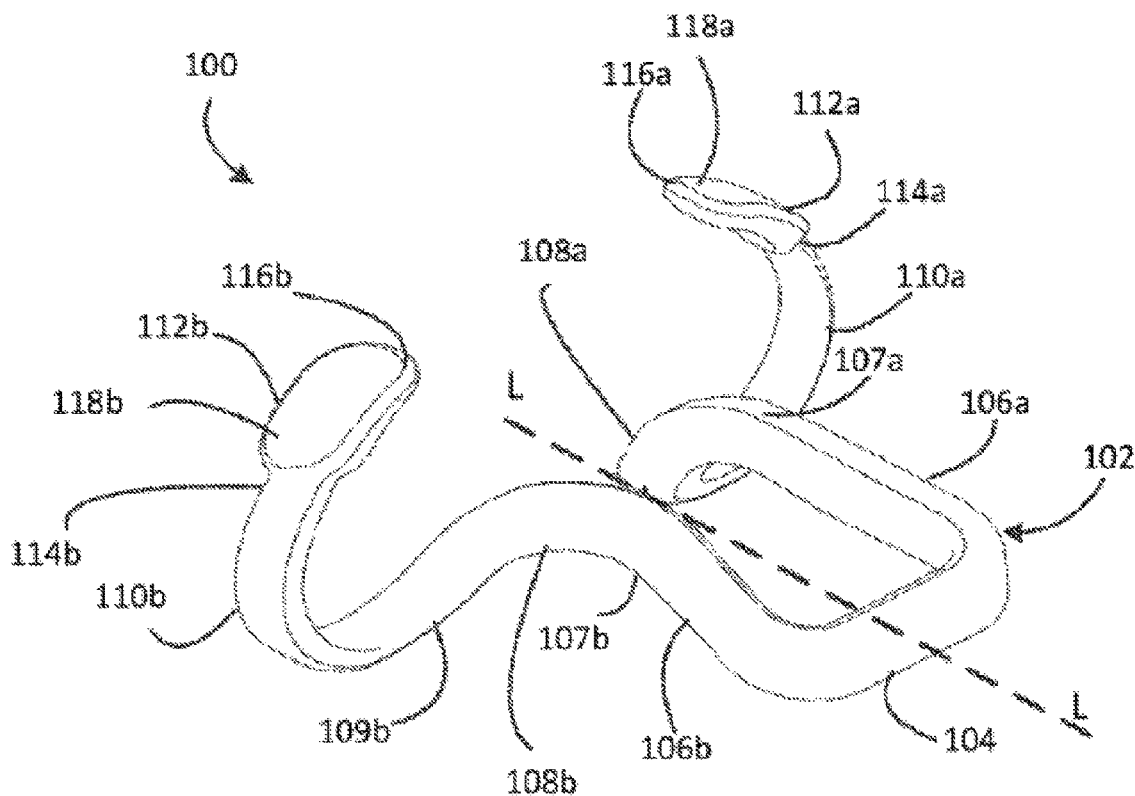
Figure 1B:
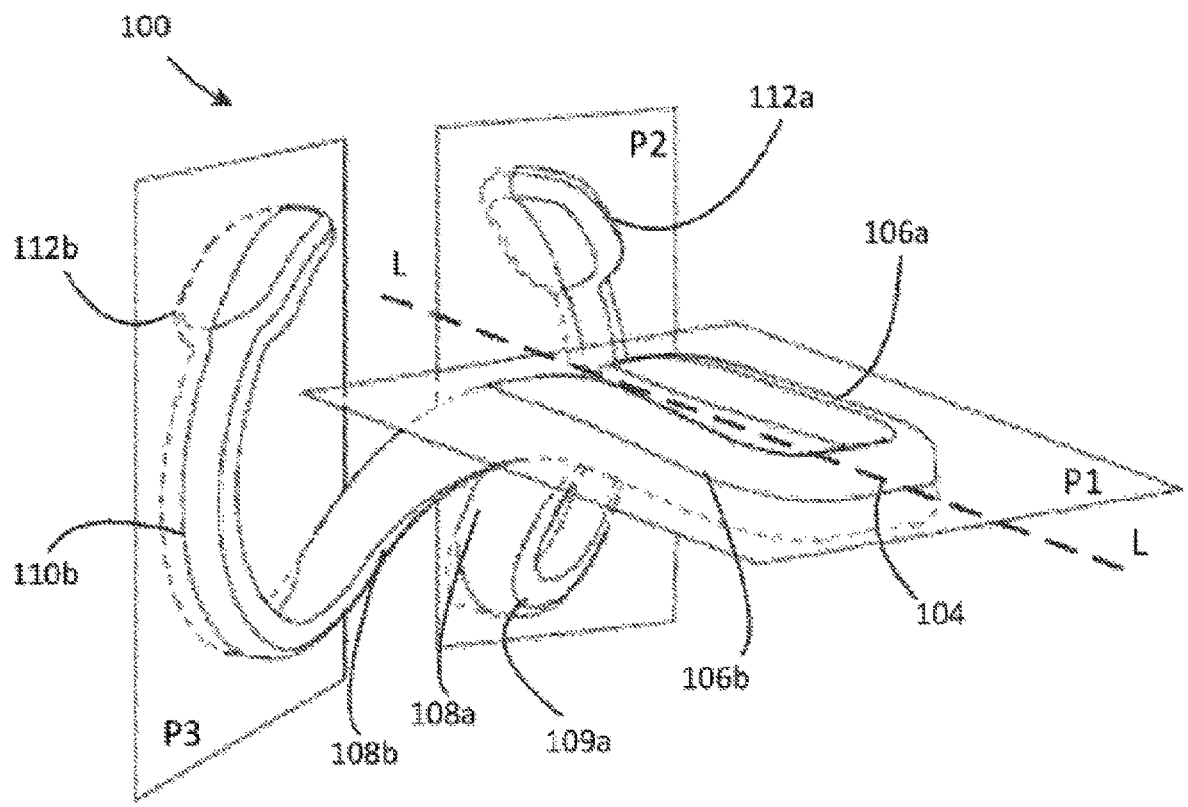
Figure 1C:
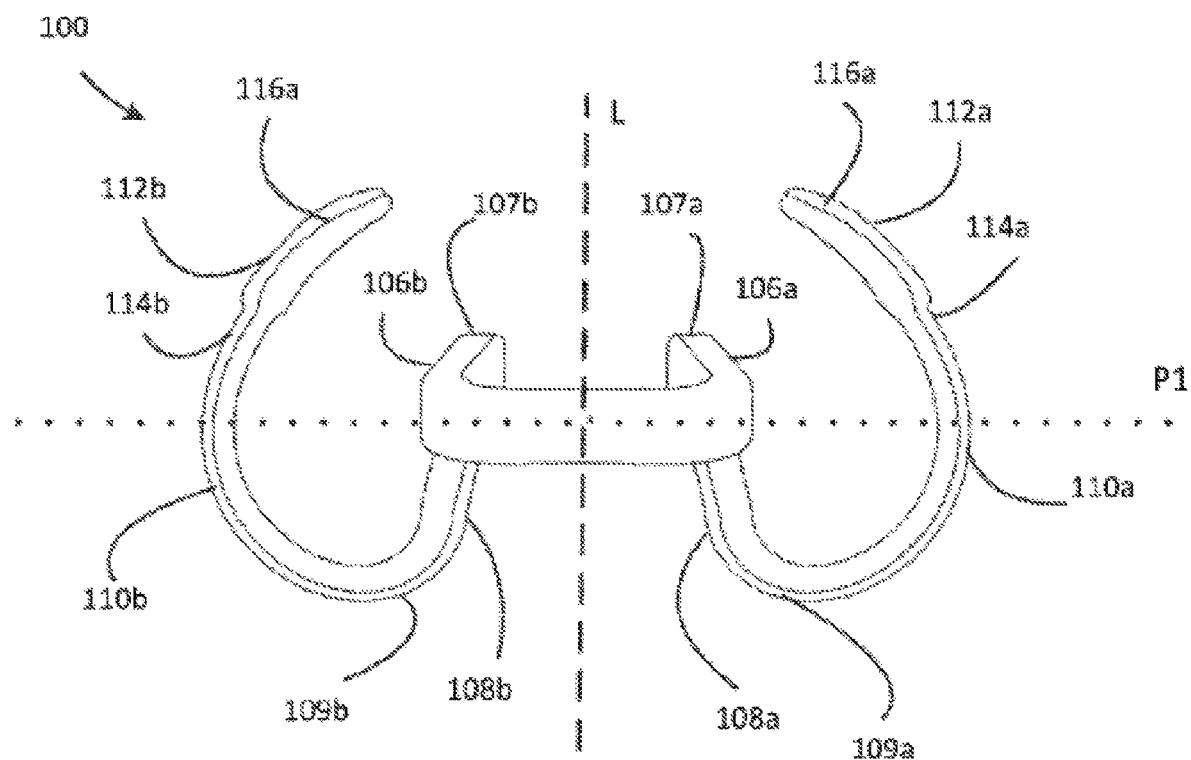
Figure 1D:
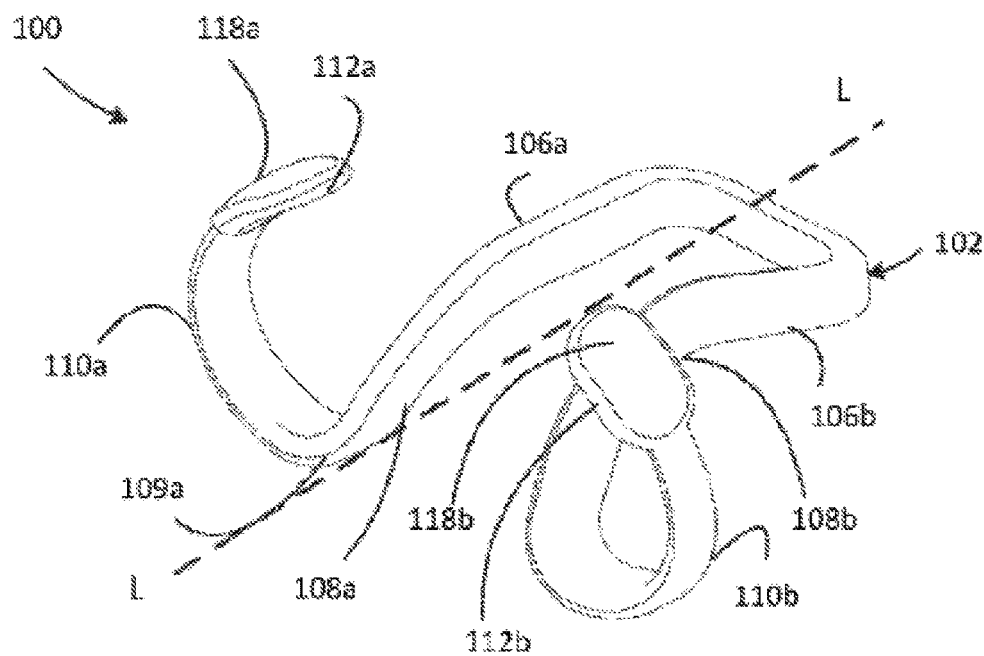
Figure 1E:
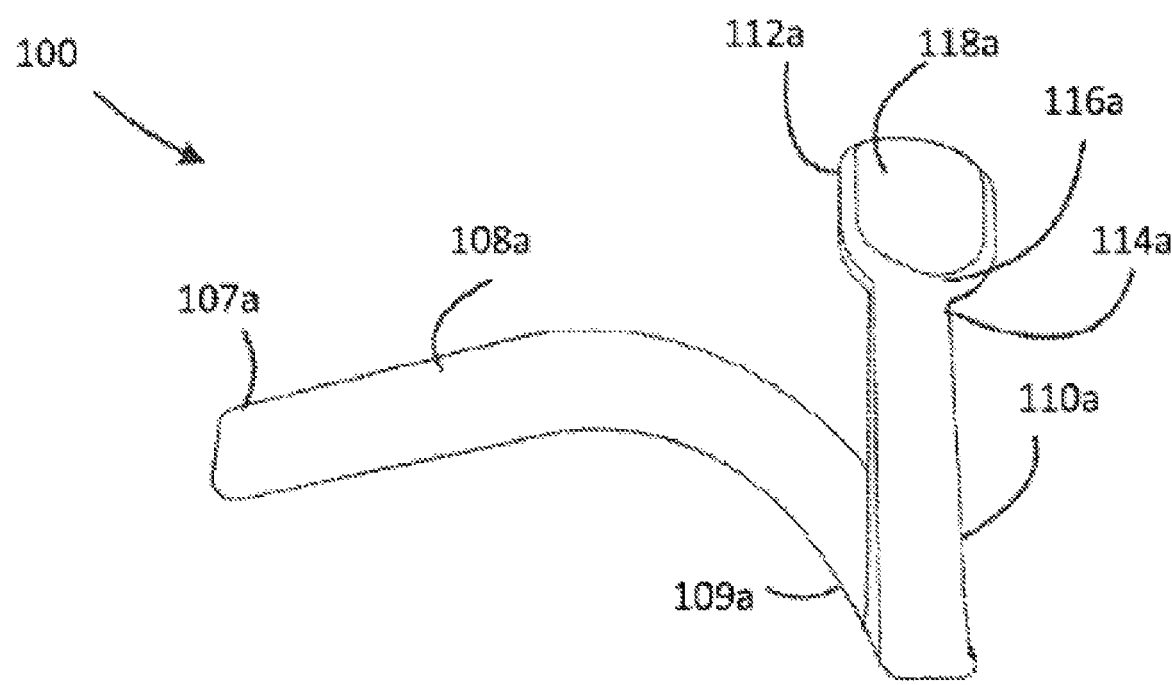
Figure 2:
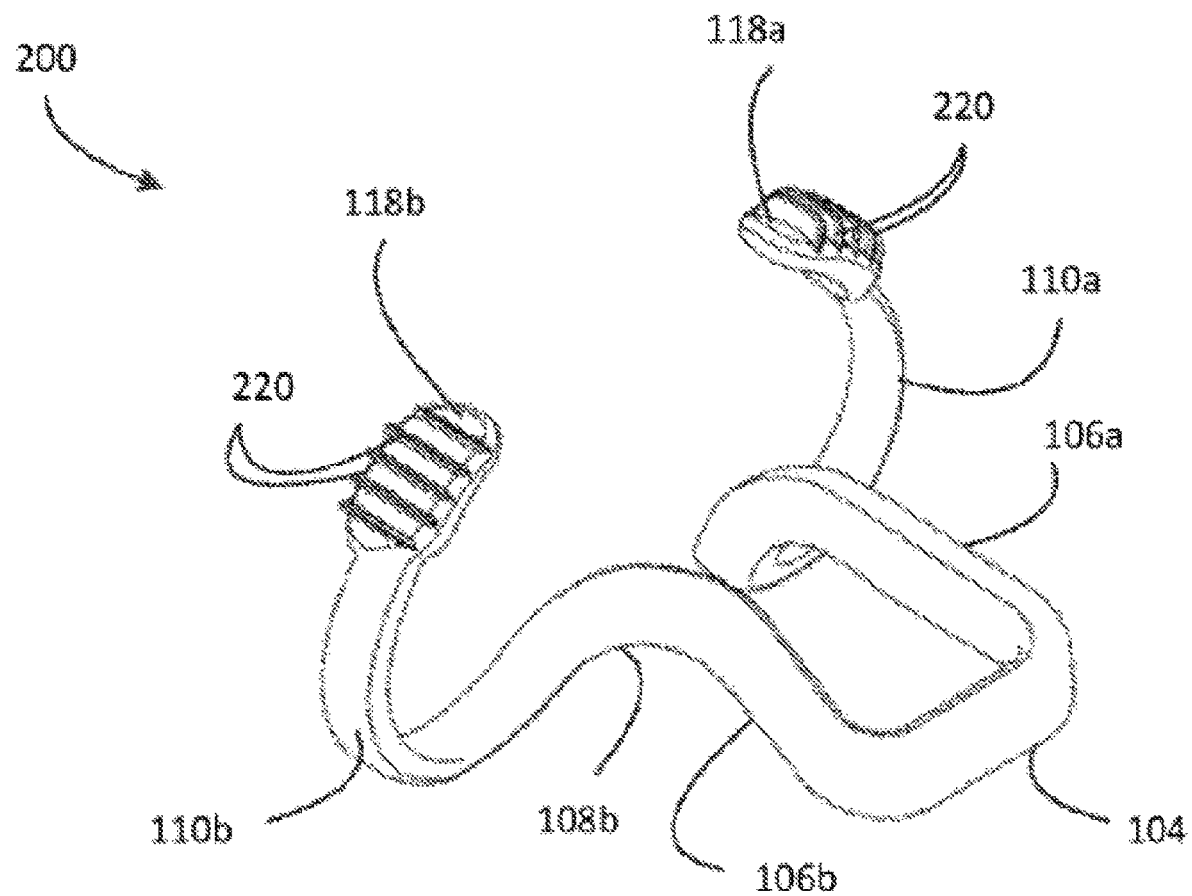
Figure 3A:
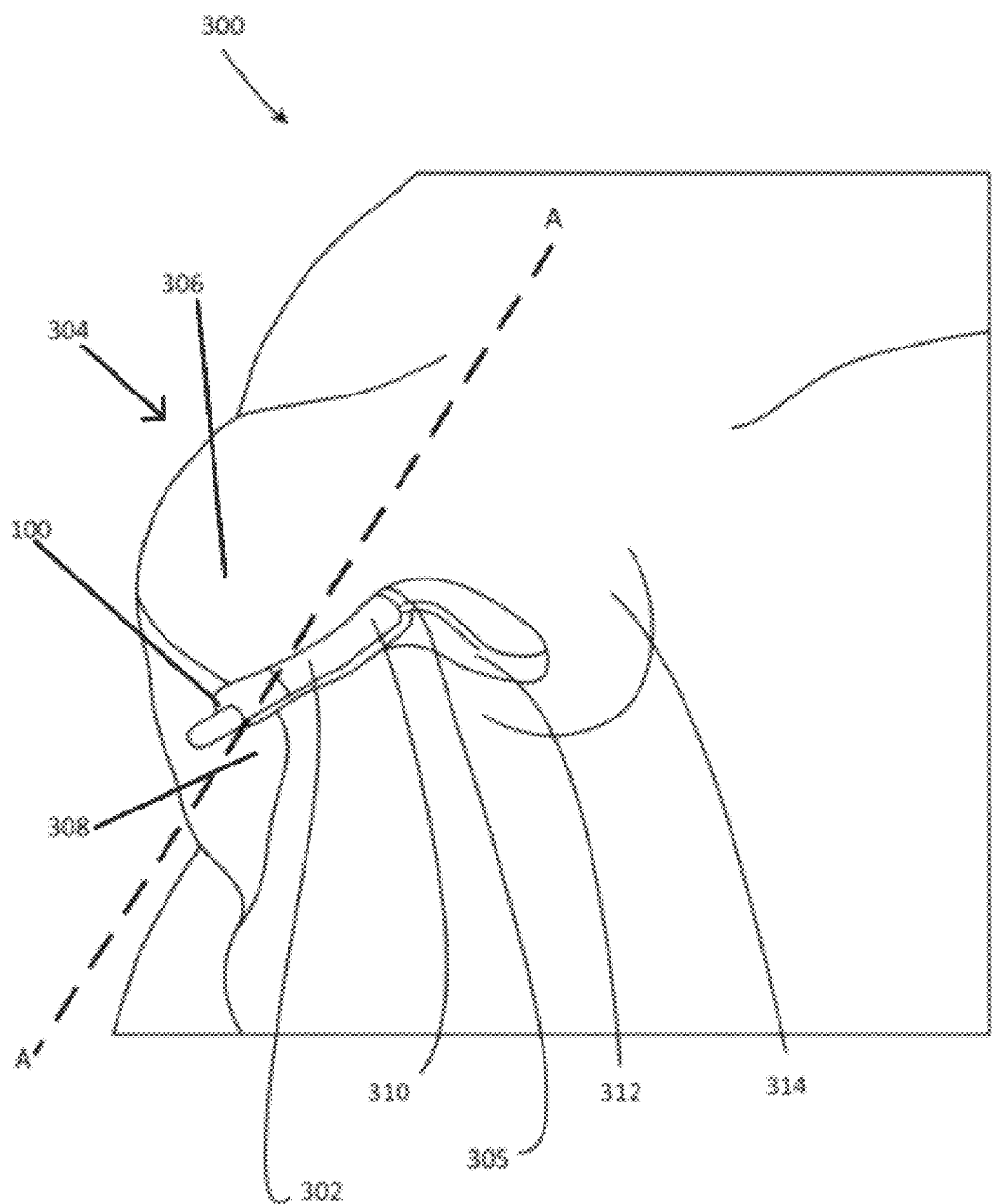
Figure 3B:
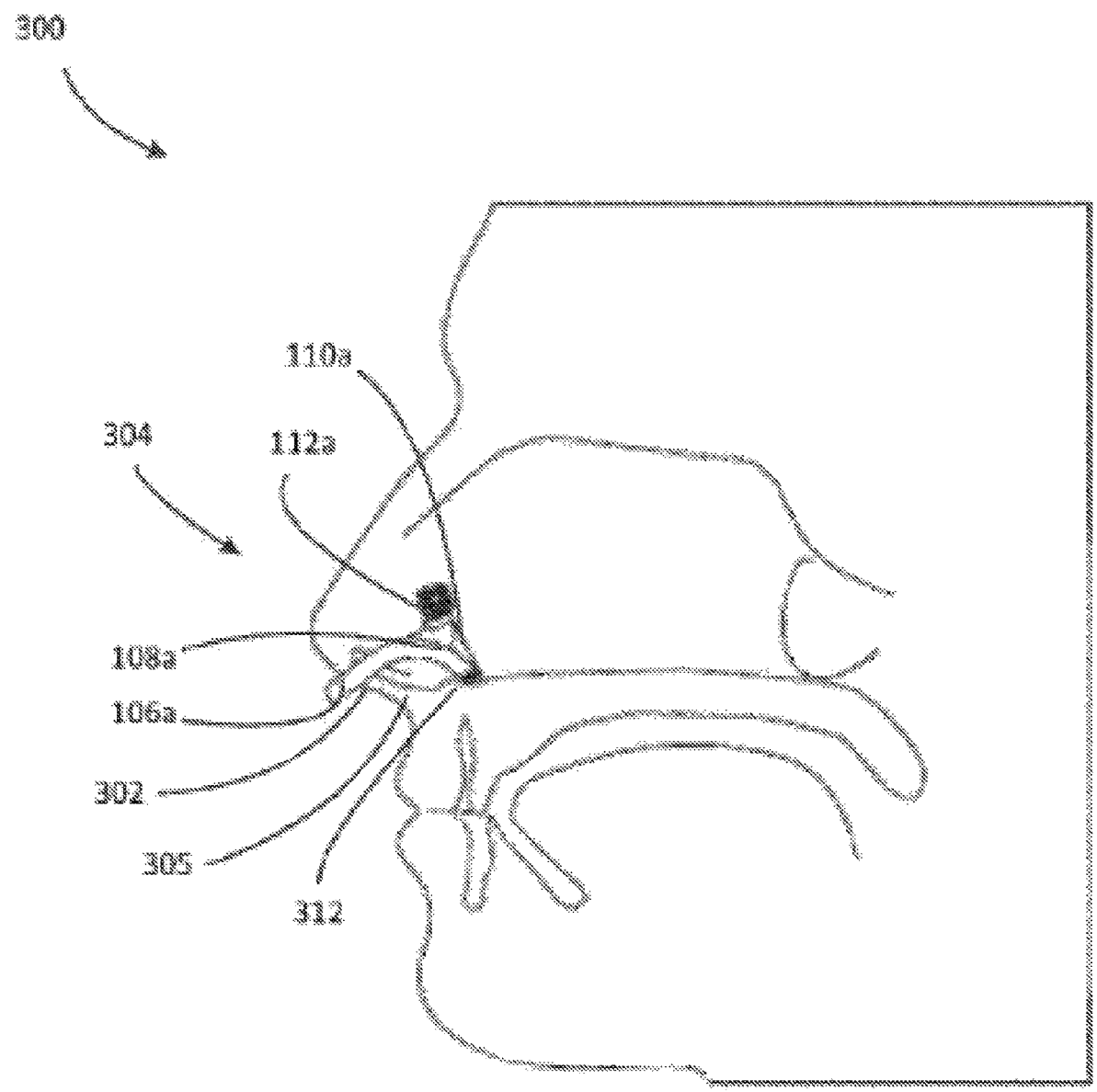
Figure 4A:
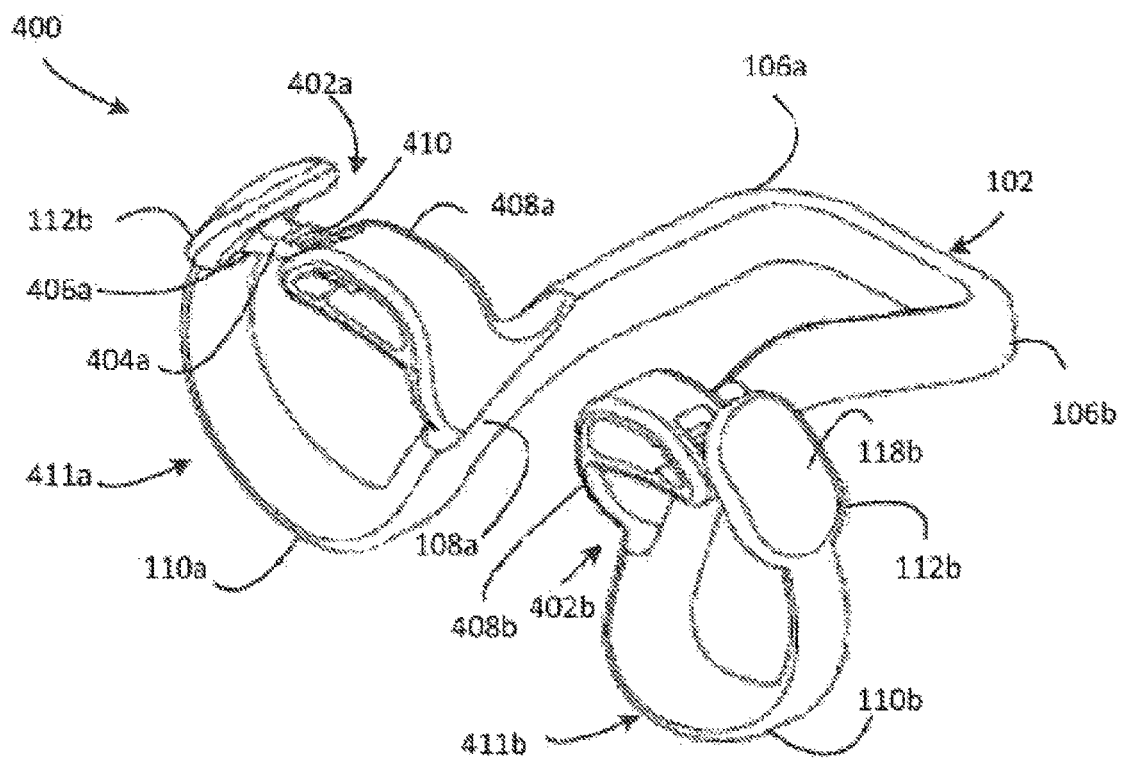
Figure 4B:
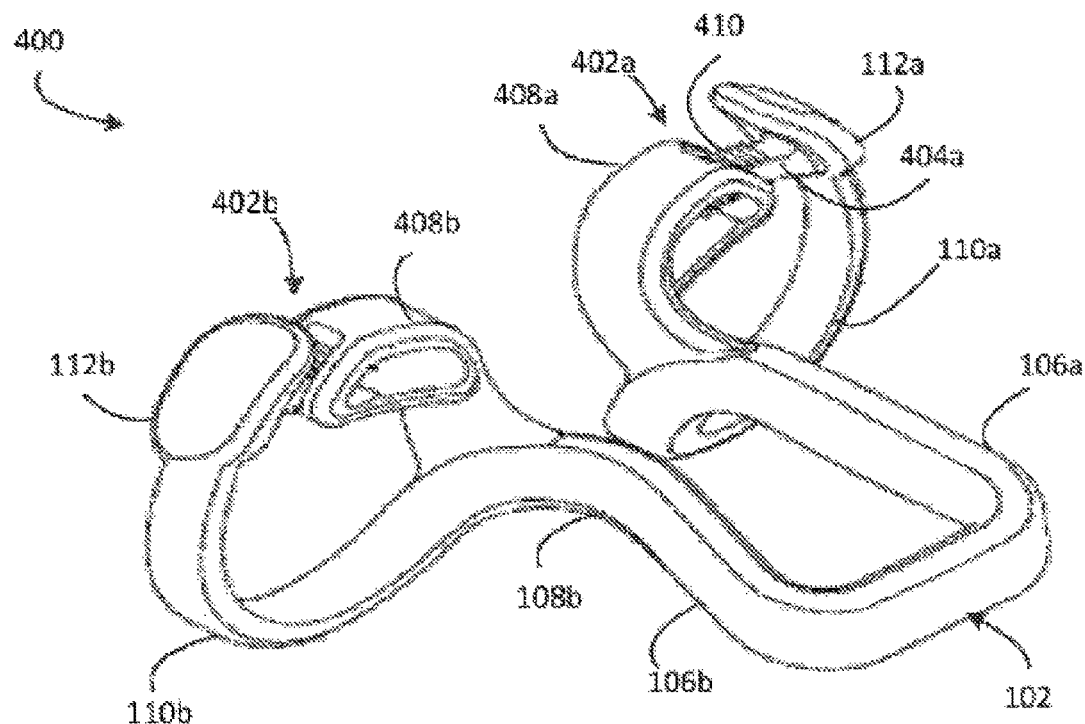
Figure 4C:
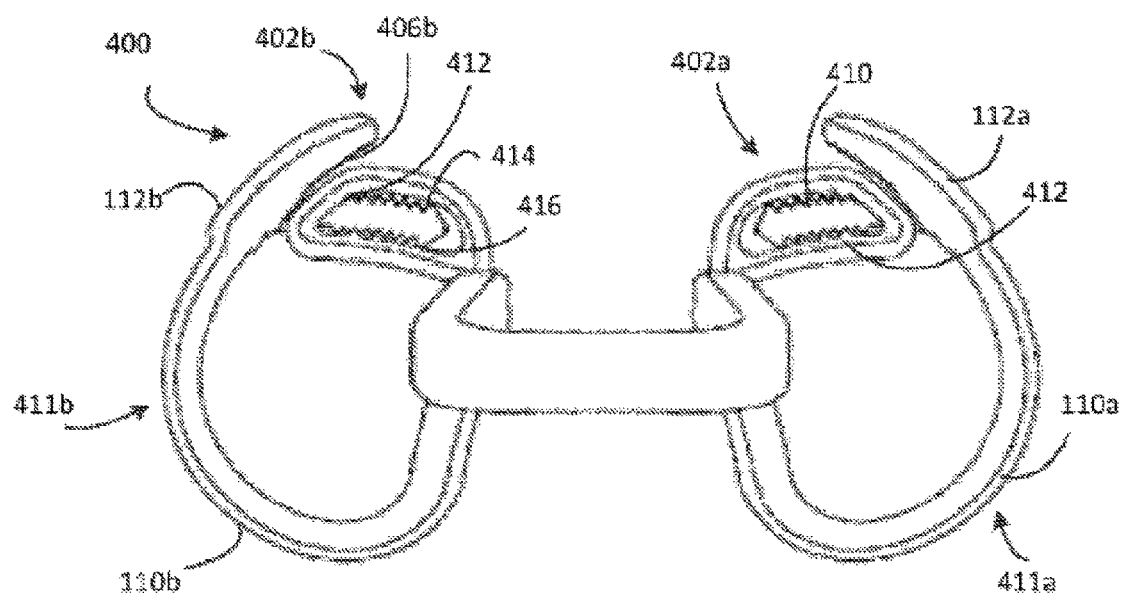
Figure 4D:
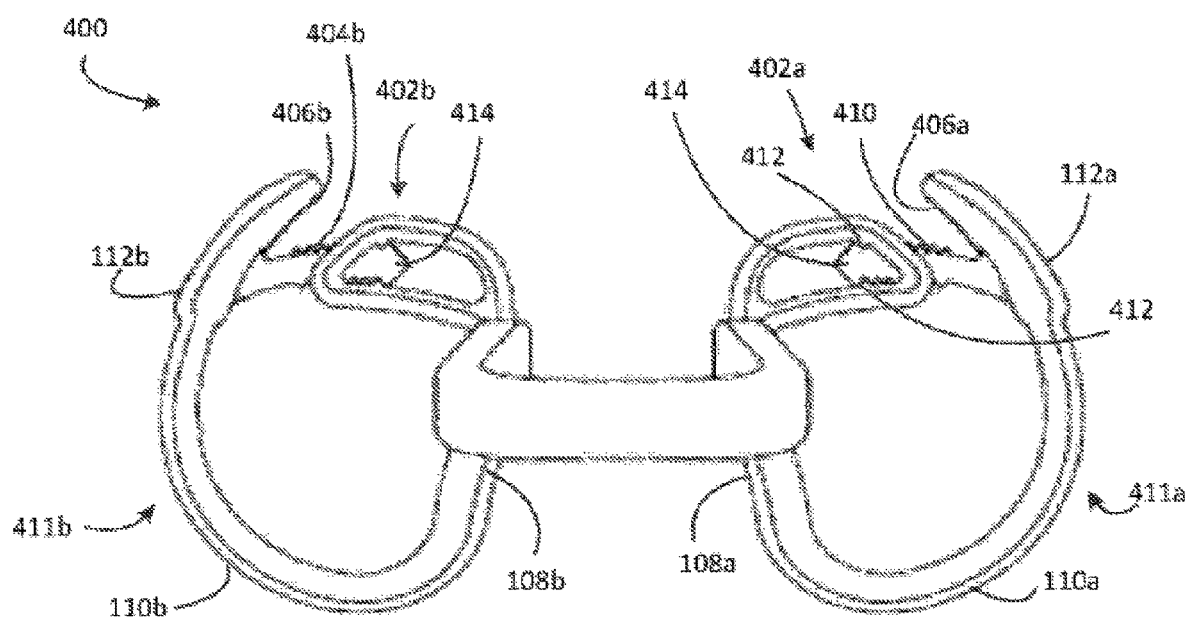
Figure 5:
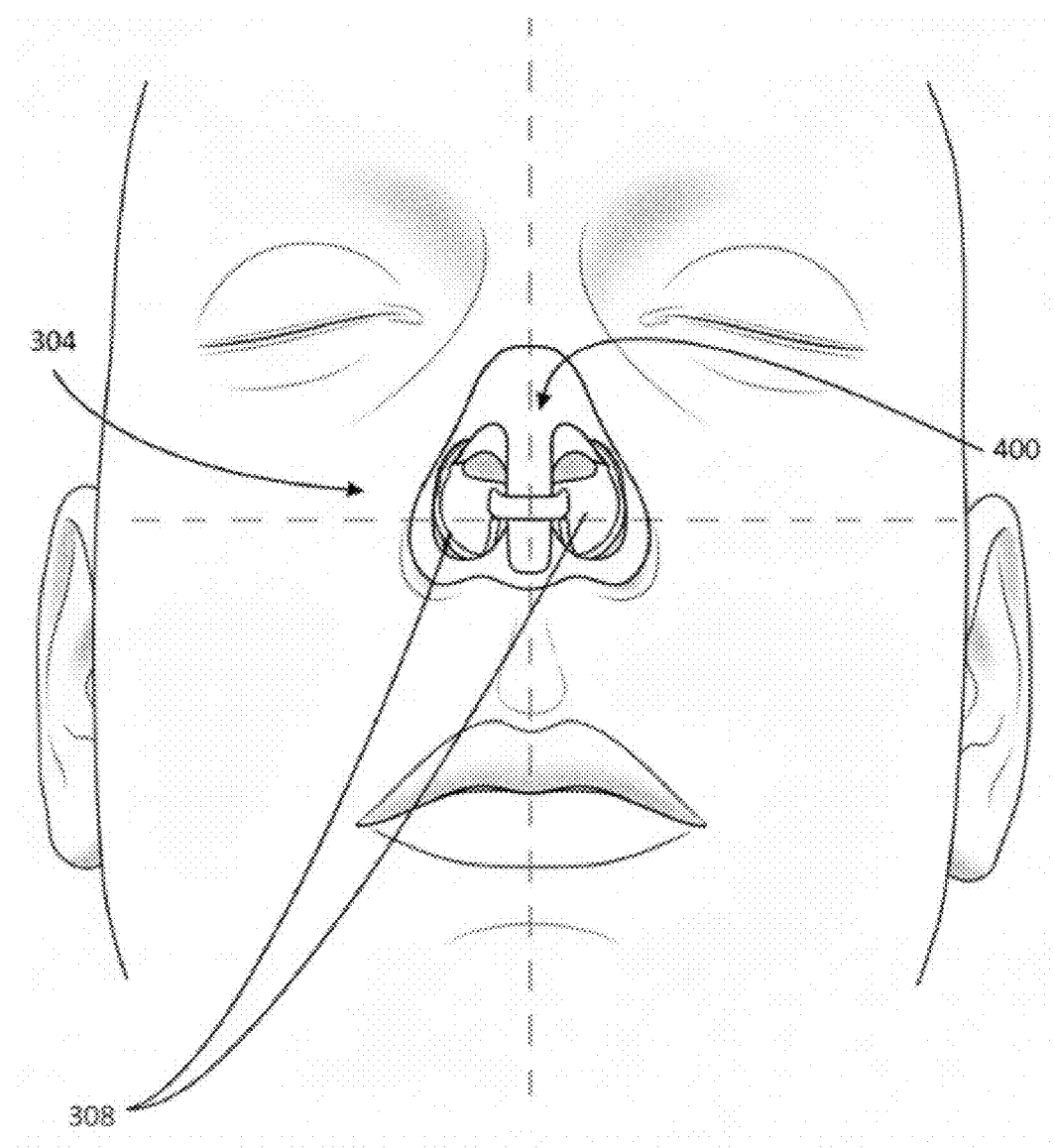
Figure 6A:
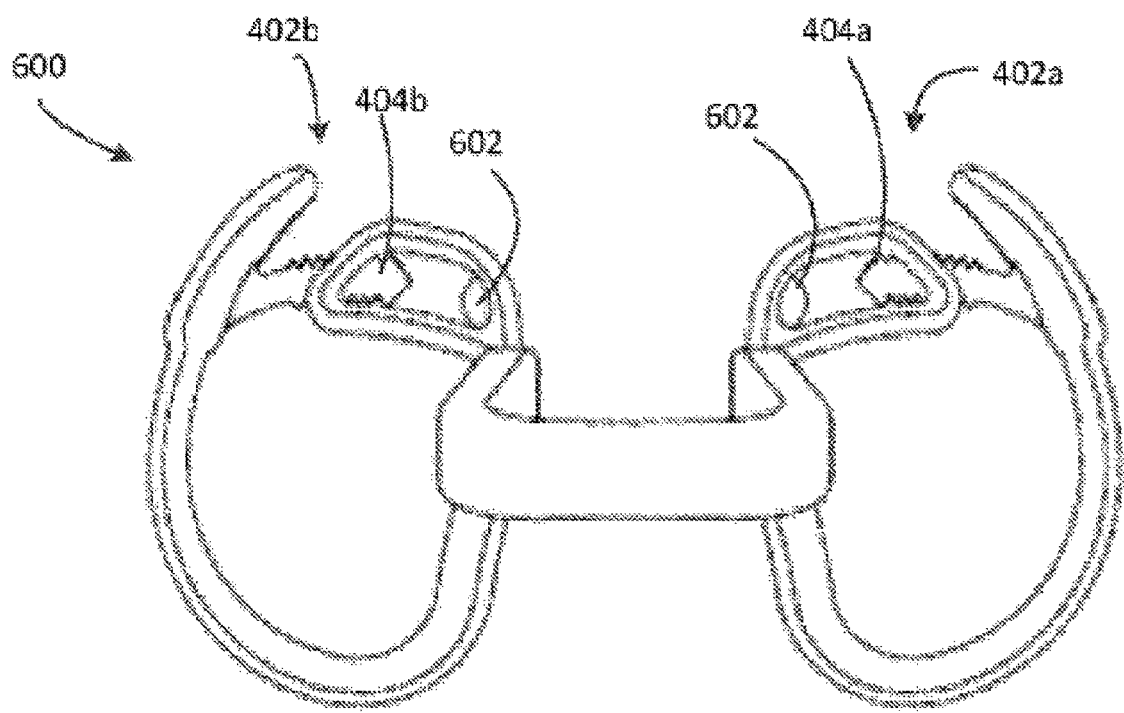
Figure 6B:
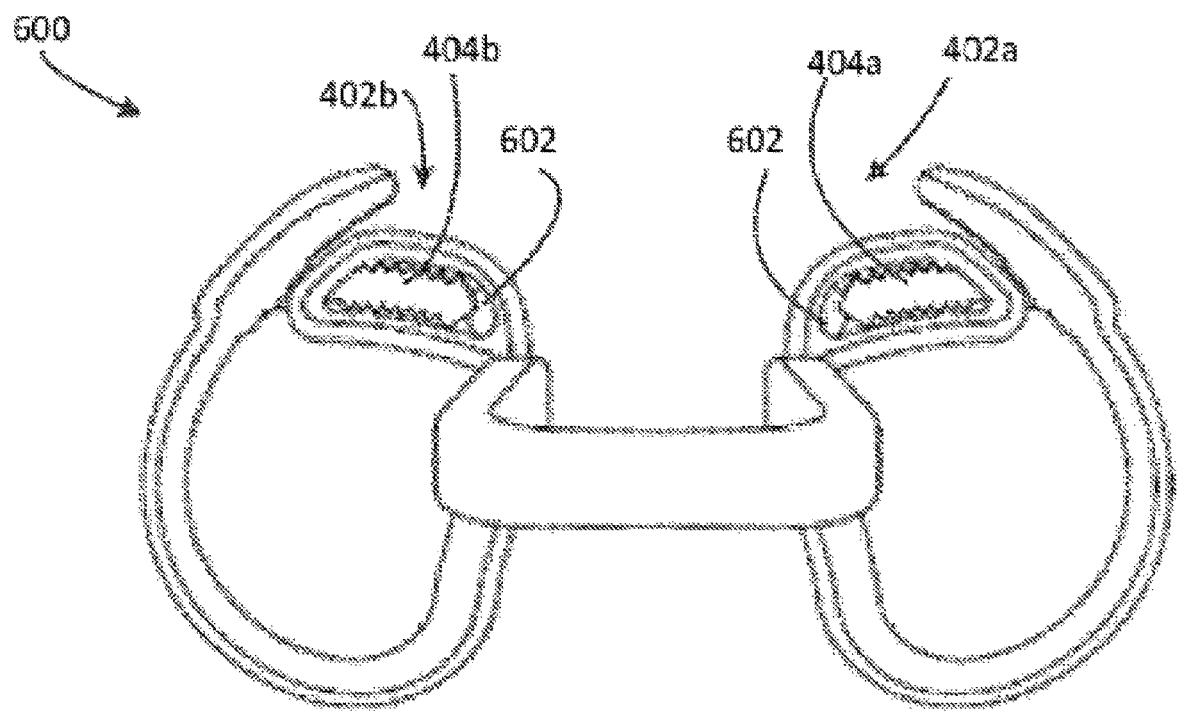
Figure 7A:
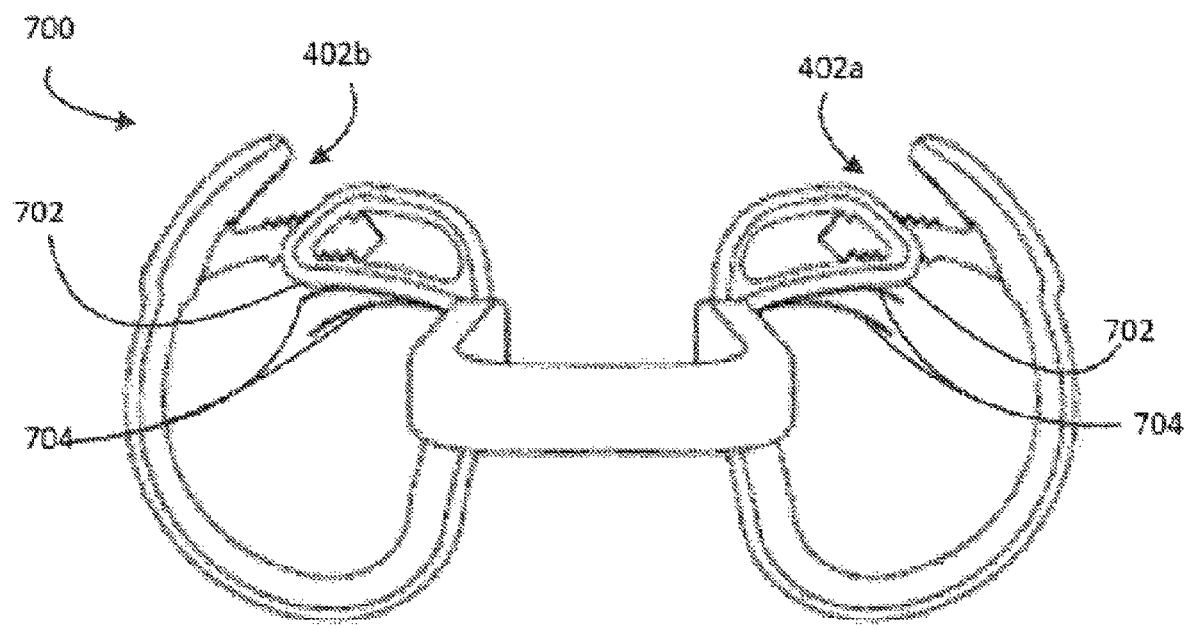
Figure 7B:
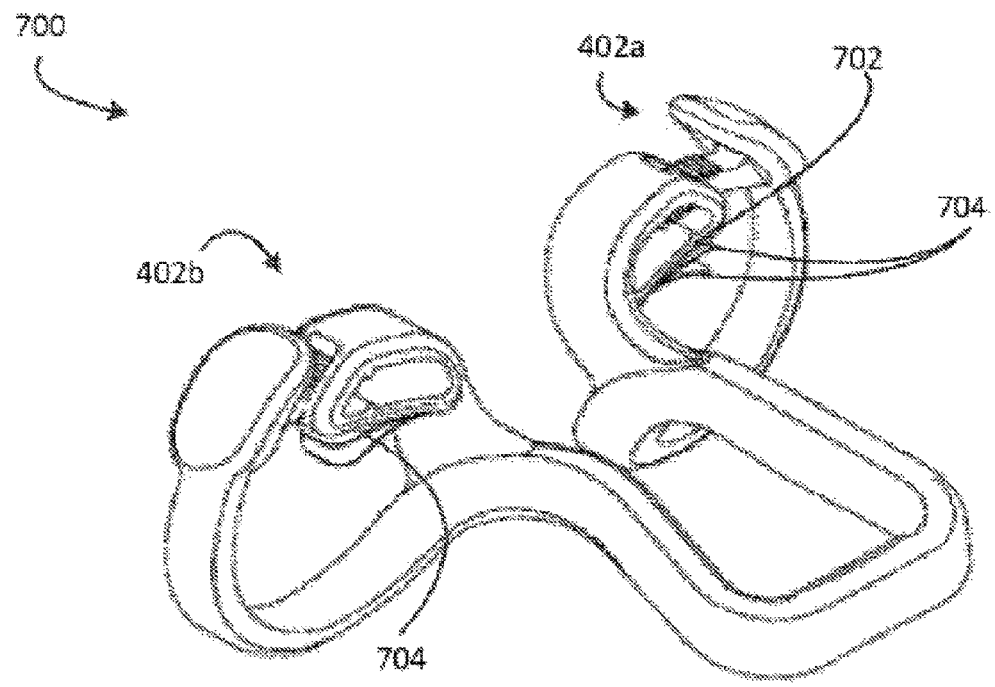
Figure 8A:
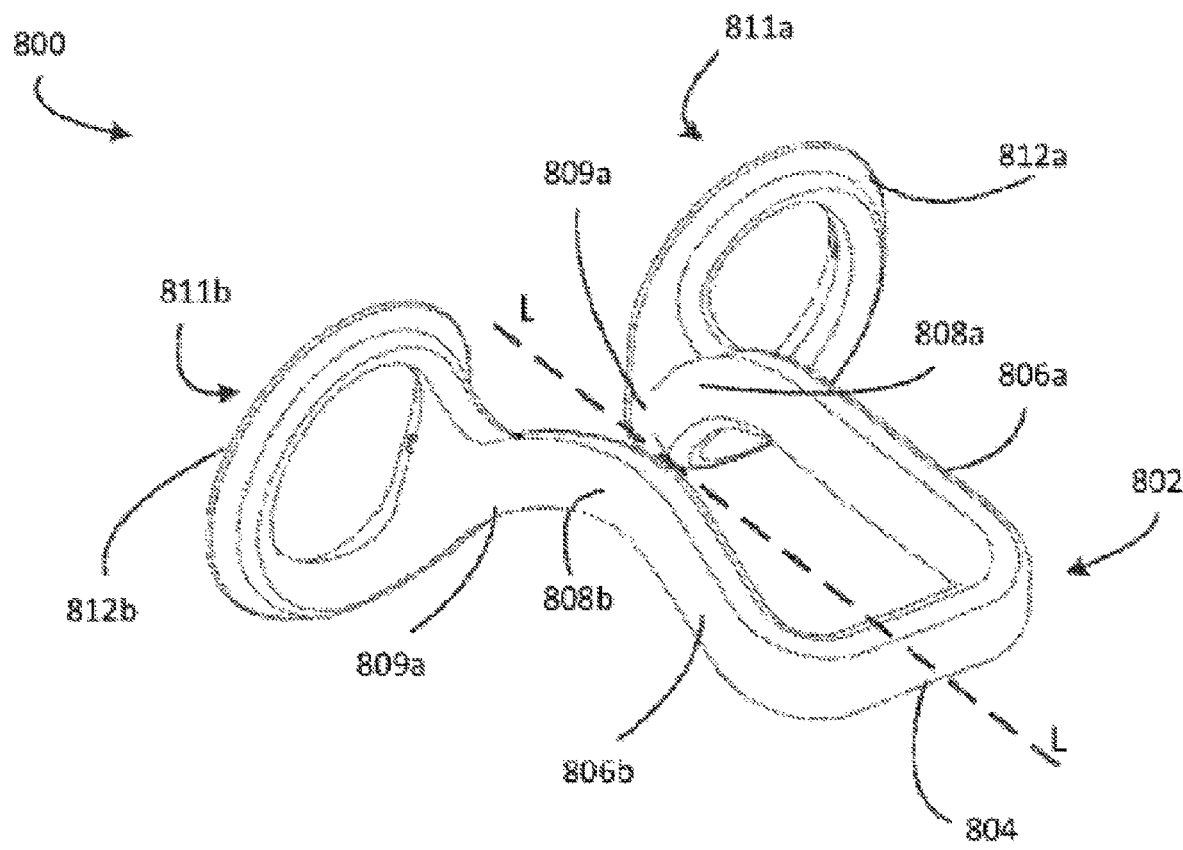
Figure 8B:
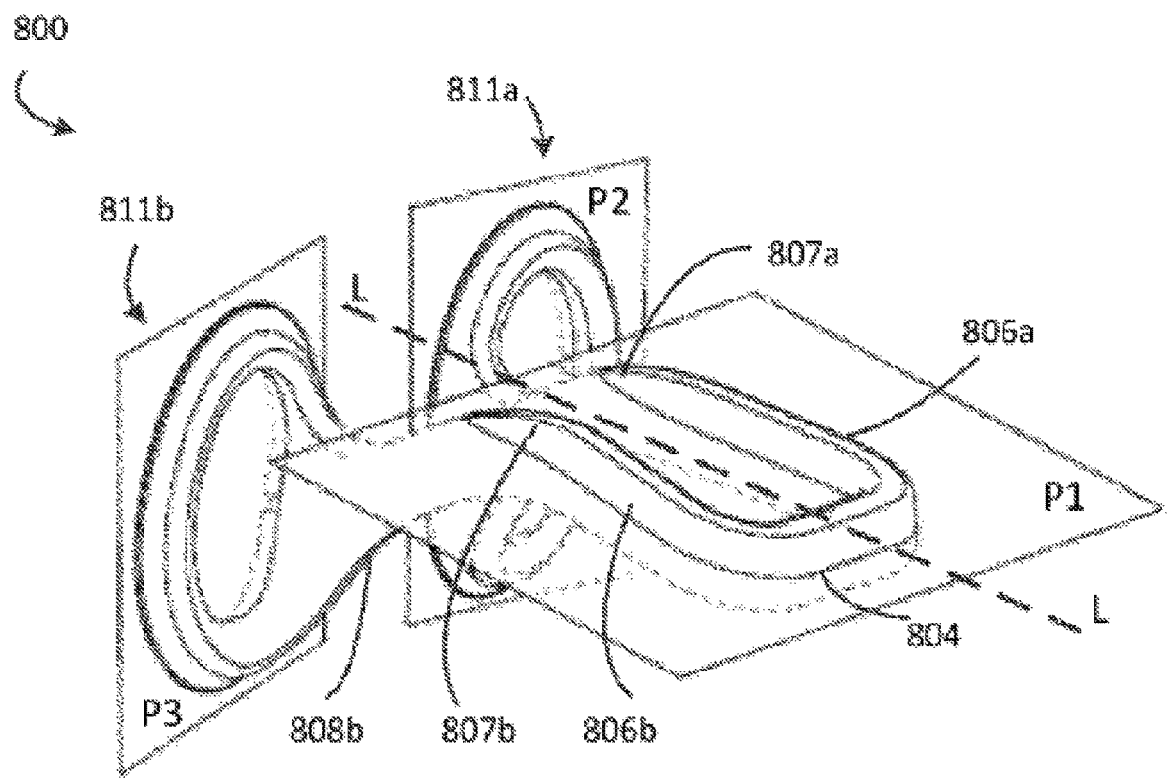
Figure 8C:
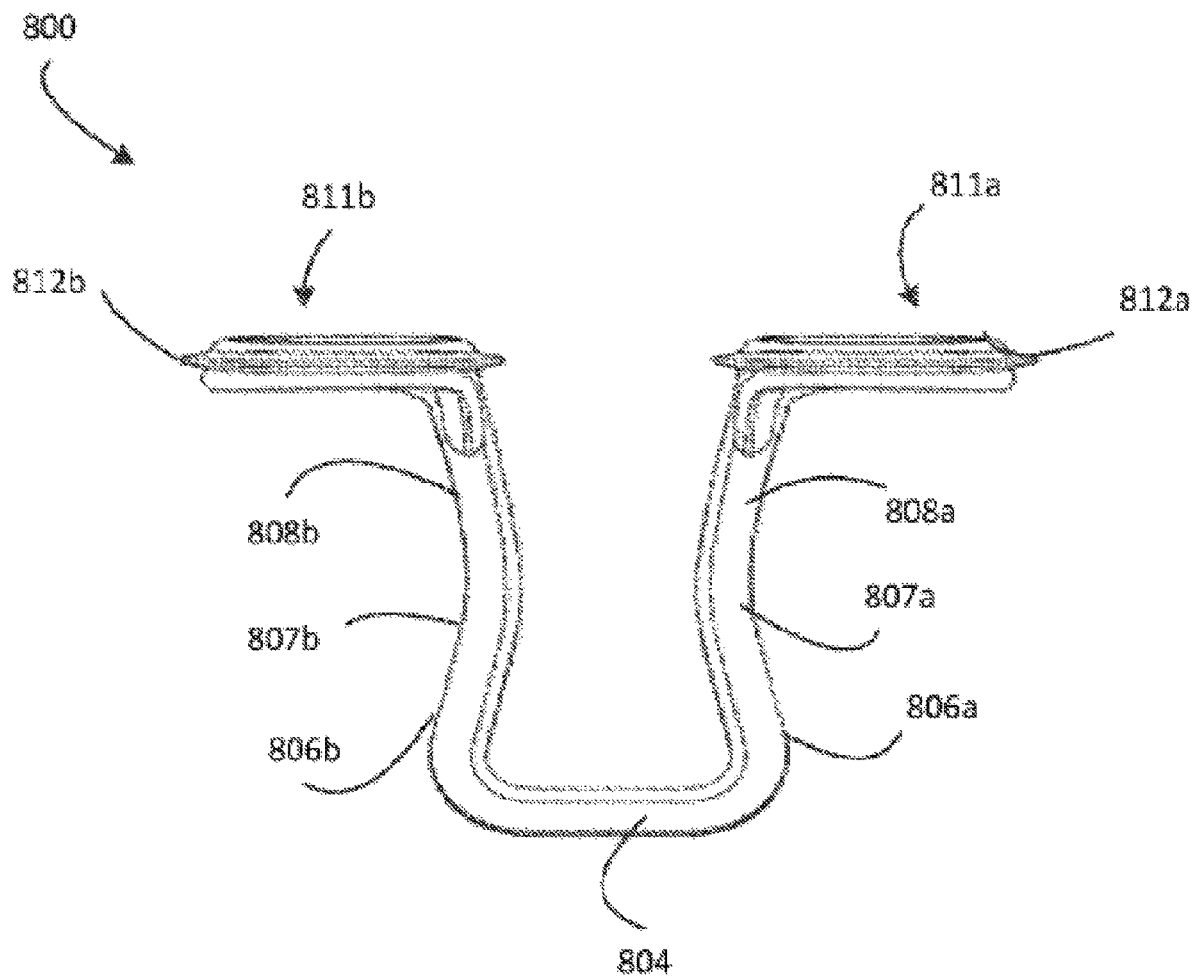
Figure 9:
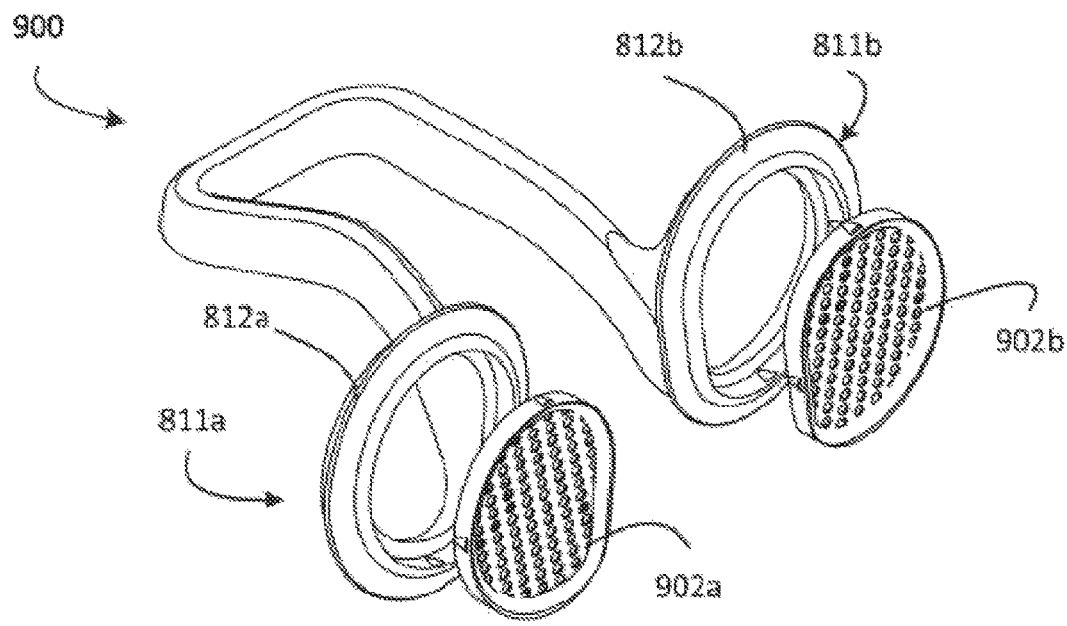
Figure 10:
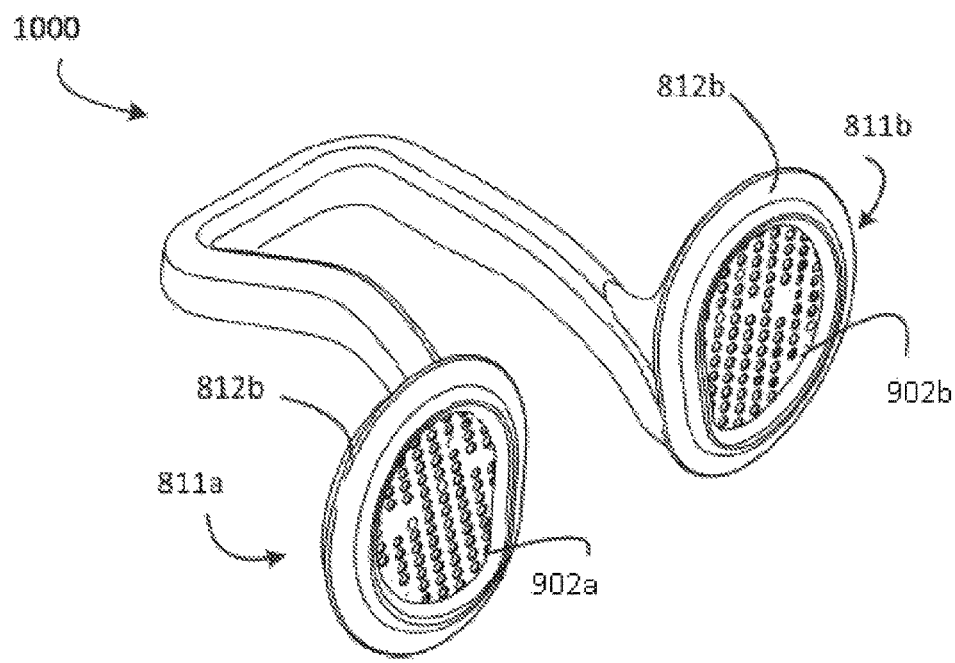
Figure 11:
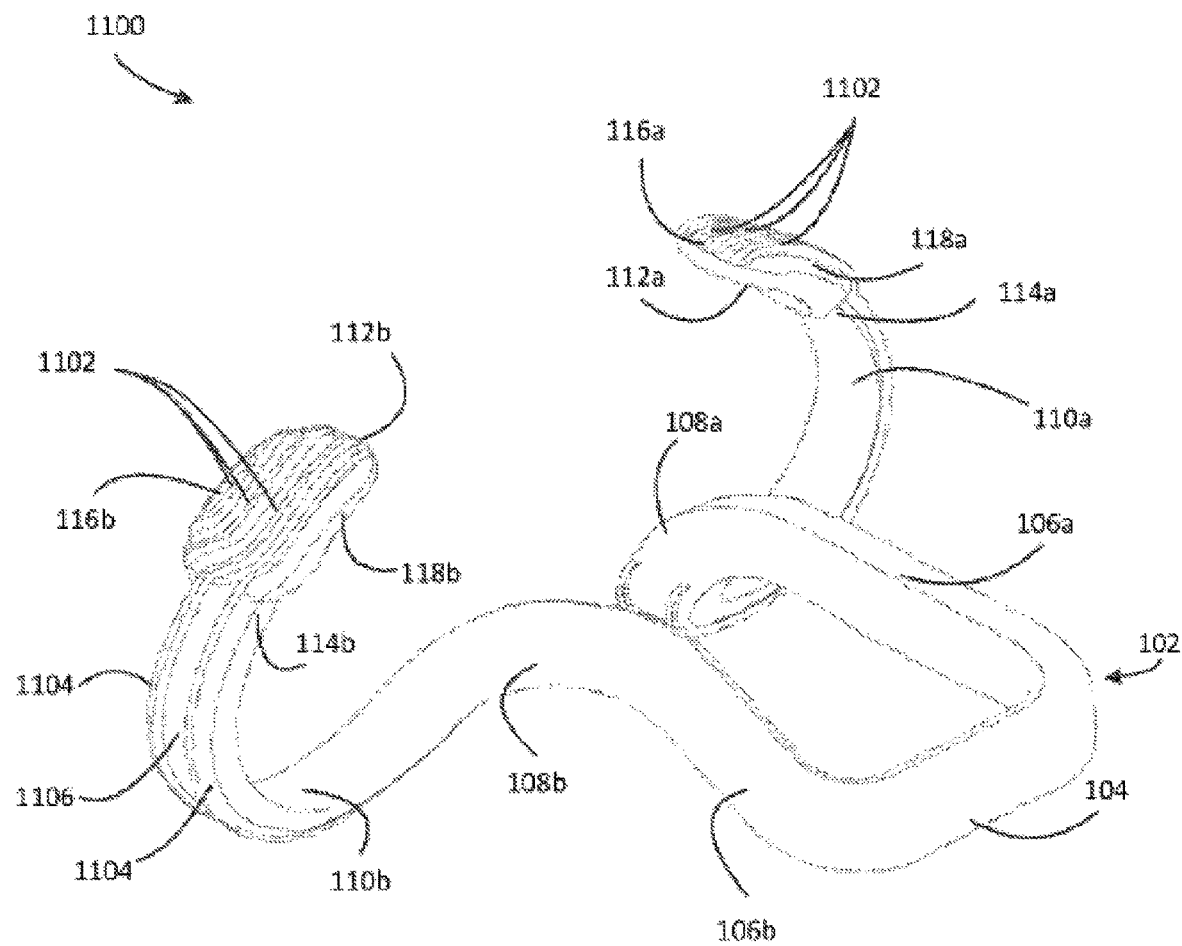
Figure 12A:
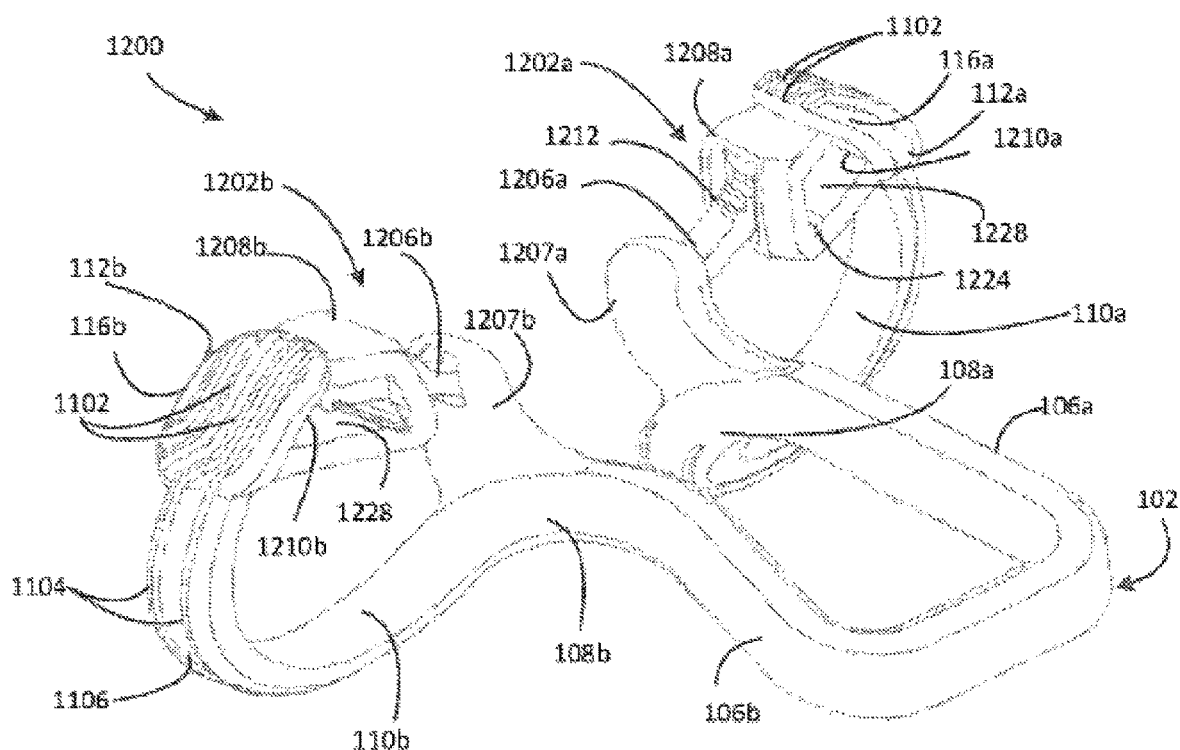
Figure 12B:
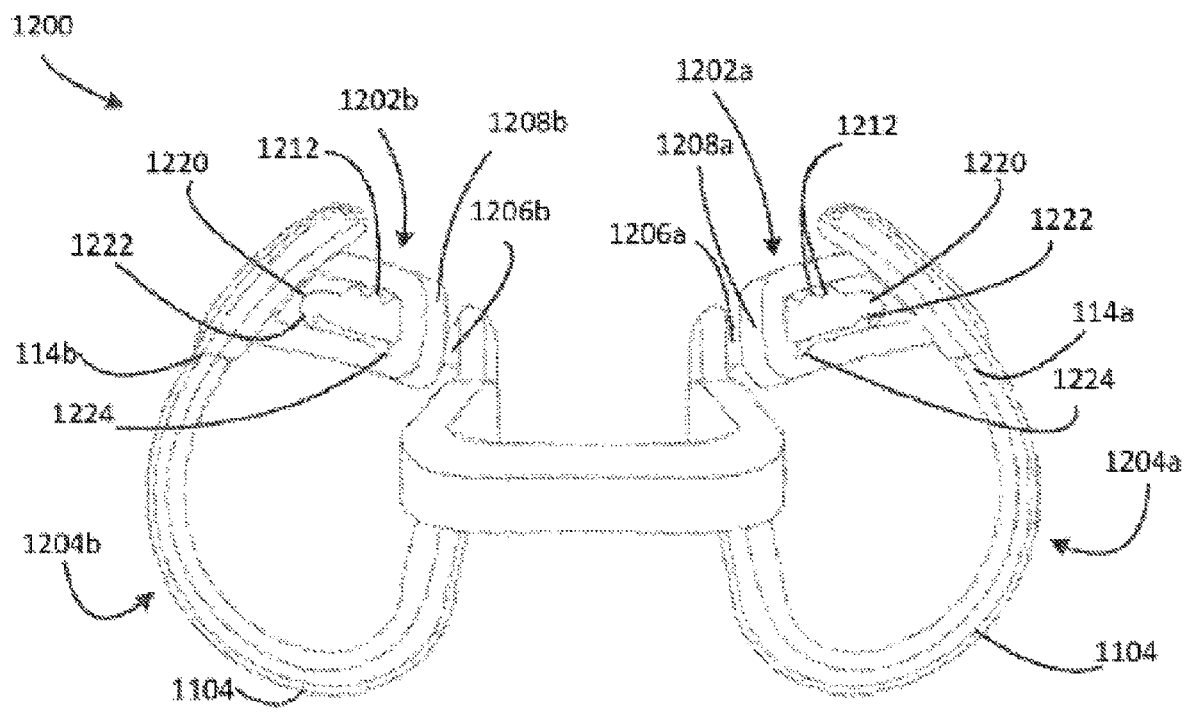
Figure 12C:
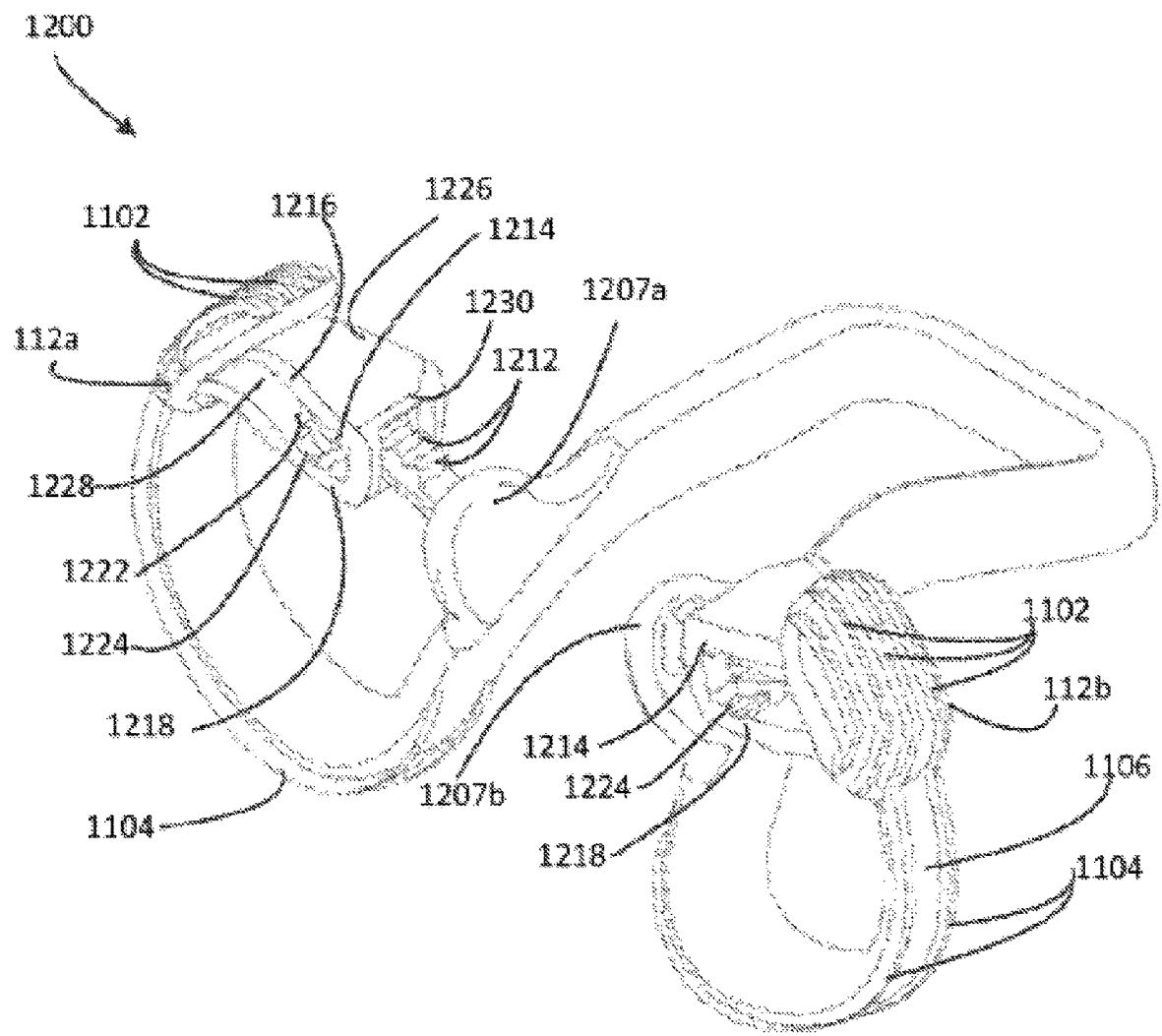
Figure 13A:
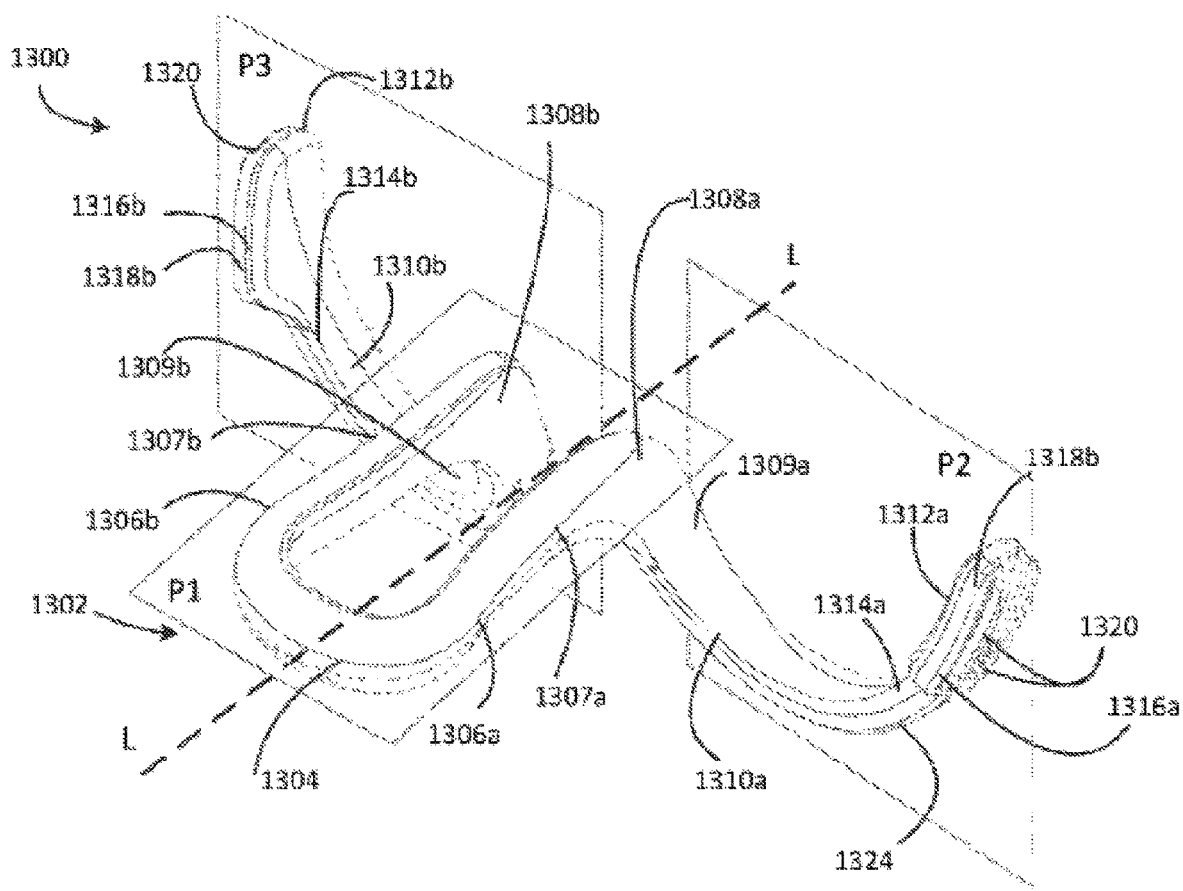
Figure 13B:
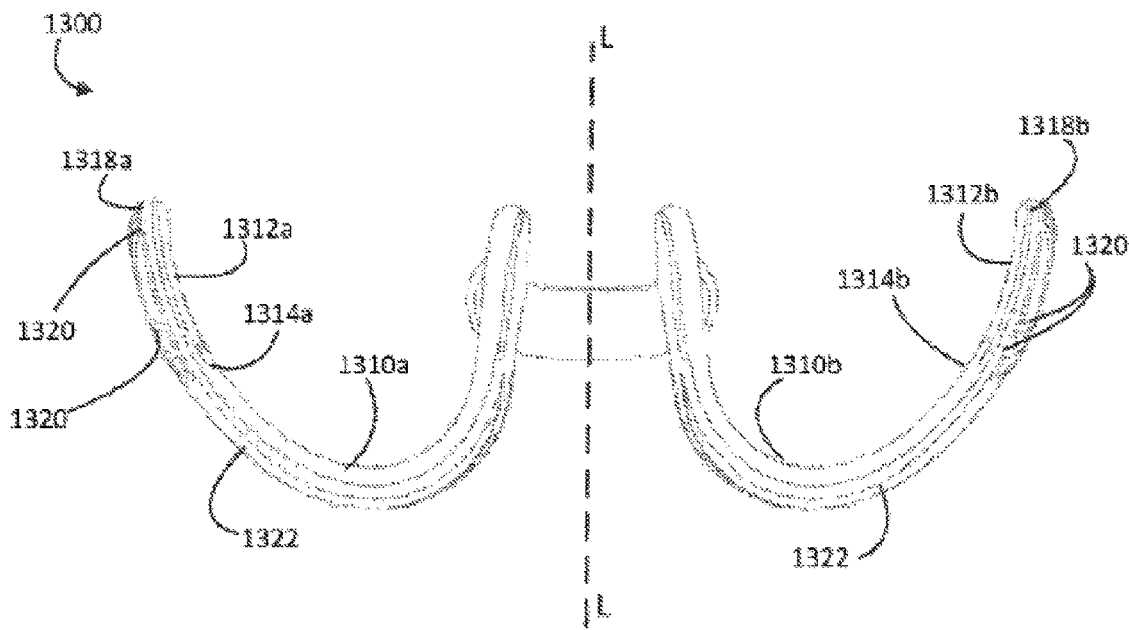
Figure 14A:
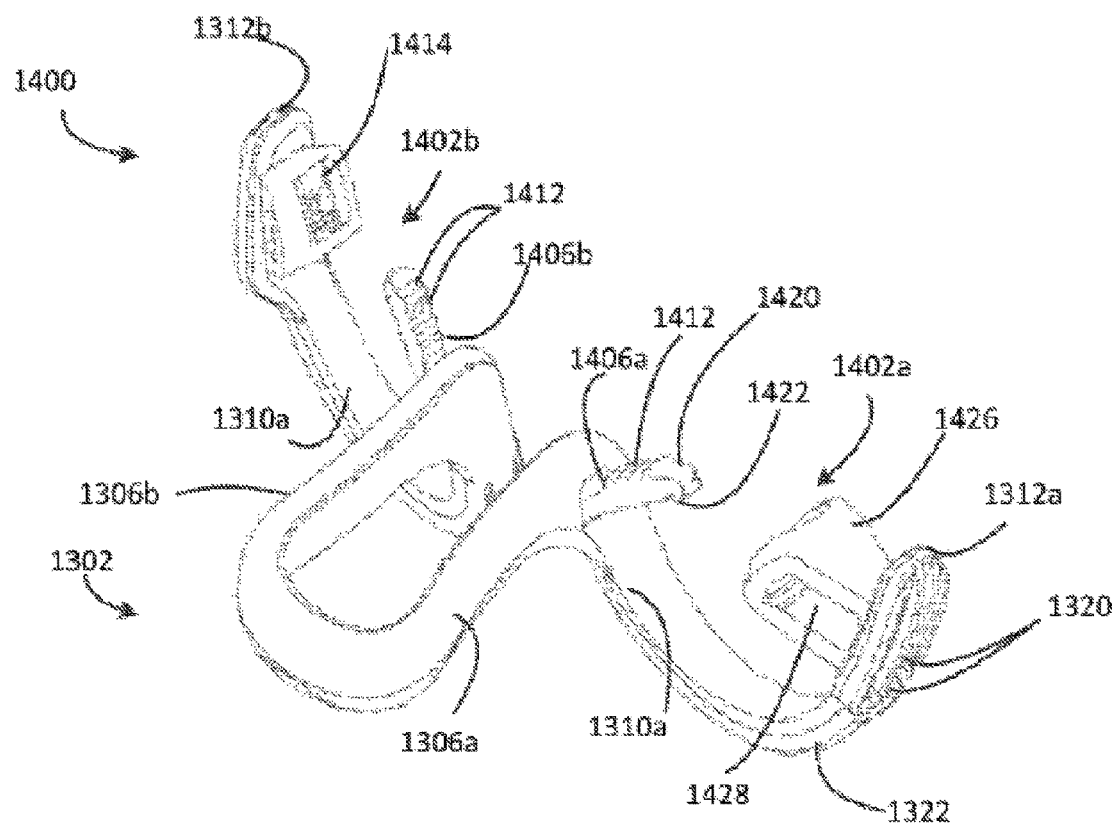
Figure 14B:
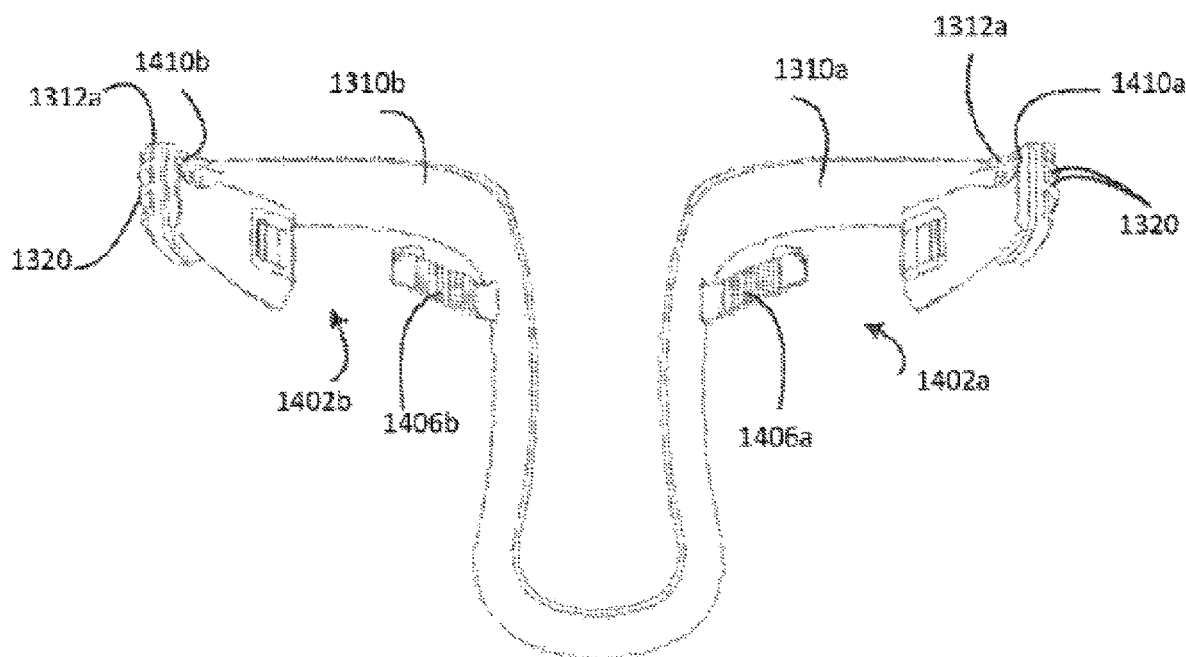
Figure 14C:
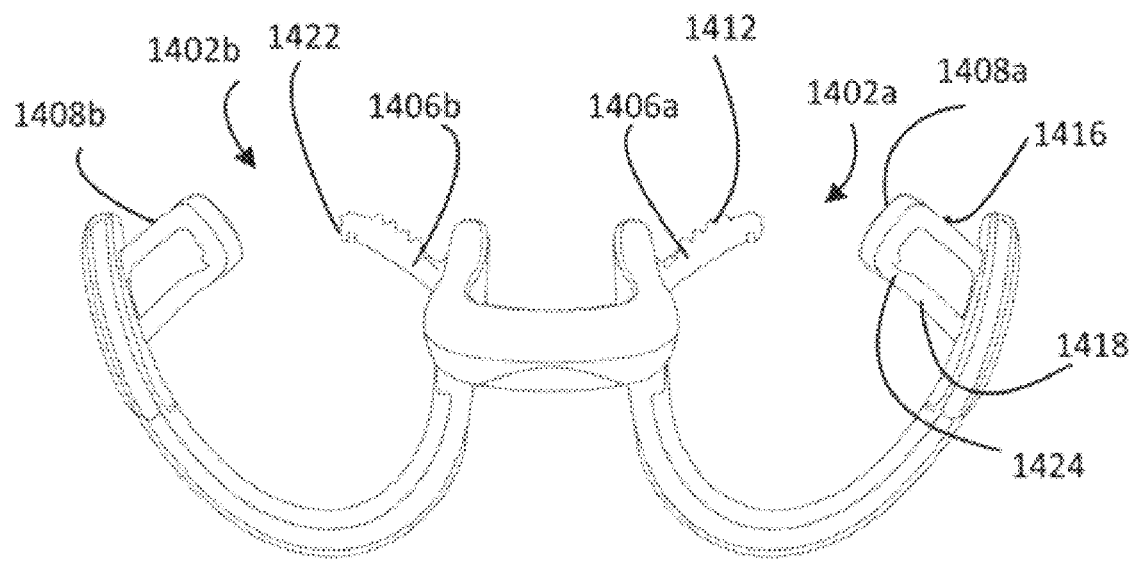
Figure 14D:
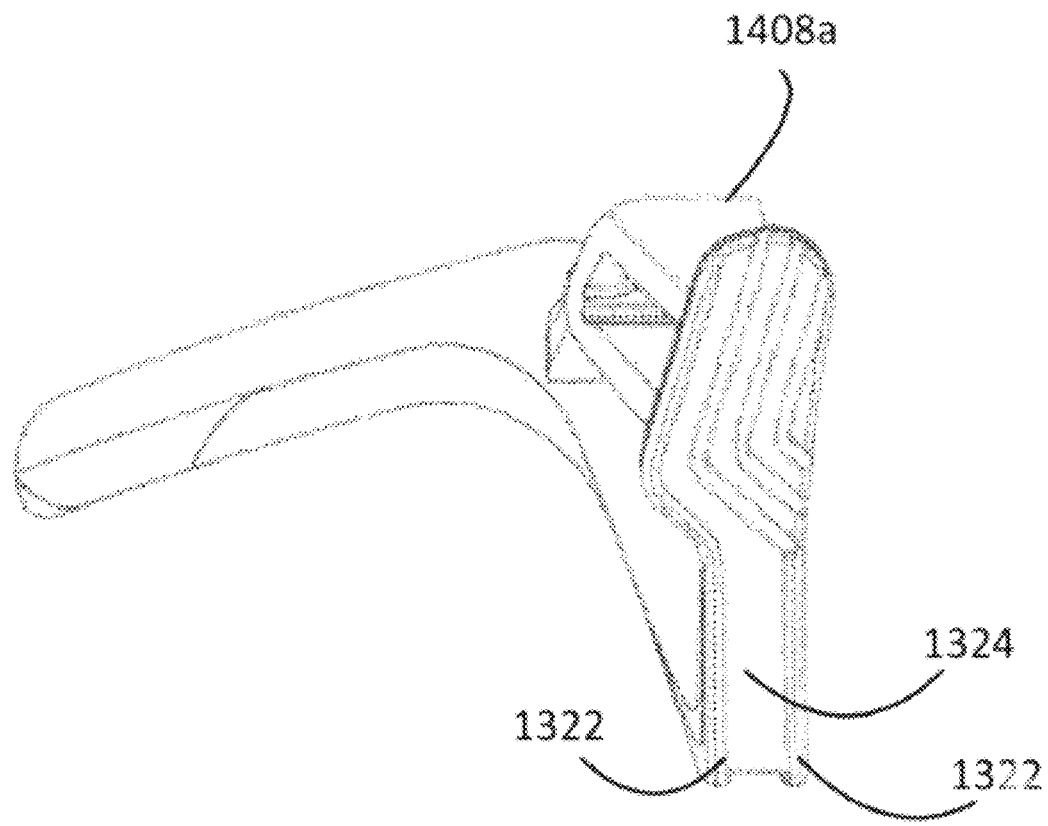
Figure 14E:
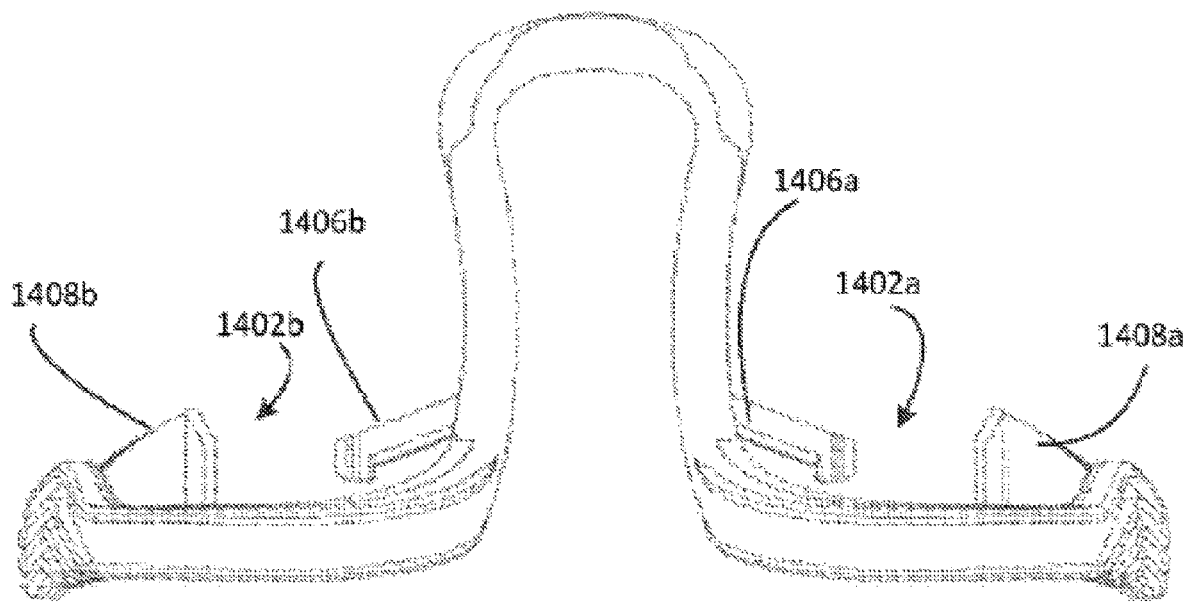
Figure 14F:
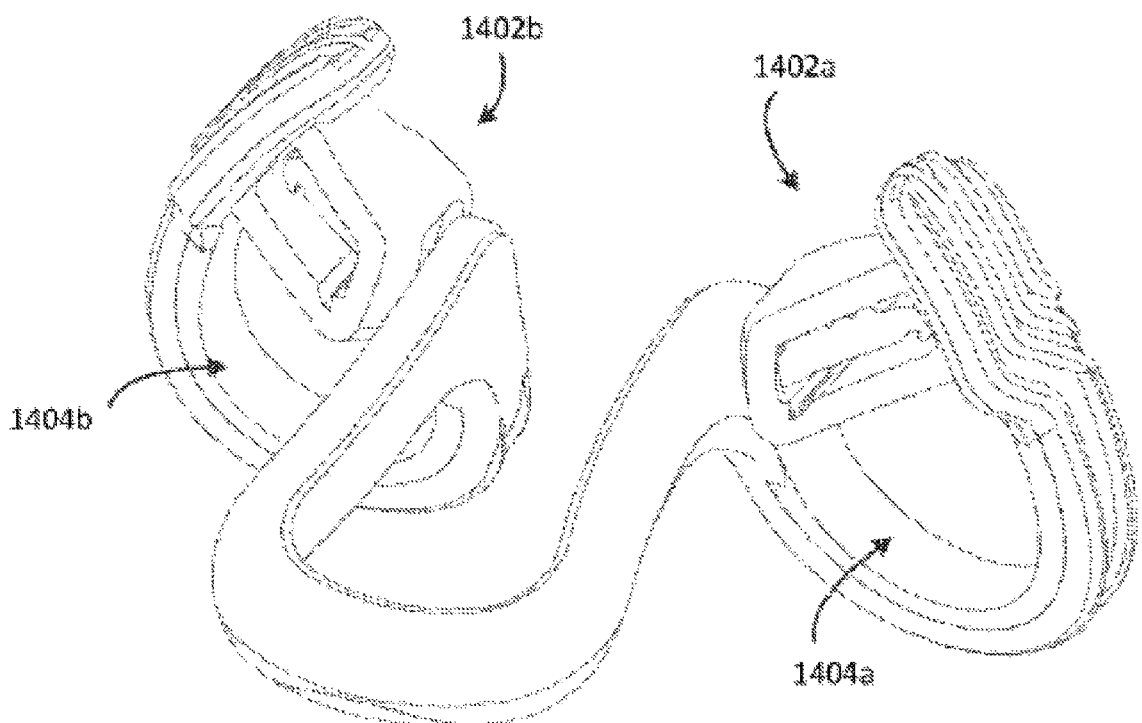
Figure 15:
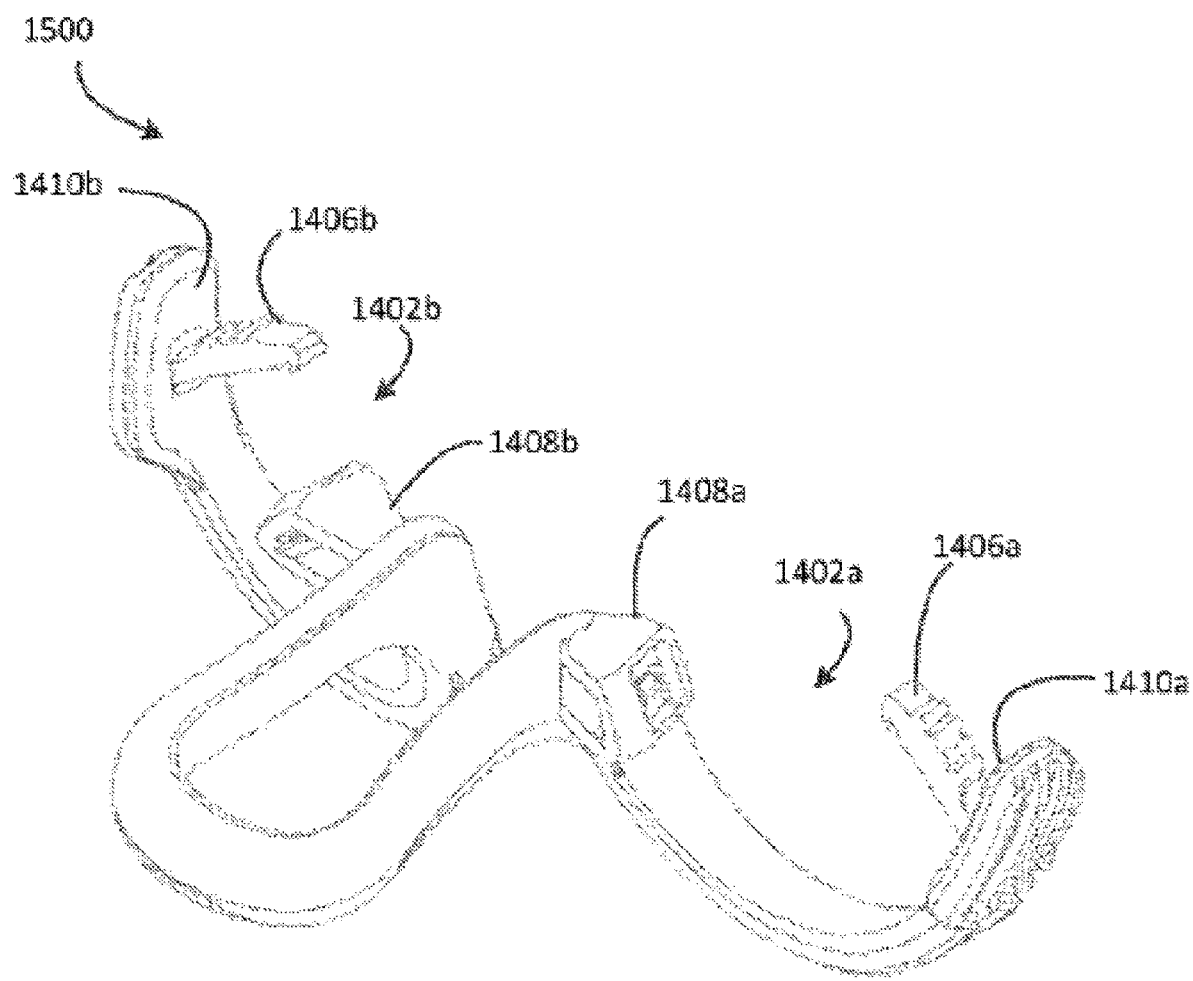
Figure 16:
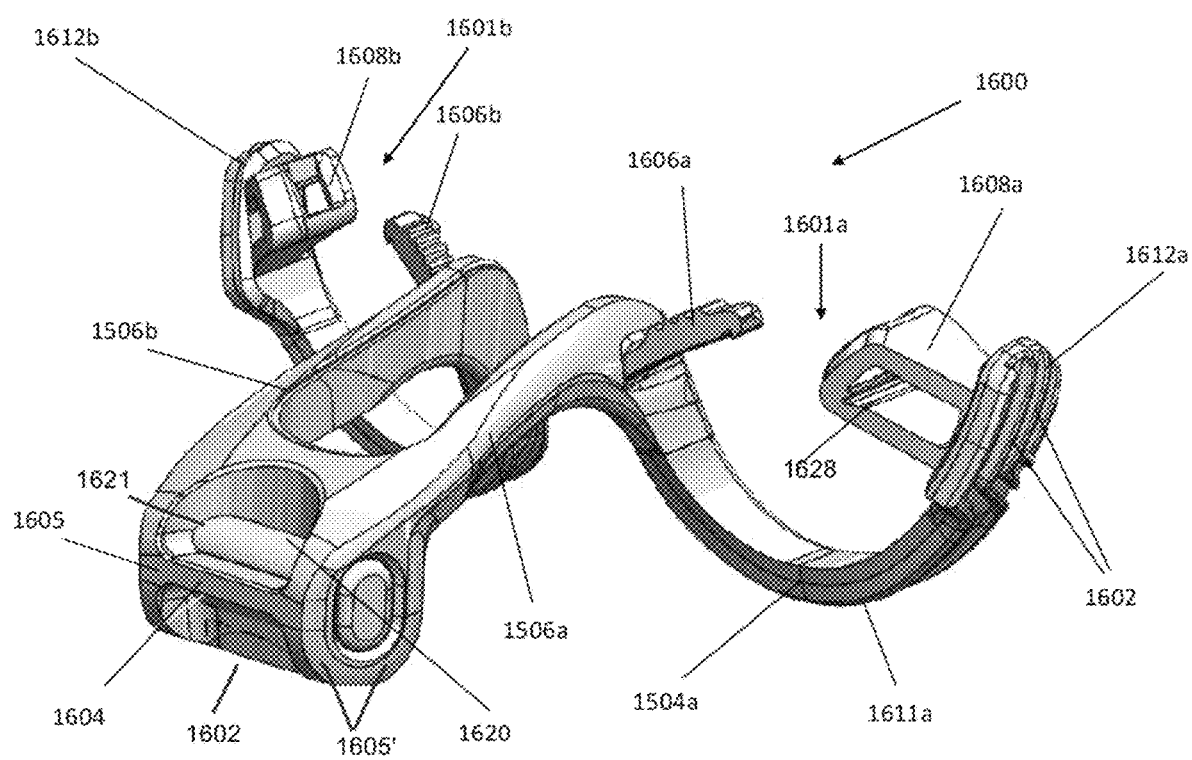
Figure 17:
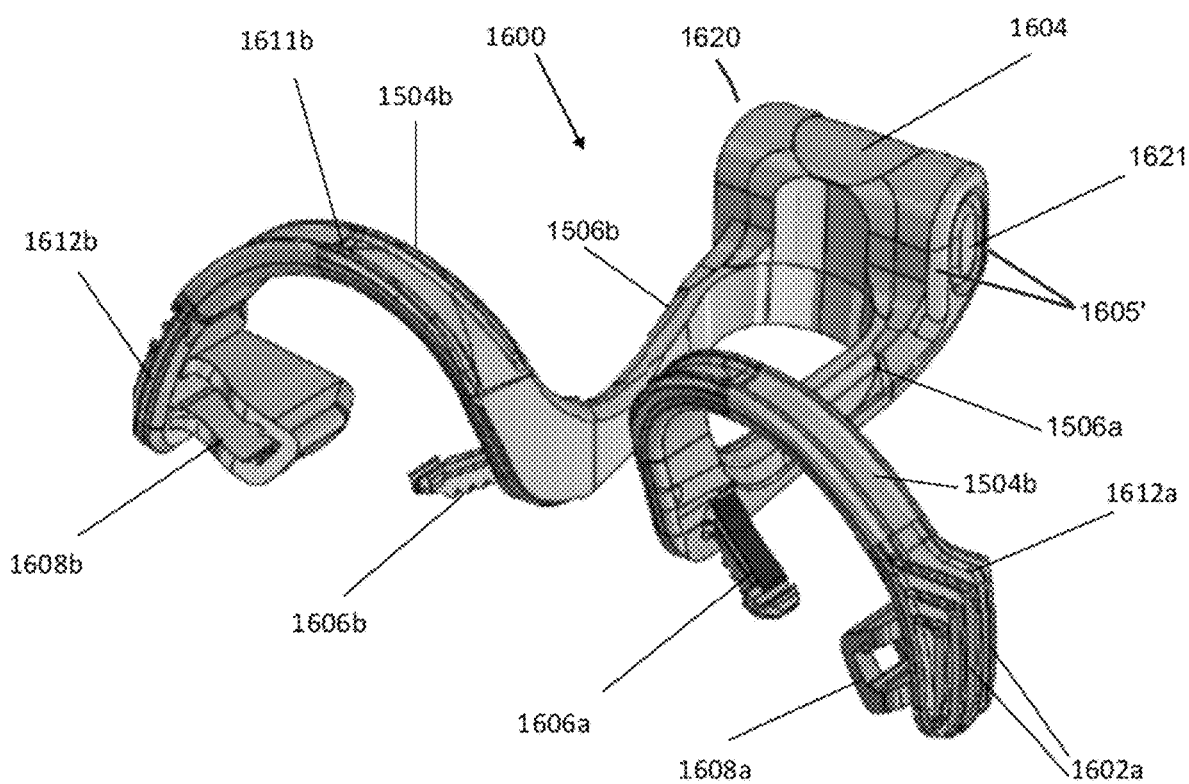
Figure 18:
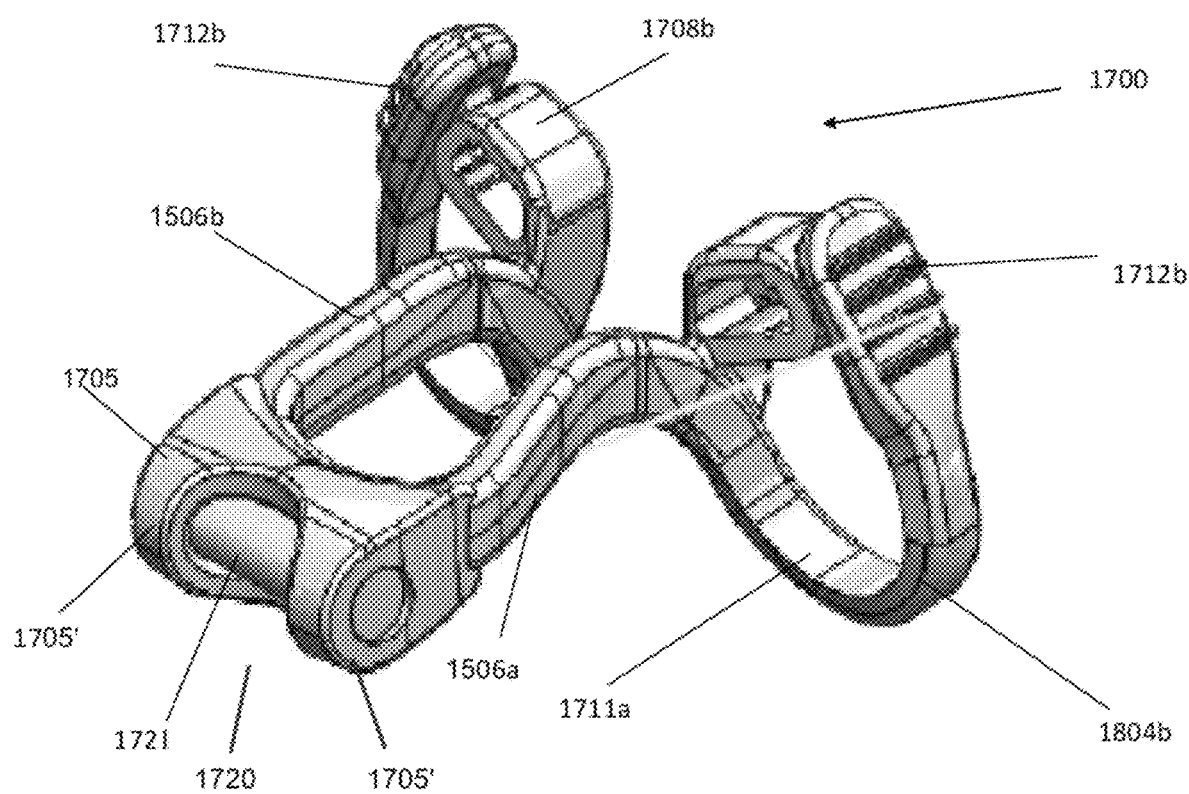
Figure 19A:
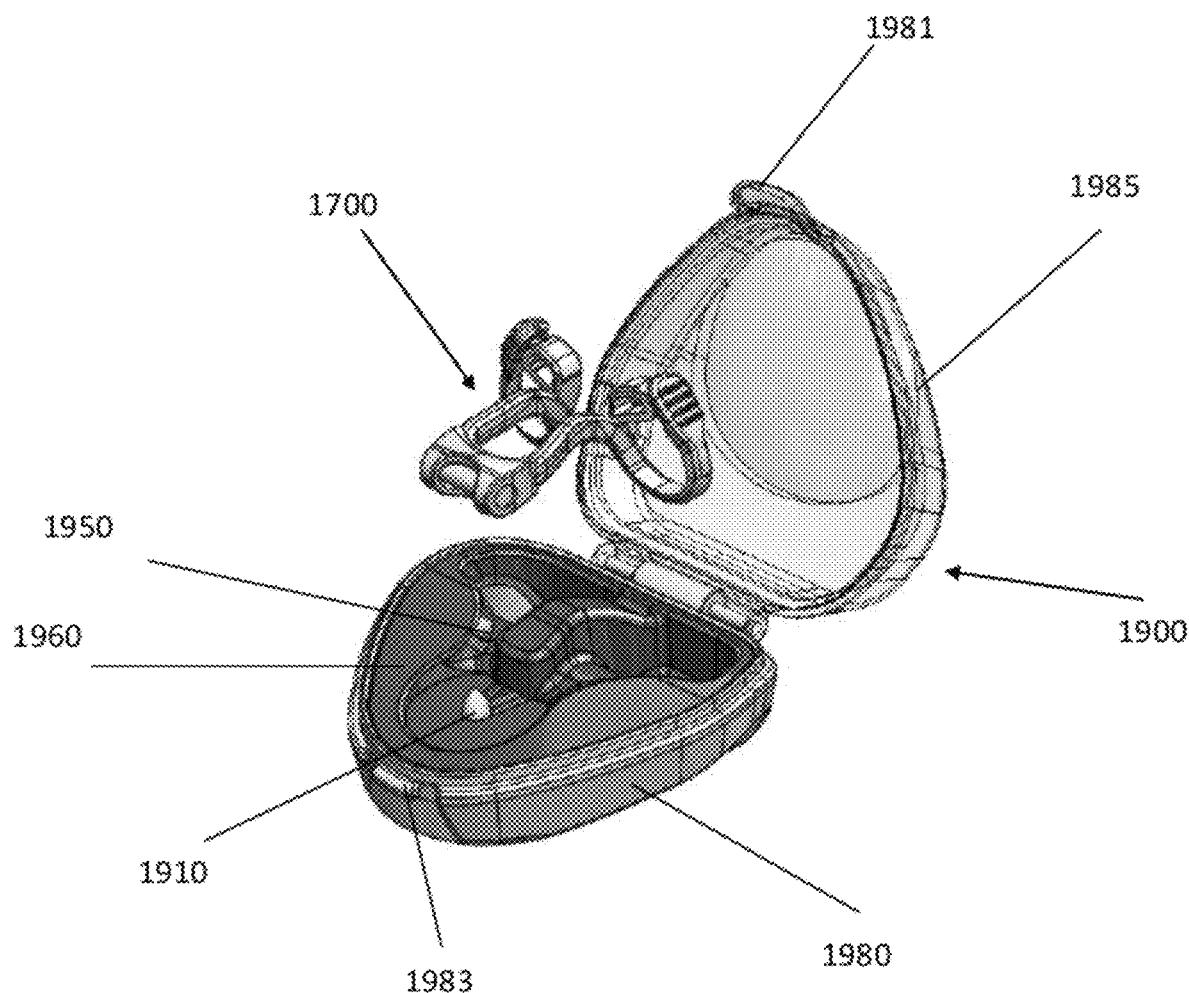
Figure 19B:
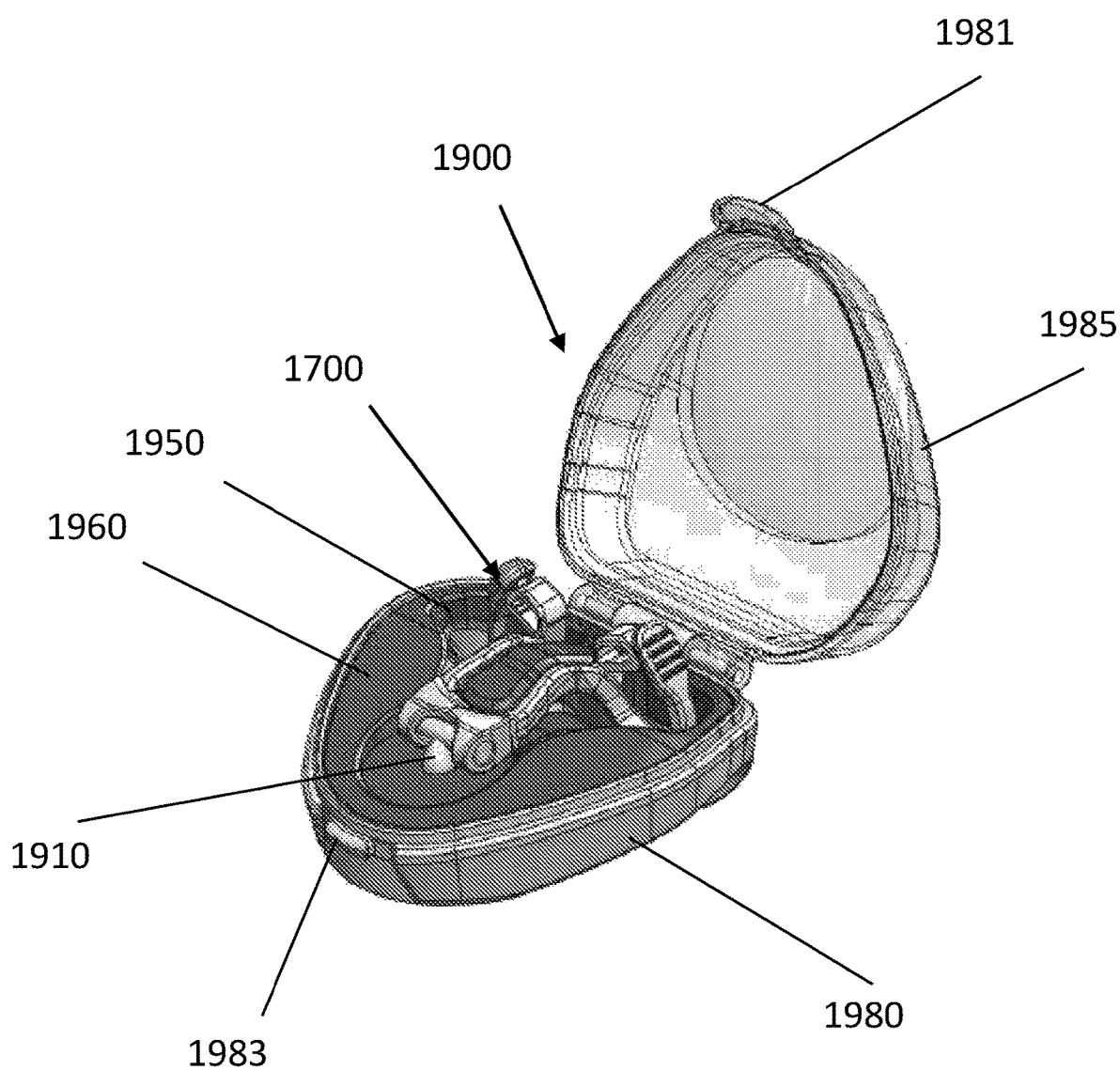
Figure 20:
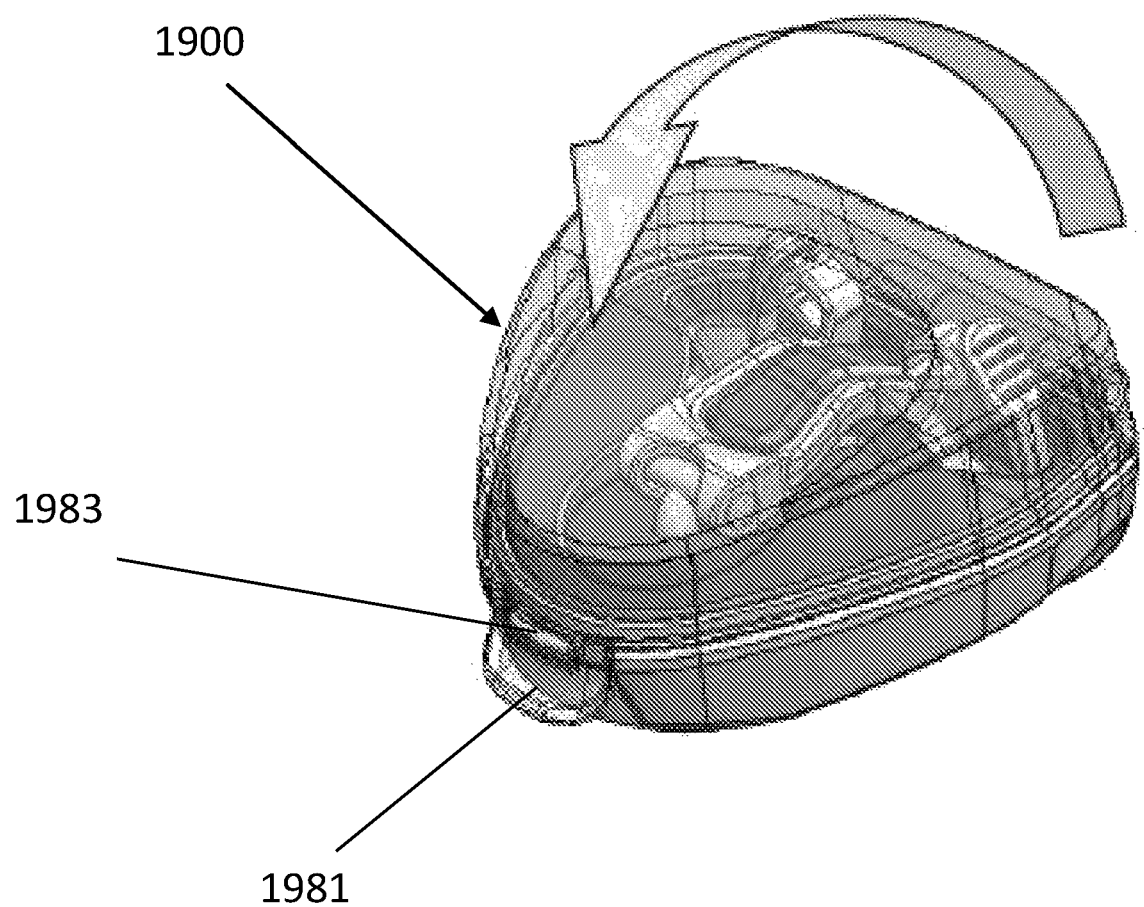
Figure 21:
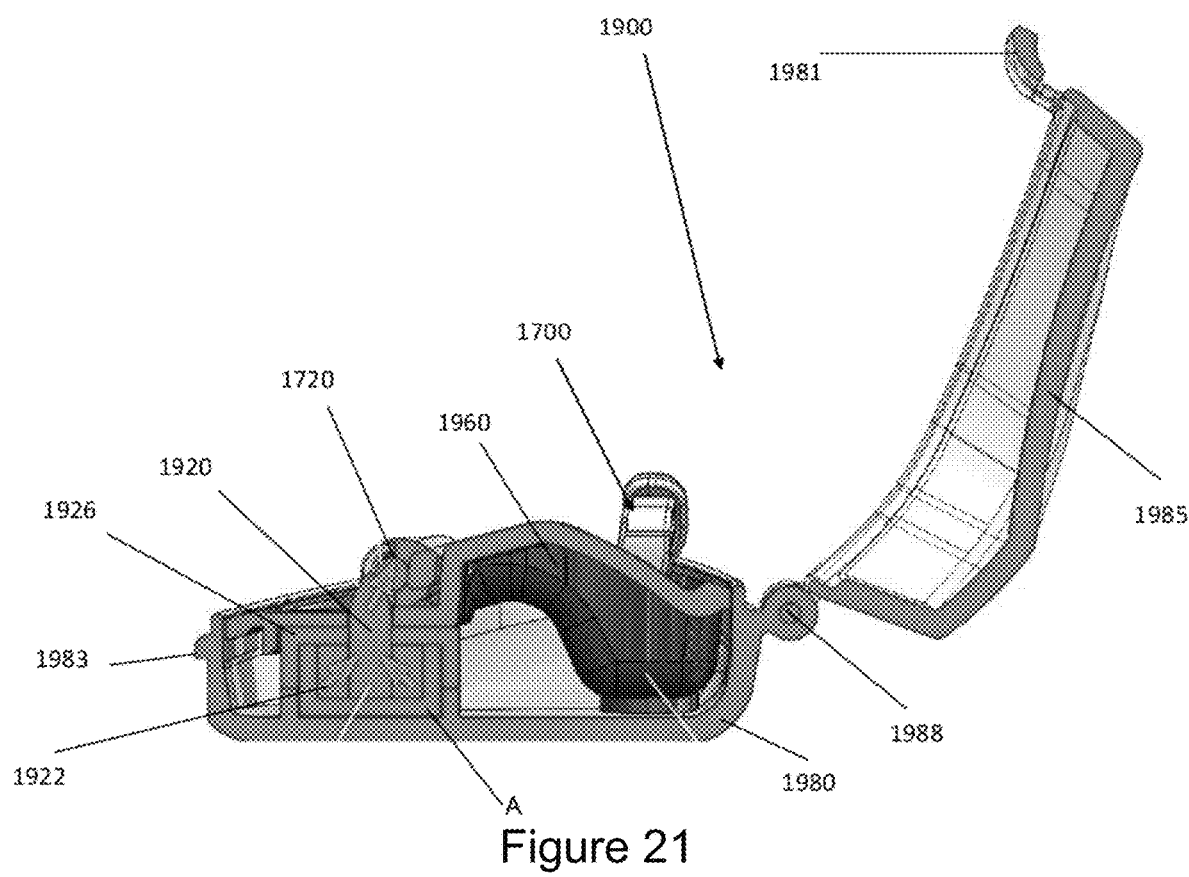
Figure 22:
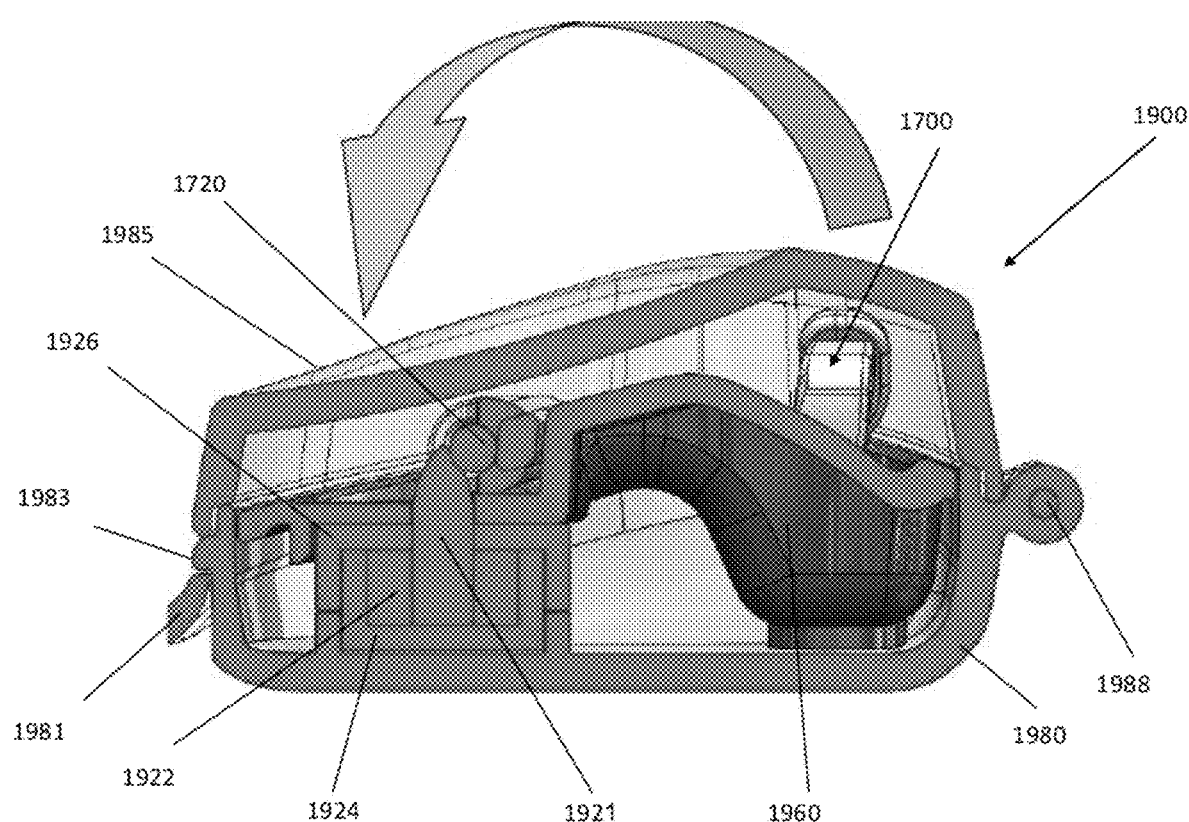
Figure 23:
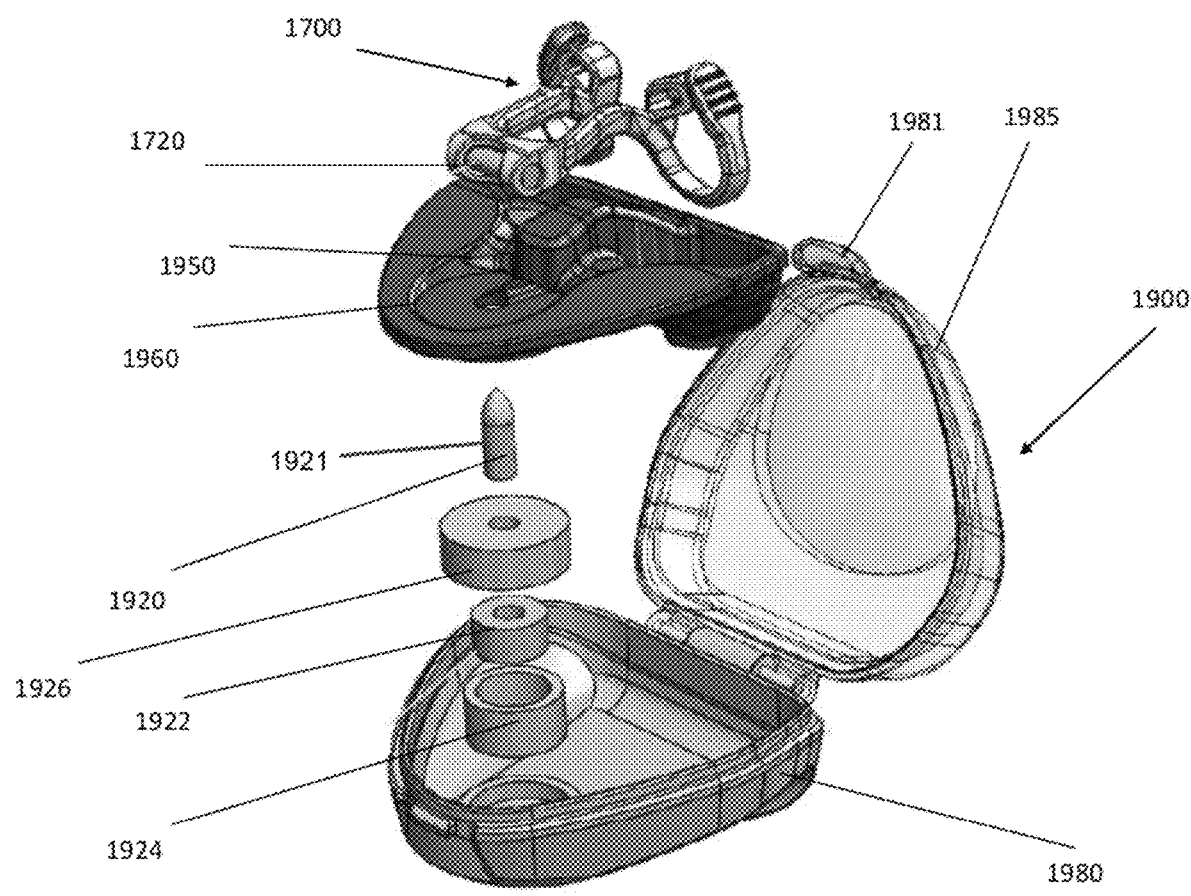
Figure 24:
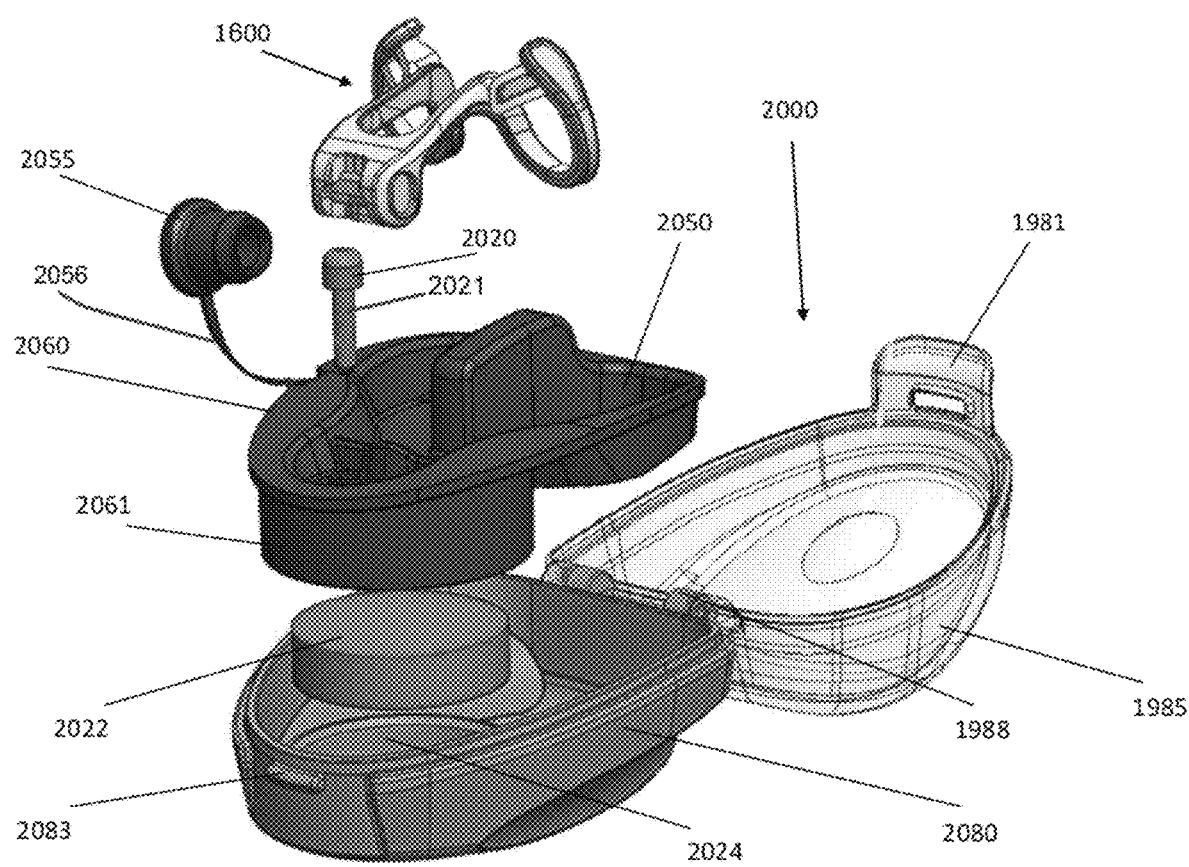
Figure 25:
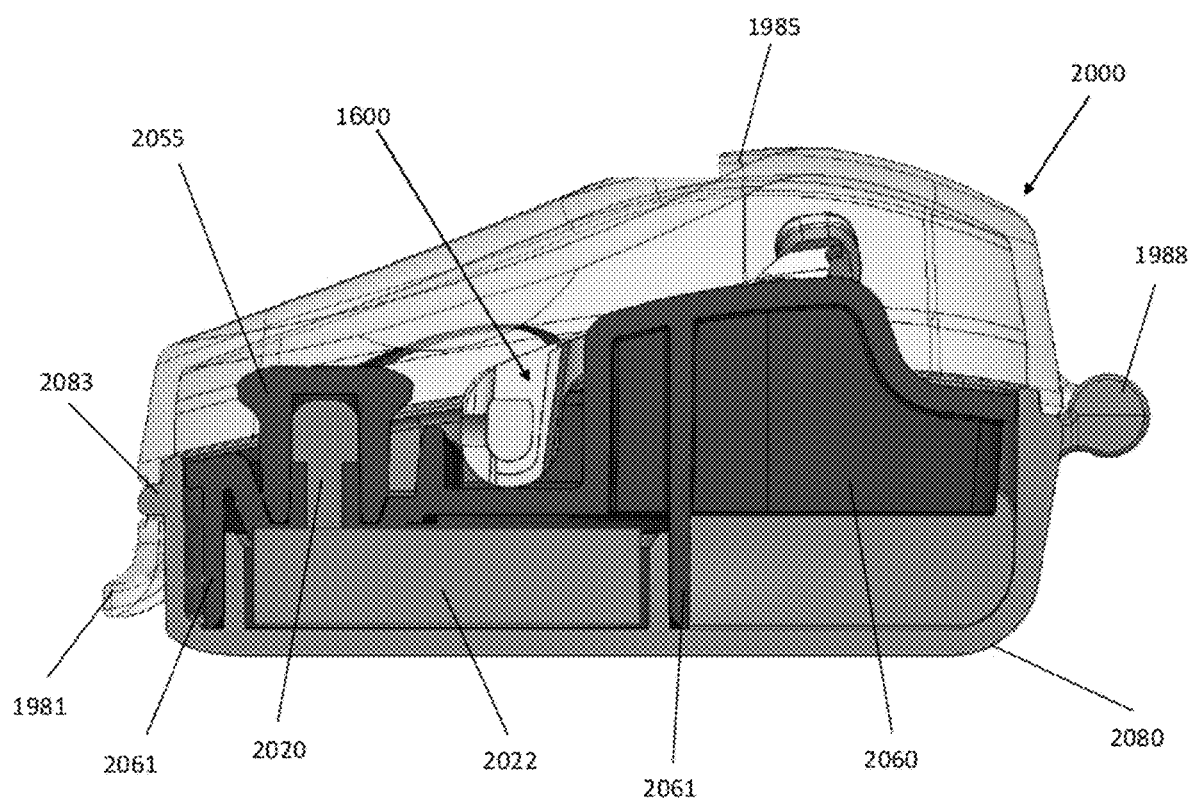
Figure 26:
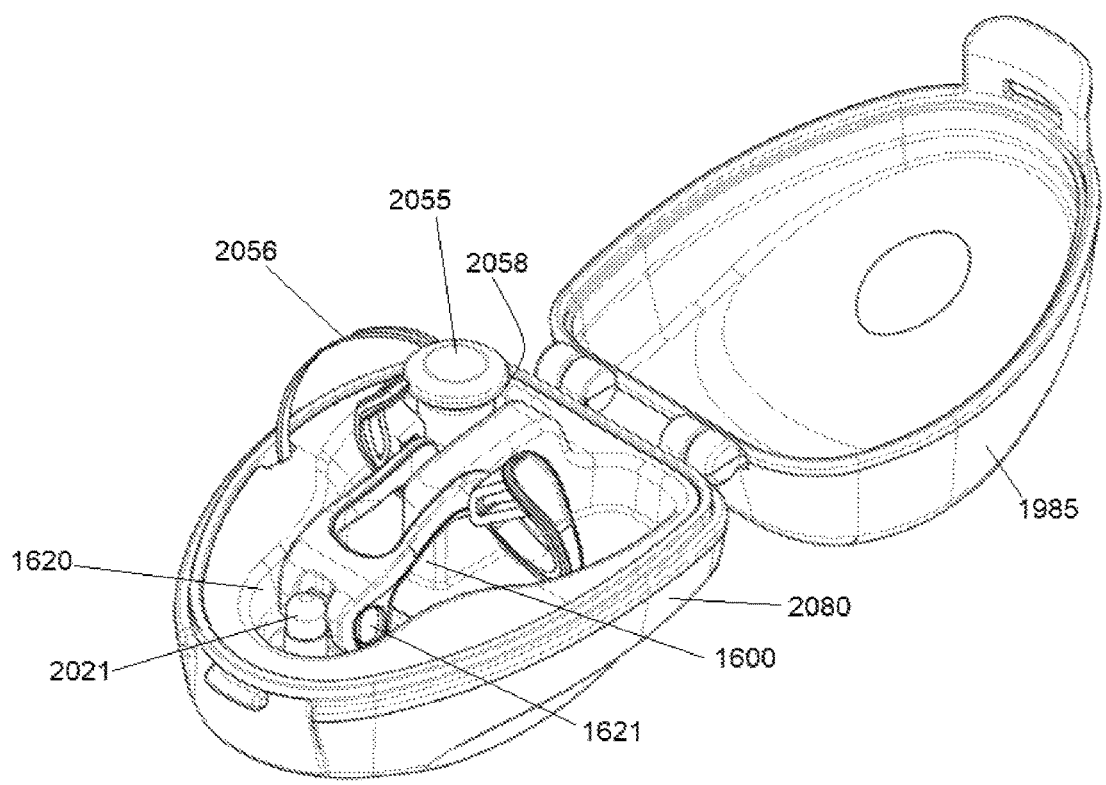
Figure 27:
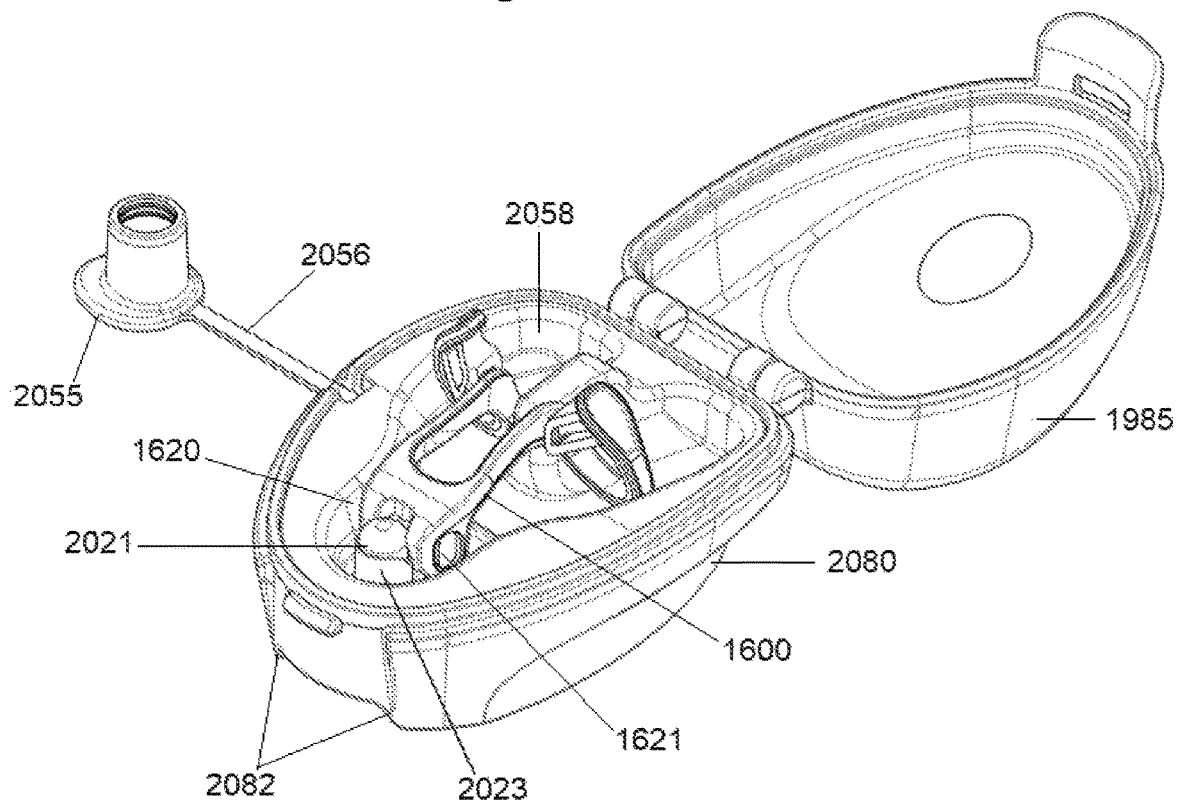
Figure 28:
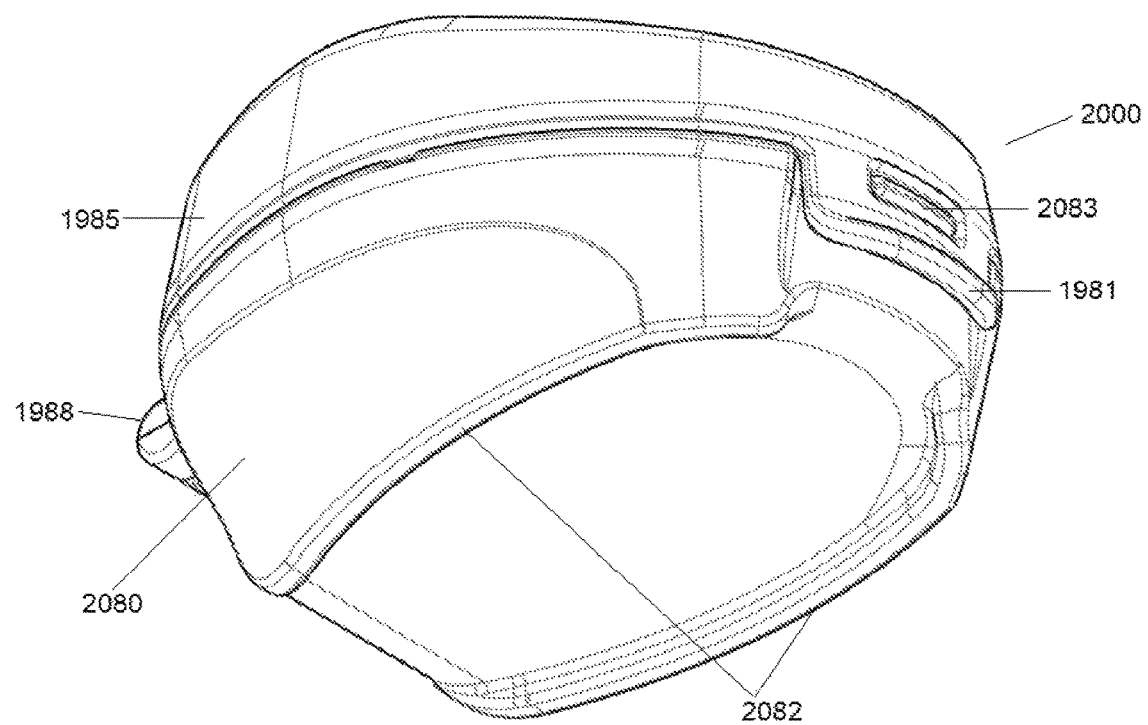
Figure 29:
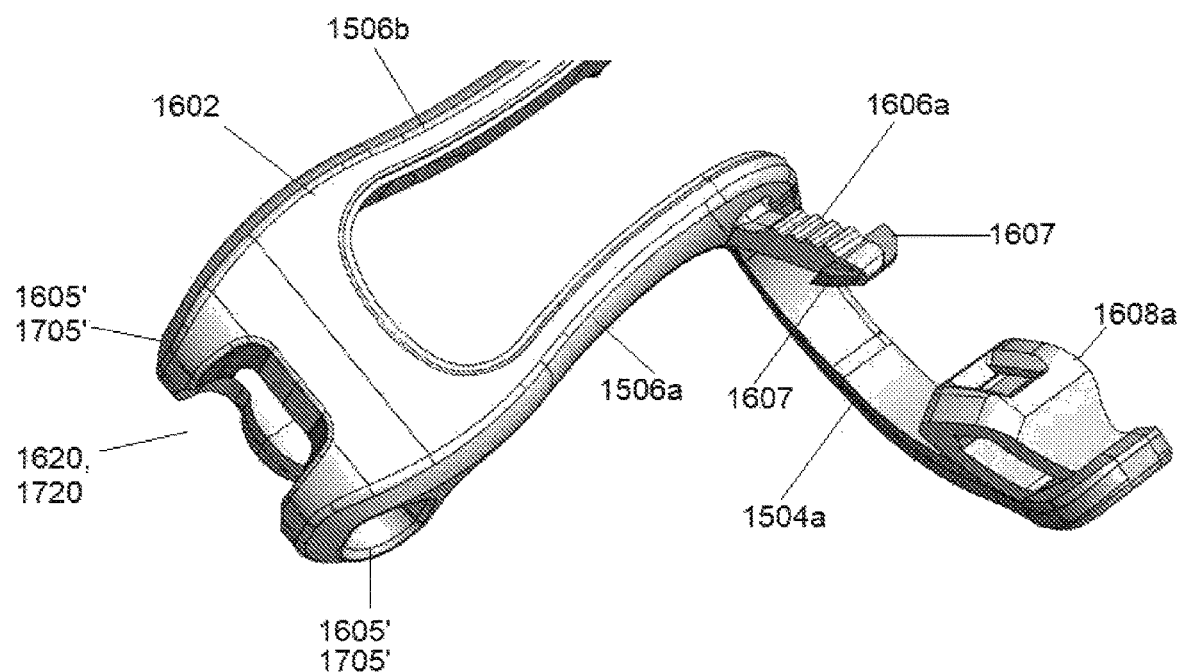

Further features of the present invention are more fully described in the following description of several non-limiting embodiments thereof. This description is included solely for the purposes of exemplifying the present invention. It should not be understood as a restriction on the broad summary, disclosure or description of the invention as set out above. Therefore, notwithstanding any other forms which may fall within the scope of the present invention, a preferred embodiment/preferred embodiments of the invention will now be described, by way of example only, with reference to the accompanying drawings in which:

FIG. 1A is front perspective view of a nasal device according to some embodiments;

FIG. 1B is a further front perspective view of the nasal device of FIG. 1A;

FIG. 1C is a front view of the nasal device of FIG. 1A;

FIG. 1D is a rear perspective view of the nasal device of FIG. 1A;

FIG. 1E is a partial side view of the nasal device of FIG. 1A;

FIG. 2 is a front perspective view of a nasal device including fin-like structures disposed thereon, according to some embodiments;

FIG. 3A is a perspective view of a user wearing a nasal device essentially as shown in FIGS. 1A to 1E;

FIG. 3B is a schematic cross-sectional side view of the user of FIG. 3A;

FIG. 4A is a rear perspective view of a nasal device according to some embodiments;

FIG. 4B is a front perspective view of the nasal device of FIG. 4A;

FIG. 4C is a front view of the nasal device of FIG. 4A in a closed configuration;

FIG. 4D is a front view of the nasal device of FIG. 4A in a partially closed configuration;

FIG. 5 is a front perspective view of a user wearing a nasal dilator device as shown in FIGS. 4A to 4D;

FIG. 6A is a front view of a nasal device in a partially closed configuration, wherein the nasal device includes a capsule, according to some embodiments;

FIG. 6B is a front view of a nasal device of FIG. 6A in a closed configuration;

FIG. 7A is a front view of a nasal dilator device including a film according to some embodiments;

FIG. 7B is a front perspective view of the nasal device of FIG. 7A;

FIG. 8A is a front perspective view of a nasal device according to some embodiments;

FIG. 8B is a further front perspective view of the nasal device of FIG. 8A;

FIG. 8C is a top view of the nasal device of FIG. 8A;

FIG. 9 is a rear perspective view of a nasal device with an attachable filter, according to some embodiments;

FIG. 10 is a rear perspective view of a nasal device including a filter, according to some embodiments;

FIG. 11 is front perspective view of a nasal device, according to some embodiments;

FIG. 12A is front perspective view of a nasal device, according to some embodiments;

FIG. 12B is a front view of the nasal device of FIG. 12A in a substantially closed configuration;

FIG. 12C is a rear perspective view of the nasal device of FIG. 12A;

FIG. 13A is front perspective view of a nasal device, according to some embodiments;

FIG. 13B is back view of the nasal device of FIG. 13A;

FIG. 14A is front perspective view of a nasal device, according to some embodiments;

FIG. 14B is a top view of the nasal device of FIG. 14A;

FIG. 14C is a front view of the nasal device of FIG. 14A;

FIG. 14D is a side view of the nasal device of FIG. 14A;

FIG. 14E is a bottom view of the nasal device of FIG. 14A;

FIG. 14F is a front perspective view of the nasal device of FIG. 14A in a closed state; and FIG. 15 is a front perspective view of a nasal device, according to some embodiments;

FIG. 16 is a perspective view of a nasal device according to a preferred embodiment of the present invention;

FIG. 17 is a reverse underside perspective view of the nasal device of FIG. 16;

FIG. 18 is a perspective view of a nasal device according to a further embodiment of the present invention;

FIGS. 19A and 19B are perspective views of a case for the nasal device of FIG. 18 showing how the nasal device is positioned and accommodated within the case;

FIG. 20 is a perspective views of the case of FIGS. 19A and 19B with the cover in the closed position;

FIG. 21 is a cross-sectional side view of the case of FIGS. 19A and 19B with the cover in the open position;

FIG. 22 is a cross-sectional side view of the case of FIGS. 19A and 19B with the cover in the closed position;

FIG. 23 is an exploded perspective view of the case of FIGS. 19A and 19B;

FIG. 24 is an exploded perspective view of a case for housing a nasal device according to another embodiment of the present invention;

FIG. 25 is a cross-sectional side view of the case of FIG. 24;

FIG. 26 is a perspective view of the case of FIG. 23 with the cover in an open position;

FIG. 27 is a perspective view of a modified embodiment of a case for housing a nasal device according to the invention, with the cover in an open position;

FIG. 28 is an underside view of the case of FIG. 27, with the cover in a closed position; and FIG. 29 is a partial perspective view of a nasal device, and particularly of a modified releasable attachment mechanism for a rib member, according to a further embodiment.

DESCRIPTION OF EMBODIMENTS

Described embodiments generally relate to nasal dilator devices for facilitating respiration. Some embodiments relate to nasal dilator devices to be fitted to the nose to facilitate or improve respiration during sleeping and/or sporting activities and/or for general day-to-day wear. Some embodiments relate to nasal dilator devices including filtration mechanisms to filter airflow during respiration and other embodiments relate to nasal dilator devices including agent delivery mechanisms for delivery of fragrances and/or medicaments to the nose during respiration.

The drawing FIGS. 1A to 15 illustrate embodiments of nasal devices known from earlier patent publications WO 2015/192162 A1 and WO 2015/192162 A1 of the applicant, the entire contents of which publications are hereby incorporated in this application by direct reference.

Some existing nasal devices that include materials emitting inhalable compositions e.g., in the form of vapours or fumes which comprise medicaments and/or fragrances localise the material emitting the vapours or fumes on those parts of the devices designed to be inserted within the nostrils. These existing devices rely on the material being inserted into at least one nostril. Where the material that emits the inhalable composition, for example in the form of vapours or fumes, is an irritant or abrasive to skin, this can cause discomfort or damage to a user when the material emitting the inhalable composition such as vapours or fumes is localised within the nostrils. In other existing systems where the material emitting inhalable compositions e.g., vapours or fumes which comprise medicaments and/or fragrances is administered from outside the nose, then inhalable compositions comprising the medicaments and/or fragrances are emitted to an area more remote from the nose and cannot easily be transported into the nasal passages during inhalation. As a result, in such situations the bulk of the inhalable compositions (e.g., vapours or fumes) comprising the medicaments and/or fragrances emitted from the source fails to be inhaled by the user and is therefore wasted.

Existing nasal devices which are adapted to be inserted into the nostrils and which attempt to deliver inhalable compositions comprising medicaments and/or fragrances to the nostrils (e.g., to clear blocked or stuffy noses) do not also dilate or stent the nostrils. More particularly, such existing devices do not allow size adjustment of the nasal passages. Also, some existing nasal dilator devices which act to dilate the nasal passages do not attempt to clear blocked or stuffy noses, especially in users suffering from nasal congestion or rhinitis. Importantly, also, existing nasal devices which are adapted to be inserted into the nose and deliver inhalable compositions such as those comprising medicaments and/or fragrances to the nasal passages, do not provide any mechanism for recharging or refilling the device with the inhalable compositions upon depletion of the composition from the device.

Nasal devices, such as nasal dilators, may be sold alongside cases for storing or housing those devices when not in use. Existing cases for storing or housing nasal devices such as nasal dilation devices which are currently on the market do not provide the ability to also store liquids such as oils or solid or semi-solid compositions or material such as gelatinous compositions which emit inhalable compositions for example in the form of vapours or fumes or do not ensure that emission of any inhalable compositions (e.g., vapours or fumes) from any such liquids or solid or semi-solid compositions or material such as gelatinous compositions in the case is prevented or minimized while a nasal device is stored therein. Accordingly, such existing cases do not restrict emission of inhalable compositions e.g., in the form of vapour or fumes (such as those comprising therapeutically beneficial compounds such as medicaments and/or fragrances) only to when the nasal dilator device is being worn by the user. Furthermore, existing cases for storing or housing nasal devices e.g., nasal dilation devices do not allow for recharging or refilling the nasal devices with the source materials netting or diffusing the inhalable compositions (e.g., compositions emitting vapours or fumes) comprising therapeutically beneficial compounds such as medicaments and/or fragrances during storage of the nasal dilator devices. Accordingly, cases for storing or housing nasal devices, such as nasal dilator devices, currently available do not allow to recharge or refill the nasal device with the source material of the inhalable compositions which is held by the nasal devices itself once that source material is depleted from the device, e.g., following use (wear) of the device.

Referring to FIGS. 1A to 1E, there is illustrated a nasal dilator device, generally indicated at 100 and substantially symmetrical about a longitudinal axis L, according to some embodiments. The nasal dilator device 100 comprises a frame, such as a flexible frame, of integrally formed or interconnected members, including a generally U-shaped body 102 having a central member or portion 104 and first and second leg members, 106a and 106b, respectively, extending from the central member or portion 104 substantially in a first plane P1.

The nasal dilator device comprises a first intermediate section 108a extending from an end 107a of the first leg member 106a and a second intermediate section 108b extending from an end 107b of the second leg member 106b. In some embodiments, and as depicted in FIGS. 1A to 1E, the first and second intermediate portions 108a, 108b, may be curved or arcuate along their length. In other embodiments, the first and second intermediate portions 108a, 108b may be substantially straight along their length or may comprise a plurality of angled or arcuate portions. The first and second intermediate portions 108a, 108b may extend obtusely from the first plane P1. For example, the first and second intermediate portions 108a, 108b may extend obtusely from the first and second ends 107a, 107b, for example, substantially at an angle of between approximately 95° and 130° to the longitudinal axis. For example, the first and intermediate sections 108a, 108b may deviate by approximately 100° from the longitudinal axis.

Referring again to FIGS. 1A to 1E, the nasal dilator device 100 comprises a first rib member 110a projecting from the first intermediate section 108a substantially in a second plane P2 and a second rib member 110b projecting from the second intermediate section 108b substantially in a third plane P3. In some embodiments, the first and second rib members 110a, 110b may project substantially outward or laterally of the longitudinal axis of the U-shaped body 102. For example, the first and second rib members 110a, 110b may be cantilever rib members that extend from the first and second intermediate sections 108a, 108b, respectively outwardly from the longitudinal axis and away from one another in a substantially cantilever manner. In some embodiments, the first and second rib members 110a, 110b may be arcuate rib members 110a, 110b or arcuate cantilever rib members 110a, 110b.

In some embodiments, the first and second rib members 110a, 110b may exhibit an elongate arched or bow-like profile which may approximate at least a portion of a circle, ellipse or parabola. For example, the first and second rib members 110a, 110b may extend arcuately along the second and third planes, P2 and P3, respectively in a direction substantially toward the first plane P1.

The first and second rib members 110a, 110b may be flexible and resiliently biased away from the first and second intermediate sections 108a, 108b, respectively, to allow the first and second rib members 110a, 110b to be compressed for insertion into the nose of a user and to reform once placed inside the nose to thereby dilate the nostrils as discussed in more detail below with reference to FIGS. 3A and 3B. As best depicted in FIGS. 1A and 1B, the first intermediate section 108a may extend or transition between the first plane P1 and the second plane P2 to interconnect the end 107a of the first leg member 106a to a proximal end 109a of the first rib member 110a and the second intermediate section 108b may extend or transition between the first plane and the third plane to interconnect the end 107b of the second leg member 106b to a proximal end 109b of the second rib member 110b.

In some embodiments, the configuration of the first and second intermediate sections 108a, 108b may be associated with an orientation or location of the first and second rib members 110a, 110b with respect to the U-shaped body 104. For example, the configuration of the first and second intermediate sections 108a, 108b may dictate or define an angle between the first plane P1 and the second plane P2 and between the first plane P1 and the third plane P3, respectively. The second and third planes, P2 and P3, may each form an acute angle, a right angle, or substantially right angle or an obtuse angle with the first plane P1. For example, the second and third planes P2 and P3, may be converging planes and may each form an obtuse angle of approximately 95° to 130° with the first plane P1 such that the first and second intermediate sections 108a 108b take the form of obtuse arcuate sections. In some embodiments, the first, second and third planes, P1, P2, P3 may be different from each other and in some embodiments, the second and third planes, P2, P3 may be the same plane and may be different to the first plane P1.

The first and second intermediate sections 108a, 108b may be inclined away from or diverge from one another to assist in urging the respective first and second rib members 110a, 110b against inner walls of respective nostrils when worn by the user.

As depicted in FIGS. 1A to 1E, the first and second rib members 110a, 110b, of the nasal dilator device 100 may comprise respective first and second nostril engaging elements, 112a and 112b, disposed at distal ends 114a, 114b, of the first and second arcuate rib members 110a, 110b, respectively, for engaging with inner walls of respective nostrils when worn by a user. In some embodiments, the first and second nostril engaging elements, 112a, 112b may comprise relatively large surface areas 116a, 116b with respect to the first and second arcuate rib members 110a, 110b.

In some embodiments, the first and second nostril engaging elements 112a, 112b may have pads 118a, 118b, disposed thereon, to engage with the inner walls of the nostrils. For example, the pads 118a, 118b may be disposed on the relatively large major surface areas 116a, 116b of the nostril engaging elements, 112a and 112b and may be enlarged with respect to the first and second arcuate rib members 110a, 110b, and/or the nostril engaging elements, 112a and 112b.

Referring now to FIG. 2, there is illustrated a nasal dilator device, generally indicated at 200, according to some embodiments. The nasal dilator device 200 may comprise similar components and elements to those of nasal dilator device 100 depicted in FIGS. 1A to 1E and accordingly those similar components and elements are denoted like numerals.

In some embodiments, as depicted in FIG. 2, the pads 118a, 118b of the nasal dilator device 200 may be composed of a relatively soft overmould material, for example a polymer material such as thermoplastic elastomer (TPE) and/or may be provided with a series of protrusions, fins or fin-like structures 220 to provide a comfortable and/or grippable surface for engaging with the inner walls of the nostrils. In some embodiments, such an overmould material may be provided on at least a portion of the rib members 110a, 110, and/or on at least a portion of the intermediate sections 108a, 108b.

The nasal dilator device 100, 200 may be configured to be orientated in a manner such that the first and second nostril engaging elements 112a, 112b may be positioned at a junction of the greater alar cartilage and lateral nasal cartilage, providing improved support for dilation of the nasal passage 308, as discussed in more detail with reference to FIGS. 3A and 3B below.

FIG. 3A is a perspective view of a user, generally indicated at 300, wearing or donning the nasal dilator device 100 of FIG. 1A and FIG. 3B is a cross sectional view taken along a midline A-A of the nose of the user of FIG. 3A.

As depicted in FIGS. 3A and 3B, the nasal dilator device 100 is configured to be orientated such that the central member or portion 104 spans a septum 302, and in particular, a columella 310 (the terminal section or fleshy external end of the septum) of a nose 304 and is positioned toward a tip 306 of the nose 304 and the first and second leg members 106a, 106b extend inward, along a nasal passage 308. For example, the first and second leg members 106a, 106b, may extend inward at an angle of approximately 30 to 40 degrees to a midline A-A of the nose 304. The first and second intermediate sections 108a, 108b may extend along a length of the septum 302 behind the columella 310 and the fibrofatty tissue 305 or bulbous region around the base of the nostrils 314 and the first and second rib members 110a, 110b, each may extend from a floor 312 of the nasal passage 308 behind the columella 310 and the fibrofatty tissue 305 or bulbous region around the base of the nostrils 314 to an inner wall (not shown) of the nostrils 314. In this way, the nasal dilator device 100 may be securely retained within the nose 304 with little or no pinching of or pressure being exerted on the septum 302. Furthermore, the ergonomic shape of the intermediate portions 108a, 108b allows the nasal dilator device to sit within the nose in a manner that may accommodate various shapes and sizes of noses, including those having hanging columellas 310.

In some embodiments, the first and second rib members 110a, 110b of the nasal dilator device 100 are composed of a flexible material and are generally squeezed or compressed by a user into a compressed state to allow insertion into the nasal passages 308 of the nose 304. The first and second rib members 110a, 110b may be biased to reform or revert to a natural uncompressed state and once inserted into the nasal passage 308, the first and second rib members 110a, 110b may each exert an outward force on the inner wall (not shown) of the nostril 314 and on the floor 312 of the nose 304, to thereby dilate the nasal passage 308. Thus, as opposed to exerting pressure on the septum 302 to dilate the nasal passage 308, the intermediate portions 108a, 108b, of nasal dilator device 100 are effective to cause the first and second rib members 110a, 110b to use the floor 312 of the nose 304 as a support structure for dilation of the nostrils 314. By using the floor 312 of the nose 304 as a support structure or anchor from which the first and second rib members 110a, 110b may launch or push off from, any pinching or exertion of force on the septum may be mitigated or avoided and a more comfortable and natural or anatomical fit may be achieved.

The nasal dilator device 100 is configured to cooperate with internal contours of the nose 304 and sit securely and comfortably in the nose, whilst mitigating obstruction of air flow through the nasal passage 308. For example, the rib members 110a, 110b, may be curved or arcuate along their length to correspond with the internal contours of the nose 304 and provide a more comfortable fit. In some embodiments, the first and second leg members 106a, 106b may be inclined toward each other or converge such that a relatively greater distance is provided between the first and second leg members 106a, 106b towards the central portion 104 in order to accommodate the columella 310 and to assist in holding the nasal dilator device 100 in place when worn.

Referring now to FIGS. 4A to 4D, there is illustrated a nasal dilator device, generally indicated at 400, according to some embodiments. The nasal dilator device 400 again comprises a frame, such as a flexible frame, of integrally formed or interconnected members, and comprises similar components and elements to those of nasal dilator device 100 depicted in FIGS. 1A to 1E; accordingly, those similar components and elements are denoted with like or corresponding reference numerals.

In addition to those similar components and elements of nasal dilator device 100, nasal dilator device 400 may comprise a first and second releasable attachment mechanism 402a and 402b, respectively. The first and second releasable attachment mechanism 402a, 402b may comprise mating or interlocking components and may be employed to releasably attach the first and second rib members, 110a and 110b, respectively, to the U-shaped body 102, to thereby define first and second adjustable looped structures, 411a, and 411b, respectively.

In some embodiments, the first and second releasable attachment mechanisms 402a, 402b may comprise respective arms 404a, 404b, such as pins, extending from respective reverse or inner surfaces 406a, 406b of the first and second nostril engaging elements 112a, 112b. The first and second releasable attachment mechanisms 402a, 402b may comprise respective sockets 408a, 408b for receiving and/or engaging the respective arms 404a, 404b. The first and second releasable attachment mechanisms 402a, 402b may be configured to allow a user to selectively adjust a degree of dilation or expansion and contraction of the first and second rib members 110a and 110b with respect to the U-shaped body 102.

For example, and as best illustrated in FIGS. 4C and 4D, the arms 404a, 404b may include at least one, or a series of serrations, detents or protrusions 410 arranged to engage with at least one of or a series of grooves or ridges 412 provided on or within the sockets 408a, 408b. For example, the grooves or ridges 412 may extend downwardly from a upper jaw portion 414 of the sockets 408a, 408b and/or may extend upwardly from a lower jaw portion 416.

Application of sufficient force by a user to the first and second releasable attachment mechanisms 402a, 402b may be effective to move the arms 404a, 404b with respect to the sockets 408a, 408b and overcome a restrictive force between the detents 410 and the grooves 412 to allow the detents 410 and/or the grooves 412 to deform and the degree or level of dilation to be adjusted. The engagement of the detents 410 with the grooves 412 may provide a sufficient restrictive force to hold the arms 404a, 404b fixed when provided in the nose 304, as depicted in FIG. 5.

The arms 404a, 404b may comprise stoppers 414 at their ends to prevent or hinder the arms 404a, 404b from disengaging from or withdrawing from the respective sockets 408a, 408b.

For example, application of a relatively large pulling force may be sufficient to cause the arms 404a, 404b to withdraw from the sockets 408a, 408b. In some embodiments, the stoppers 414 may be arrow shaped.

In some embodiments, the sockets 408a, 408b may be disposed on the first and second intermediate sections 108a, 108b and extend therefrom towards the respective arms 404a, 404b. The releasable attachment mechanisms 402a, 402b may be arranged to releasably attach or lock the first and second nostril engaging elements 112a, 112b to the first and second intermediate sections 108a, 108b.

In other embodiments, the sockets 408a, 408b may be disposed on the first and second leg members 106a, 106b and extend therefrom towards the respective arms 404a, 404b. The releasable attachment mechanisms 402a, 402b may be arranged to releasably attach or lock the first and second nostril engaging elements 112a, 112b to the first and second leg members 106a, 106b.

In other embodiments, the sockets 408a, 408b may be disposed on the first and second rib members 110a, 110b and extend therefrom towards the respective arms 404a, 404b. The attachment mechanisms 402a, 402b may be arranged to releasably attach or lock the first and second nostril engaging elements 112a, 112b to the first and second rib members 110a, 110b.

In other embodiments, the first and second releasable attachment mechanisms 402a, 402b may comprise respective sockets 408a, 408b, extending from the respective reverse or inner surfaces 406a, 406b, of the first and second nostril engaging elements 112a, 112b and respective arms 404a, 404b extending from the first and second intermediate sections 108a, 108b, the first and second leg members 106a, 106b, or the first and second rib members 110a, 110b.

As illustrated in FIG. 4C, the arms 404a, 404b may be fully or substantially fully inserted into the respective sockets 408a, 408b to enable the nasal dilator device 400 to adopt or assume a fully closed or substantially fully closed state, to thereby tighten or contract the looped structures 411a, 411b.

As illustrated in FIG. 4D, the arms 404a, 404b may be partially inserted into the sockets 408a, 408b to enable the nasal dilator device 400 to adopt or assume a partially closed state, to provide for looser or less tight looped structures 411a, 411b and accommodate variations in nasal passage sizes.

Referring to FIGS. 6A and 6B, there is depicted a nasal dilator device 600 according to some embodiments. The nasal dilator device 600 also comprises a frame, such as a flexible frame, of integrally formed or interconnected members, and comprises similar components and elements to those of nasal dilator device 400 depicted in FIGS. 4A to 4D; accordingly, those similar components and elements are denoted with like or corresponding reference numerals.

The nasal dilator device 600 comprises at least one capsule 602 disposed within respective sockets 408a, 408b. The capsule 602 may include an agent such as a medicament and/or a fragrance or aromatic agent. As depicted in FIG. 6B, the arms 404a, 404b are configured to activate, pierce or burst the capsules 602 to release the agent, medicament and/or fragrance or aromatic agent when inserted into the sockets 408a, 408b. In this way, the medicament and/or fragrance or aromatic agent is released only when the capsule 602 is activated, pierced or burst, thereby increasing a longevity or "shelf-life" and/or protecting the integrity of the medicament and/or aromatic agent. For example, the agent may be an aromatic scent such as an essential oil blend or synthetic fragrance blend to provide an olfactory and/or physiological response such as decongesting the nasal passages 318, promoting relaxation, promoting sleepiness, suppressing appetite or a medicament such as a drug to reduce pain such as a migraine.

Referring to FIGS. 7A and 7B, there is depicted the nasal dilator device 700 according to some embodiments. The nasal dilator device 700 again comprises similar components and elements to those of nasal dilator device 400 depicted in FIGS. 4A to 4D and accordingly those similar components and elements are denoted with like numerals. The nasal dilator device 700 comprises at least one coating or film 702 arranged to release a fragrance, aroma or medicament. In some embodiments, the film 702 is arranged to release a fragrance, aroma or medicament in response to abrasion, such as scratching, scraping. The film 702 may be provided with an outer cover, seal or strip 704 to protect the film 702 from unintended abrasion, as depicted in FIGS. 7A and 7B at two separate stages of removal from the nasal dilator device 400.

In other embodiments, the coating or film 700 may be arranged to release a fragrance, aroma or medicament in response to the removal or peeling off of the outer cover, strip or seal 704. In some embodiments, a fragrance, aroma or medicament may be provided or retained between two strips or films 702 forming a blister.

The coating or film 702 may be comprise a polymer or a fibre. The coating or film 702 may be in the form of a "scratch and sniff" technology or peel off technology.

In some embodiments, as depicted in FIGS. 7A and 7B, the coating or film 702 may be disposed on a surface of at least one of the attachment mechanisms 402a, 402b, such as on an inner surface of the looped structures 411a, 411b. In other embodiments, the coating or film 702 may be disposed on the central portion 102, the first and second leg members 106a, 106b, the first and second intermediate sections 108a, 108b, the rib members 110a, 110b, and/or the first and second nostril engaging elements 112a, 112b.

In some embodiments, an aperture (not shown) is disposed in each of the first and second nostril engaging elements and is arranged to receive an agent, a compound, a medicament, a capsule, and/or a housing or compact arranged to receive an agent, medicament and/or a fragrance or aromatic agent. The agent may be absorbed by the inner walls of the nostrils transdermally and/or may be absorbed by mucosa in the nostrils 314.

Referring to FIGS. 8A and 8B, there is depicted a nasal dilator device, generally indicated at 800 and substantially symmetrical about a longitudinal axis L, according to some embodiments. The nasal dilator device 800 comprises a frame, such as a flexible frame, of integrally formed or interconnected members, including a generally U-shaped body 802 having a central member or central portion 804 and first and second leg members, 806a and 806b, respectively, extending from the central member or portion 804 substantially in a first plane P1.

The nasal dilator device 800 comprises a first intermediate section 808a extending from an end 807a of the first leg member 806a and a second intermediate section 808b extending from an end 807b of the second leg member 806b. In some embodiments, and as depicted in FIGS. 8A and 8B, the first and second intermediate portions 808a, 808b, may be curved or arcuate along their length. In other embodiments, the first and second intermediate portions 808a, 808b may be substantially straight along their length or may comprise a plurality of angled or arcuate portions. For example, the first and second intermediate portions 808a, 808b may extend obtusely from the first and second ends 807a, 807b, for example, substantially at an angle of between approximately 95° and 130° to the longitudinal axis.

As depicted in FIGS. 8A to 8C, the nasal dilator device 800 comprises a first loop structure 811a projecting from the first intermediate section 808a substantially in a second plane P2 and a second loop structure 811b projecting from the second intermediate section 808b substantially in a third plane P3. In some embodiments, the first and second loop structures 811a, 811b may project substantially outward or lateral of the longitudinal axis of the generally U-shaped body 802 and away from one another. In some embodiments, the loop structure 811a, 811b may exhibit an elongate arched or curved profile which may substantially take the form of a circle, ellipse or parabola.

In some embodiments, the first intermediate section 808a may extend or transition between the first plane P1 and the second plane P2 to interconnect the end 807a of the first leg member 806a to a proximal end 809a of the first loop structure 811b and the second intermediate section 808b may extend or transition between the first plane P1 and the third plane P3 to interconnect the end 807b of the second leg member 806b to a proximal end 809b of the second loop structure 811b.

In some embodiments, the configuration of the first and second intermediate sections 808a, 808b may be associated with an orientation or location of the first and second loop structures 811a, 811b with respect to the U-shaped body 804. For example, the configuration of the first and second intermediate sections 808a, 808b may dictate or define an angle between the first and second planes, P1 and P2 and between the first and third planes, P1 and P3, respectively. The second and third planes, P2 and P3, may each form an acute angle, a right angle, or substantially right angle or an obtuse angle with the first plane P1. For example, the second and third planes P2 and P3, may be converging planes or intersecting planes and may each form an obtuse angle of approximately 95° to 130° with the first plane P1 such that the first and second intermediate sections 108a 108b take the form of obtuse arcuate sections. In some embodiments, the first, second and third planes, P1, P2, P3 may be different from each other and in some embodiments, the second and third planes, P2, P3 may be the same plane and may be different to the first plane P1.

In some embodiments, the first and second leg members 806a, 806b may be inclined toward each other or converge such that a relatively greater distance is provided between the first and second leg members 806a, 806b towards the central portion 804 in order to accommodate the columella 310 and to assist in holding the nasal dilator device 800 in place when worn.

In some embodiments, the first and second intermediate sections 808a, 808b may be inclined away from or diverge from one another to assist in urging the respective first and second loop structures 811a, 811b against inner walls of the nose when worn by the user. In some embodiments, the first and second loop structures 811a and 811b may comprise first and second flanged portions, 812a and 812b, respectively. For example, first and second flanged portions 812a and 812b may project from an outer surface of the loop structures 811a and 811b, respectively, and extend along at least a portion of a circumference of the loop structures 811a and 811b. In some embodiments, the first and second loop structures 811a and 811b may each comprise two or more flanged portions (not shown). For example, the more than two or more flanged portions (not shown) may project from an outer surface of the loop structures 811a and 811b and extend along at least a portion of a circumference of the loop structures 811a and 811b.

The flanged portions 812a and 812b may provide additional compliance to the loop structures 811a, 811b and may provide for or create a drag effect which may improve retention of the nasal dilator device 1300 in a desired position despite movement of the user.

In some embodiments, the first and second flanged portions 812a and 812b may be comprise an overmould material, for example, flexible TPE, to thereby provide an improve sealing of the loop structures 811a and 811b to the nasal orifices.

Referring to FIG. 9, there is depicted the nasal dilator device 900 according to some embodiments. The nasal dilator device 900 may comprise similar components and elements to those of nasal dilator device 800 depicted in FIGS. 8A to 8C and accordingly those similar components and elements are denoted like numerals.

The first and second loop structures 811a, 811b, of the nasal dilator device 900 may be each arranged to receive a filter 902a, and 902b, respectively. The filters 902a, 902b, may be arranged or configured to span apertures defined by the first and second loop structures 811a, 811b.

The filters 902a, 902b may be composed of a fine woven mesh or an open celled porous material, such as a foam or compressed fibre. The filters 902a, 902b may be employed to filter out airborne particles such as bacteria, dust, pollens, and/or other allergens.

In some embodiments, as depicted in FIG. 9, the filters 902a, 902b, may be replaceable and may be arranged to be removeably connected to the first and second loop structures 811a, 811b respectively. For example, the filters 902a, 902b, may be configured to "snap-fit" into the first and second loop structures 811a, 811b respectively.

Referring to FIG. 10, there is depicted the nasal dilator device 1000 according to some embodiments. The nasal dilator device 1000 comprises similar components and elements to those of nasal dilator device 800 depicted in FIGS. 8A to 8C and accordingly those similar components and elements are denoted with like or corresponding numerals.

The filters 902a, 902b of the nasal dilator device 1000 may be fixed to the first and second loop structures 811a, 811b respectively. For example, the filters 902a, 902b may be integrally formed with the first and second loop structures 811a, 811b or may be welded or ultrasonically welded to the first and second loop structures 811a, 811b.

In some embodiments, the nasal dilator device 100, 200, 400, 600, 700, 800, 900, 1000 may comprise an overmould disposed on at least one of the central portion, the leg members, the intermediate sections and the rib members. The overmould may be infused with a medicament and/or fragrance.

In some embodiments, the nasal dilator devices 100, 200, 400, 600, 700, 800, 900, 1000 may comprise a tab (not shown) extending outward from the central portion in a direction substantially opposite to the first and second leg members to assist with insertion, removal and/or placement of the nasal dilator device 100, 200, 400, 600, 700, 800, 900, 1000. The tab (not shown) may be removeable from the nasal dilator device, for example, by tearing the tab along a perforated line connecting the tab to the central portion 104, 804.

The U-shaped body 102, 802, the intermediate sections 108a, 108b, 808a, 808b, the rib members 110a, 110b, and the loop structure 811a, 811b may be composed of a polymer material such as thermoplastic elastomer (TPE) and/or thermoplastic polypropylene (PP). In some embodiments, the U-shaped body 102 and/or the intermediate sections 108a, 108b may are configured to be more rigid than the rib members 110a, 110b. For example, the U-shaped body 102 and/or the intermediate sections 108a, 108b and/or the rib members 110a, 110b may be composed of different materials or materials having differing hardness or stiffness. In some embodiments, the relative flexibility of the rib members 110a, 110b with respect to the U-shaped body 102 and/or the intermediate sections 108a, 108b may be derived from the length and/or thickness of the rib members 110a, 110b.

In some embodiments, an overall width of the nasal dilator device 100, 200, 400, 600, 700, 800, 900, 1000 may be in a range of approximately 20 mm to 35 mm when fully closed and approximately 25 mm to 40 mm when fully open, a length of the central portion 102, 802 may be in a range of approximately 5 mm to 10 mm, a length of the leg members 106a, 106b, 806a, 806b may be within a range of approximately 5 mm to 12 mm, and a length of the intermediate sections 108a, 108b, 808a, 808b may be in a range of approximately 7 mm to 15 mm and the rib members 110a, 110b, 810a, 810b may be in a range of approximately 15 mm to 30 mm. For example, in one embodiment, the overall width of the nasal dilator device 100, 200, 400, 600, 700, 800, 900, 1000 may be 25 mm when fully closed, 27.4 mm when open and the length of the leg members 106a, 106b, 806a, 806b may be 14.6 mm. In another embodiment, the overall width of the nasal dilator device 100, 200, 400, 600, 700, 800, 900, 1000 may be 27.2 mm when fully closed, 29.3 mm when open and the length of the leg members 106a, 106b, 806a, 806b may be 17.5 mm. In another embodiment, the overall width of the nasal dilator device 100, 200, 400, 600, 700, 800, 900, 1000 may be 29 mm when fully closed, 31.6 mm when open and the length of the leg members 106a, 106b, 806a, 806b may be 20.4 mm.

Referring now to FIG. 11, there is illustrated a nasal dilator device, generally indicated at 1100, according to some embodiments. The nasal dilator device 1100 may comprise similar components and elements to those of nasal dilator device 100 depicted in FIGS. 1A to 1E and accordingly those similar components and elements are denoted like or corresponding reference numerals.

In some embodiments, as depicted in FIG. 11, the relatively large surface areas 116a, 116b of the nostril engaging members 112a, 112b are provided with a series of protrusions 1102. The nostril engaging members 112a, 112b may be substantially elongate, for example, extending from the distal ends 114a, 114b of the rib members 110a, 110b, and the protrusions 1102 may extend along a length of the surface areas 116a, 116b of the nostril engaging members 112a, 112b. In some embodiments, the surface areas 116a, 116b of the nostril engaging members 112a, 112b may be substantially oval, rectangular, triangular or truncated triangular in shape. In some embodiments, the series of protrusions 1102 may form a u-shaped pattern, a v-shaped pattern, or elongated v or ✓ (tick) shaped pattern, such as a chevron design, comprising a plurality of aligned u-shaped, v-shaped or elongated v or ✓ (tick) shaped protrusions 1102.

As depicted in FIG. 11, the rib members 110a, 110b of the nasal dilator device 1100 may comprise one or more projections 1104, flanges or ridges protruding from a major surface 1106 of the nasal dilator device 1100 and extending along at least a portion of a length of the rib members 110a, 110b. For example, the major surface 1106 of the nasal dilator device 1100 may be the surface of the nasal dilator device 1100 configured, in use, to engage with or face nasal passage walls of a user's nose. In some embodiments, as depicted in FIG. 11, the nasal dilator device 1100 may comprise first and second projections 1104, each forming a flange disposed at respective elongate edges 1106a, 1106b of the major surface 1106 of the nasal dilator device 1100.

The one or more projections 1104 extend from the distal ends 114a, 114b of the rib members 110a, 110b toward the intermediate sections 108a, 108b. For example, as depicted in FIG. 11, the one or more projections 1104 may integrate with and extend from corresponding protrusions 1102 of the series of protrusions 1102 provided on the surface areas 116a, 116b of the nostril engaging members 112a, 112b. In some embodiments, the one or more projections 1104 may be disposed on and project from the major surface 1106 of the intermediate sections 108a, 108b and/or the leg members 106a, 106b and/or the central portion 104 of the nasal dilator device 1100.

In some embodiments, the nasal dilator device 1100 may comprise pads 118a, 118b disposed on the enlarged surface areas 116a, 116b of the nostril engaging members 114a, 114b. The pads 118a, 118b may be composed of a relatively soft overmould material, for example, a polymer material such as thermoplastic elastomer (TPE). In some embodiments, the pads 118a, 118b may be configured to cooperate with and conform to the surface area 116a, 116b and the series of protrusions 1102 such that the overmoulded series of protrusions 1102 project or protrude from the overmoulded surface area 116a, 116b. In other embodiments, the surface areas 116a, 116b of the nostril engaging members 114a, 114b may be substantially smooth or flat and the pads 118a, 118b may comprise or form the series of protrusions 1102. For example, the pads 118a, 118b may be substantially elongate, for example, extending from the distal ends 114a, 114b of the rib members 110a, 110b, and the protrusions 1102 may extend along a length of the pads 118a, 118b.

In some embodiments, an overmould material may be provided on at least a portion of the rib members 110a, 110b, on at least a portion of the intermediate sections 108a, 108b, and/or on at least a portion of the u-shaped body 102. For example, the overmould may be configured to cooperate with and conform to the major surface 1106 of the nasal dilator device 1100 and the one or more projections 1104 such that the overmoulded projections 1104 project or protrude from the overmoulded major surface 1106. In other embodiments, the major surface 1106 of the nasal dilator device 1100 may be substantially smooth or flat and an overmould disposed thereon may comprise or form the one or more projections or ridges 1104.

The series of protrusions 1102 and/or the one or more projections 1104 may provide a comfortable and/or grippable surface for engaging with the inner walls of the nose in use. The series of protrusions 1102 and/or the one or more projections 1104 may provide for or create a drag effect which may improve retention of the nasal dilator device 1100 in a desired position in a user's nose, in use, despite movement or motion of the user.

Referring now to FIGS. 12A, 12B and 12C, there is illustrated a nasal dilator device, generally indicated at 1200, according to some embodiments. The nasal dilator device 1200 comprises similar components and elements to those of nasal dilator device 1100 depicted in FIG. 11 and accordingly those similar components and elements are denoted with like or corresponding reference numerals.

In addition to those similar components and elements of nasal dilator device 1100, nasal dilator device 1200 may comprise a first and second releasable attachment mechanism 1202*a* and 1202*b*, respectively. The first and second releasable attachment mechanism 1202*a*, 1202*b* may comprise mating or interlocking components and may be employed to releasably attach the first and second rib members, 110*a* and 110*b*, respectively, to the U-shaped body 102, to thereby define first and second adjustable looped structures, 1204*a*, and 1204*b*, respectively. The first and second releasable attachment mechanisms 1202*a*, 1202*b* may allow a user to selectively adjust a degree of dilation or expansion and contraction of the first and second rib members 110*a* and 110*b* with respect to the U-shaped body 102.

The first and second releasable attachment mechanisms 1202*a*, 1202*b* may comprise respective arms 1206*a*, 1206*b*, such as pins, and respective sockets 1208*a*, 1208*b* for receiving and/or engaging the respective arms 1206*a*, 1206*b*.

As illustrated in FIGS. 12A, 12B and 12C, the arms 1206*a*, 1206*b* may be disposed on and extend from respective first and second intermediate sections 108*a*, 108*b* toward respective sockets 1208*a*, 1208*b* provided on opposite or inner surfaces 1210*a*, 1210*b* of the first and second nostril engaging elements 112*a*, 112*b*. In some embodiments, as shown in FIGS. 12A and 12C, the first and second arms 1206*a*, 1206*b* extend from respective first and second arm supports 1207*a*, 1207*b* projecting from respective first and second intermediate sections 108*a*, 108*b*. The releasable attachment mechanisms 1202*a*, 1202*b* may therefore be arranged to releasably attach or lock the first and second nostril engaging elements 112*a*, 112*b* to the first and second intermediate sections 108*a*, 108*b*.

In other embodiments, the first and second arms 1206*a*, 1206*b* may be disposed on and extend from respective first and second rib members 110*a*, 110*b* toward respective first and second sockets 1208*a*, 1208*b* to allow the releasable attachment mechanisms 1202*a*, 1202*b* to releasably attach or lock the first and second nostril engaging elements 112*a*, 112*b* to the first and second rib members 110*a*, 110*b* or the first and second arms 1206*a*, 1206*b* may be disposed on and extend from respective first and second leg members 106*a*, 106*b* toward respective first and second sockets 1208*a*, 1208*b* to allow the releasable attachment mechanisms 1202*a*, 1202*b* to releasably attach or lock the first and second nostril engaging elements 112*a*, 112*b* to the first and second leg members 106*a*, 106*b*.

In other embodiments, the first and second releasable attachment mechanisms 1202*a*, 1202*b* may comprise first and second arms 1206*a*, 1206*b* extending from the respective opposite or inner surfaces 1210*a*, 1210*b* of the first and second nostril engaging elements 112*a*, 112*b* and first and second sockets 1208*a*, 1208*b* extending from the first and second intermediate sections 108*a*, 108*b*, the first and second rib members 110*a*, 110*b*, or the first and second leg members 106*a*, 106*b*.

Referring again to FIGS. 12A, 12B and 12C, the first and second arms 1206*a*, 1206*b* may include at least one or a series of serrations, detents or protrusions 1212 arranged to engage with at least one or a series of grooves or ridges 1214 provided on or within the sockets 1208*a*, 1208*b*. For example, the grooves or ridges 1214 may extend downwardly from a upper jaw portion 1216 of the sockets 1208*a*, 1208*b* and/or may extend upwardly from a lower jaw portion 1218.

Application of sufficient force by a user to the first and second releasable attachment mechanisms 1202*a*, 1202*b* may be effective to move the arms 1206*a*, 1206*b* with respect to the sockets 1208*a*, 1208*b* and overcome a restrictive force between the detents 1212 and the grooves 1214 to allow the detents 1212 and/or the grooves 1214 to deform and the degree or level of dilation to be adjusted. The engagement of the detents 1212 with the grooves 1214 may provide a sufficient restrictive force to hold the arms 1206*a*, 1206*b* fixed when provided in a user's nose.

As depicted in FIG. 12, the arms 1206*a*, 1206*b* may each comprise a stopper or catch 1220 provided at their free ends to prevent or hinder the arms 1206*a*, 1206*b* from disengaging from or withdrawing from the respective sockets 1208*a*, 1208*b*. For example, in some embodiments, the catch 1220 comprises a hook portion 1222 which is configured to cooperate with a corresponding notch 1224 disposed in an upper or lower jaw portion 1216, 1218 of the socket. Application of a relatively large pulling force may be sufficient to cause the catch 1220 to disengage with the notch 1224 and to cause the arms 1206*a*, 1206*b* to withdraw from the sockets 1208*a*, 1208*b*.

In some embodiments, as best shown in FIGS. 12A and 12C, the sockets 1208*a*, 1208*b* may take the form of substantially elongate housings 1226 provided with apertures 1228 or gaps in side walls of the housing 1226. The housings 1226 may be substantially wedge shaped and taper along their length towards opposite or inner surfaces 1210*a*, 1210*b*, of the first and second nostril engaging elements 112*a*, 112*b* to provide a relatively broad opening to receive the arms 1206*a*, 1206*b*. The elongate or wedge shaped housing 1226 may provide for an improved engagement between the arms 1206*a*, 1206*b* and sockets 1208*a*, 1208*b* and more robust releasable attachment mechanisms 1202*a*, 1202*b*. For example, the elongate or wedge shaped housing 1226 may allow a face 1230 of the socket housing to engage with and lie substantially flush with the arm supports 1207*a*, 1207*b*, the intermediate sections 108*a*, 108*b*, rib members 110*a*, 110*b*, or leg members 106*a*, 106*b*, when the arms 1206*a*, 1206*b* are fully engaged within the sockets 1208*a*, 1208*b*, when the nasal dilator device 1200 assumes a closed state. For example, in use, such a configuration may mitigate contact between the sockets 1208*a*, 1208*b* and the septum and relative movement or twisting of the sockets as a result of contact with the septum. The elongate or wedge shaped housing 1226 may facilitate improved or easier adjustment of the first and second releasable attachment mechanisms 1202*a*, 1202*b*.

The arms 1206a, 1206b may be fully or substantially fully inserted into the respective sockets 1208a, 1208b to enable the nasal dilator device 1200 to adopt or assume a fully closed or substantially fully closed state, to thereby tighten or contract the looped structures 1211a, 1211b. The arms 1206a, 1206b may be partially inserted into the sockets 1208a, 1208b to enable the nasal dilator device 1200 to adopt or assume a partially closed state, to provide for looser or less tight looped structures 1204a, 1204b and accommodate variations in nasal passage sizes.

As depicted in FIGS. 12A, 12B, and 12C, the nasal dilator device 1200 may include a series of protrusions 1102 disposed on the nostril engaging members 112a, 112b, and/or one or more projections 1104 protruding from the major surface 1106 of the nasal dilator device 1200, as discussed with reference to FIG. 11.

Similar to the embodiment of nasal dilator device 600 depicted in FIG. 6, in some embodiments, the nasal dilator device 1200 may comprise at least one capsule (not shown), which may include an agent such as a medicament and/or a fragrance or aromatic agent, disposed within respective sockets 1208a, 1208b. The arms 1206a, 1206b may be configured to activate, pierce or burst the capsule (not shown) to release the agent, medicament and/or fragrance or aromatic agent when they are inserted into the sockets 1208a, 1208b. In this way, the medicament and/or fragrance or aromatic agent is released only when the capsule (not shown) is activated, pierced or burst, thereby increasing a longevity or "shelf-life" and/or protecting the integrity of the medicament and/or aromatic agent.

Similar to the embodiment of nasal dilator device 700 depicted in FIG. 7, in some embodiments, the nasal dilator device 1200 may comprise at least one coating or film (not shown) arranged to release a fragrance, aroma or medicament. For example, the film (not shown) may be disposed on a surface of at least one of the attachment mechanisms 1202a, 1202b, such as on an inner surface of the looped structures 1204a, 1204b, on the central portion 102, on the first and second leg members 106a, 106b, on the first and second intermediate sections 108a, 108b, on the rib members 110a, 110b, and/or on the first and second nostril engaging elements 112a, 112b.

In some embodiments, the film (not shown) is arranged to release a fragrance, aroma or medicament in response to abrasion, such as scratching, scraping and may be provided with an outer cover, seal or strip to protect the film (not shown) from unintended abrasion. In other embodiments, the coating or film (not shown) may be arranged to release a fragrance, aroma or medicament in response to the removal or peeling off of an outer cover, strip or seal. In some embodiments, a fragrance, aroma or medicament may be provided or retained between two strips or films (not shown) forming a blister. For example, the coating or film (not shown) may comprise a polymer or a fibre and/or may be in the form of a "scratch and sniff" technology or peel off technology.

Referring to FIGS. 13A and 13B, there is illustrated a nasal dilator device, generally indicated at 1300 again comprising a frame, such as a flexible frame, of integrally formed or interconnected members. The nasal dilator device 1300 is substantially symmetrical about a longitudinal axis L, according to some embodiments, and comprises a generally U-shaped body 1302 having a central member or portion 1304 and first and second leg members, 1306a and 1306b, respectively, extending from the central portion 1304 in a first plane P1.

The nasal dilator device comprises a first intermediate section 1308a extending from an end 1307a of the first leg member 1306a and a second intermediate section 1308b extending from an end 1307b of the second leg member 1306b. In some embodiments, and as depicted in FIGS. 13A and 13B, the first and second intermediate portions 1308a, 1308b, may be angled, curved or arcuate along their length and/or may comprise a plurality of angled or arcuate portions. In some embodiments, the first and second intermediate portions 108a, 108b may comprise L-shaped or right angled sections. For example, the first and second intermediate portions 108a, 108b may extend from the first and second ends 107a, 107b in a substantially perpendicular direction to the longitudinal axis L to form substantially right angled intermediate portions.

The nasal dilator device 1300 comprises a first rib member 1310a projecting from the first intermediate section in a second plane P2 and a second rib member 1310b projecting from the second intermediate section 1308b in a third plane P3. For example, and as best depicted in FIG. 13A, the first intermediate section 1308a may connect the end 1307a of the first leg member 1306a to a proximal end 1309a of the first rib member 1310a and the second intermediate section 1308b may connect the end 1307b of the second leg member 1306b to a proximal end 1309b of the second rib member 110b. In some embodiments, the first intermediate section 1308a extends from the first plane P1 to the second plane P2 and the second intermediate section 1308b extends from the first plane P1 to the third plane P3.

In some embodiments, the first and second rib members 1310a, 1310b may project substantially outward or laterally of the longitudinal axis of the U-shaped body 1302. For example, the first and second rib members 1310a, 1310b may be cantilever rib members that extend from the first and second intermediate sections 1308a, 1308b, respectively outwardly from the longitudinal axis and away from one another in a substantially cantilever manner. In some embodiments, the first and second rib members 1310a, 1310b may be arcuate rib members 1310a, 1310b or arcuate cantilever rib members 1310a, 1310b.

In some embodiments, the first and second rib members 1310a, 1310b may exhibit an elongate arched or bow-like profile which may approximate at least a portion of a circle, ellipse or parabola. For example, the first and second rib members 1310a, 1310b may extend arcuately along the second and third planes, P2 and P3, respectively in a direction substantially toward the first plane P1.

The first and second rib members 1310a, 1310b may be flexible and resiliently biased away from the first and second intermediate sections 1308a, 1308b respectively, to allow the first and second rib members 1310a, 1310b to be compressed for insertion into the nose of a user and to reform once placed inside the nose to thereby dilate the nostrils.

In some embodiments, the configuration of the first and second intermediate sections 1308a, 1308b may be associated with an orientation, positioning or location of the first and second rib members 1310a, 1310b with respect to the U-shaped body 1302. For example, the configuration of the first and second intermediate sections 1308a, 1308b may dictate or define a relationship or an angle between the first plane P1 and the second plane P2 and between the first plane P1 and the third plane P3, respectively. The second and third planes, P2 and P3, may each form an acute angle, a right angle, or substantially right angle or an obtuse angle with the first plane P1.

For example, in some embodiments, the first and second intermediate sections 1308a 1308b may take the form of substantially right angled sections such that the second and third planes P2, P3 each form a right angle with the first plane P1. In other embodiments, the first and second intermediate sections 1308a 1308b may take the form of obtuse angled or arcuate sections such that the second and third planes P2 and P3, each form an obtuse angle with the first plane P1. In other embodiments, the first and second intermediate sections 1308a 1308b may take the form of acute angled or arcuate sections such that the second and third planes P2 and P3, each form an acute angle with the first plane P1.

In some embodiments, the second and third planes P2 and P3, may be converging planes such that the first and second cantilever rib members are angled and/or extend substantially toward the central portion of the U-shaped body. In other embodiments, the second and third planes are diverging planes such that the first and second cantilever rib members are angled and/or extend substantially toward the central portion of the U-shaped body.

In some embodiments, the first, second and third planes, P1, P2, P3 may be different from each other and in some embodiments, the second and third planes, P2, P3 may be the same plane and may be different to the first plane P1. In some embodiments, the first and second planes P1, P2 may be orthogonal to the first plane P1.

For example, in some embodiments, the nasal dilator device 1300 is configured to be orientated such that, in use, the central portion 1304 spans a septum 302, and in particular, a columella (the terminal section or fleshy external end of the septum) of a nose and is positioned toward a tip of the nose and the first and second leg members 1306a, 1306b extend inward of respective nasal orifices, along a nasal passage and/or the septum of the nose. The first and second leg members 1306a, 1306b, may extend inward at an angle of approximately 30 to 40 degrees to a midline of the nose. The first and second intermediate sections 1308a, 1308b may engage with the septum and extend from the septum behind the columella and alar fibrofatty tissue or bulbous region around the base of the nostrils of the nose allowing the first and second rib members, in use, to extend along the respective nasal orifices to an inner wall of the nostrils behind the columella and the fibrofatty tissue or bulbous region around the base of the nostrils to an inner wall of the nostrils. In this way, the nasal dilator device 1300 may be securely retained within the nose with little or no pinching of or pressure being exerted on the septum.

The first and second intermediate sections 1308a, 1308b may be inclined away from or diverge from one another to assist in urging the respective first and second rib members 1310a, 1310b against inner walls of respective nostrils when worn by the user.

As depicted in FIGS. 13A and 13B, the first and second rib members 1310a, 1310b, of the nasal dilator device 1300 may comprise respective first and second nostril engaging elements, 1312a and 1312b, disposed at distal ends 1314a, 1314b, of the first and second arcuate rib members 1310a, 1310b, respectively, for engaging with inner walls of respective nostrils when worn by a user. In some embodiments, the first and second nostril engaging elements, 1312a, 1312b may comprise relatively large surface areas 1316a, 1316b with respect to the first and second arcuate rib members 1310a, 1310b.

In some embodiments, the first and second nostril engaging elements, 1312a, 1312b, may extend at an angle to or arcuately from the respective first and second distal ends 1314a, 1314b, of the respective first and second rib members 1310a, 1310b. For example, the first and second nostril engaging elements, 1312a, 1312b, may extend from the first and second planes, P2, P3, respectively and may extend in a direction away from the central portion 104 of the U-shaped body 1302.

In some embodiments, the first and second nostril engaging elements 1312a, 1312b may have pads 1318a, 1318b, disposed thereon, to engage with the inner walls of the nostrils of a user, in use. For example, the pads 1318a, 1318b may be disposed on the relatively large major surface areas 1316a, 1316b of the nostril engaging elements, 1312a and 1312b and may be enlarged with respect to the first and second arcuate rib members 1310a, 1310b, and/or the nostril engaging elements, 1312a, 1312b. The pads 1318a, 1318b of the nasal dilator device 1300 may be composed of a relatively soft overmould material, for example a polymer material such as thermoplastic elastomer (TPE) to provide a comfortable and/or grippable surface for engaging with the inner walls of the nostrils in use.

In some embodiments, as depicted in FIGS. 13A and 13B, the relatively large surface areas 1316a, 1316b of the nostril engaging members 1312a, 1312b are provided with a series of protrusions 1320. The nostril engaging members 1312a, 1312b may be substantially elongate, for example, extending from the distal ends 1314a, 1314b of the rib members 1310a, 1310b, and the protrusions 1320 may extend along a length of the surface areas 1316a, 1316b of the nostril engaging members 1312a, 1312b. In some embodiments, the surface areas 1316a, 1316b of the nostril engaging members 1312a, 1312b may be substantially oval, rectangular, triangular or truncated triangular in shape. In some embodiments, the series of protrusions 1320 may form a u-shaped pattern, a v-shaped pattern, or elongated v or ✓ (tick) shaped pattern, such as a chevron design, comprising a plurality of aligned u-shaped, v-shaped or elongated v or ✓ (tick) shaped protrusions 1320.

As depicted in FIGS. 13A and 13B, the rib members 1310a, 1310b of the nasal dilator device 1300 may comprise one or more projections 1322, flanges or ridges protruding from a major surface 1324 of the nasal dilator device 1300 and extending along at least a portion of a length of the rib members 1310a, 1310b. For example, the major surface 1324 of the nasal dilator device 1300 may be the surface of the nasal dilator device 1300 configured, in use, to engage with or face nasal passage walls of a user's nose. In some embodiments, as depicted in FIGS. 13A and 13B, the nasal dilator device 1300 may comprise first and second projections 1322, each forming a flange disposed at respective elongate edges of the major surface 1324 of the nasal dilator device 1300.

The one or more projections 1322 may extend from the distal ends 1314a, 1314b of the rib members 1310a, 1310b toward the intermediate sections 1308a, 1308b. For example, as depicted in FIG. 13A, the one or more projections 1322 may integrate with and extend from corresponding protrusions 1320 of the series of protrusions 1320 provided on the surface areas 1316a, 1316b of the nostril engaging members 1312a, 1312b. In some embodiments, the one or more projections 1322 may be disposed on and project from the major surface 1324 of the intermediate sections 1308a, 1308b and/or the leg members 1306a, 1306b and/or the central portion 1304 of the nasal dilator device 1300.

In some embodiments, the pads 1318a, 1318b may be configured to cooperate with and conform to the surface area 1316a, 1316b and the series of protrusions 1320 such that the overmoulded series of protrusions 1320 project or protrude from the overmoulded surface area 1316*a*, 1316*b*. In other embodiments, the surface areas 1316*a*, 1316*b* of the nostril engaging members 1314*a*, 1314*b* may be substantially smooth or flat and the pads 1318*a*, 1318*b* may comprise or form the series of protrusions 1320. For example, the pads 1318*a*, 1318*b* may be substantially elongate, for example, extending from the distal ends 1314*a*, 1314*b* of the rib members 1310*a*, 1310*b*, and the protrusions 1320 may extend along a length of the pads 1318*a*, 1318*b*.

In some embodiments, an overmould material may be provided on at least a portion of the rib members 1310*a*, 1310, on at least a portion of the intermediate sections 1308*a*, 1308*b*, and/or on at least a portion of the u-shaped body 1302. For example, the overmould may be configured to cooperate with and conform to the major surface 1322 of the nasal dilator device 1300 and the one or more projections 1322 such that the overmoulded projections 1322 project or protrude from the overmoulded major surface 1324. In other embodiments, the major surface 13024 of the nasal dilator device 1300 may be substantially smooth or flat and an overmould disposed thereon may comprise or form the one or more projections or ridges 1322.

The series of protrusions 1320 and/or the one or more projections 1322 may provide a comfortable and/or grippable surface for engaging with the inner walls of the nose in use. For example, activities that are percussive, such as running, are often associated with the production of skin perspiration which may reduce the mechanical and frictional attachment of other nasal devices to the nasal passage of the user causing the devices to move from a position intended by the user and therefore requiring readjustment. However, the series of protrusions 1320 and/or the one or more projections 1322 may provide for or create a drag effect which may improve retention of the nasal dilator device 1300 in a desired position in a user's nose, in use, despite motion or skin perspiration of the user.

Referring now to FIGS. 14A, 14B, 14C, 14D, 14E and 14E, there is illustrated a nasal dilator device, generally indicated at 1400, according to some embodiments. The nasal dilator device 1400 comprises similar components and elements to those of nasal dilator device 1300 depicted in FIGS. 13A and 13B and accordingly those similar components and elements are denoted with like or corresponding reference numerals.

In addition to those similar components and elements of nasal dilator device 1300, nasal dilator device 1400 may comprise a first and second releasable attachment mechanism 1402*a* and 1402*b*, respectively. The first and second releasable attachment mechanism 1402*a*, 1402*b* may comprise mating or interlocking components and may be employed to releasably attach the first and second rib members, 1310*a* and 1310*b*, respectively, to the U-shaped body 1302, to thereby define first and second adjustable looped structures, 1404*a*, and 1404*b*, respectively. The first and second releasable attachment mechanisms 1402*a*, 1402*b* may allow a user to selectively adjust a degree of dilation or expansion and contraction of the first and second rib members 1310*a* and 1310*b* with respect to the U-shaped body 1302.

The first and second releasable attachment mechanisms 1402*a*, 1402*b* may comprise respective arms 1406*a*, 1406*b*, such as pins, and respective sockets 1408*a*, 1408*b* for receiving and/or engaging the respective arms 1406*a*, 1406*b*.

As illustrated in FIG. 14A to 14F, the arms 1406*a*, 1406*b* may be disposed on and extend from respective first and second intermediate sections 1308*a*, 1308*b* toward respective sockets 1408*a*, 1408*b* provided on opposite or inner surfaces 1410*a*, 1410*b* of the first and second nostril engaging elements 1312*a*, 1312*b*. The releasable attachment mechanisms 1402*a*, 1402*b* may therefore be arranged to releasably attach or lock the first and second nostril engaging elements 1312*a*, 1312*b* to the first and second intermediate sections 1308*a*, 1308*b*.

In other embodiments, the first and second arms 1406*a*, 1406*b* may be disposed on and extend from respective first and second rib members 1310*a*, 1310*b* toward respective first and second sockets 1408*a*, 1408*b* to allow the releasable attachment mechanisms 1402*a*, 1402*b* to releasably attach or lock the first and second nostril engaging elements 1312*a*, 1312*b* to the first and second rib members 1310*a*, 1310*b* or the first and second arms 1406*a*, 1406*b* may be disposed on and extend from respective first and second leg members 1306*a*, 1306*b* toward respective first and second sockets 1408*a*, 1408*b* to allow the releasable attachment mechanisms 1402*a*, 1402*b* to releasably attach or lock the first and second nostril engaging elements 1312*a*, 1312*b* to the first and second leg members 1306*a*, 1306*b*.

In other embodiments, as depicted in FIG. 15, nasal dilator device 1500 having first and second releasable attachment mechanisms 1402*a*, 1402*b* may comprise first and second arms 1406*a*, 1406*b* extending from the respective opposite or inner surfaces 1410*a*, 1410*b* of the first and second nostril engaging elements 1312*a*, 1312*b* and first and second sockets 1408*a*, 1408*b* extending from the first and second intermediate sections 1308*a*, 1308*b*. In yet other embodiments, the first and second releasable attachment mechanisms 1402*a*, 1402*b* may comprise first and second arms 1406*a*, 1406*b* extending from the respective opposite or inner surfaces 1410*a*, 1410*b* of the first and second nostril engaging elements 1312*a*, 1312*b* and first and second sockets 1408*a*, 1408*b* extending from the first and second rib members 1310*a*, 1310*b* or the first and second leg members 1306*a*, 1306*b*.

Referring again to FIGS. 14A to 14E, the first and second arms 1406*a*, 1406*b* may include at least one or a series of serrations, detents or protrusions 1412 arranged to engage with at least one or a series of grooves or ridges 1414 provided on or within the sockets 1408*a*, 1408*b*. For example, the grooves or ridges 1414 may extend downwardly from an upper jaw portion 1416 of the sockets 1408*a*, 1408*b* and/or may extend upwardly from a lower jaw portion 1418.

Application of sufficient force by a user to the first and second releasable attachment mechanisms 1402*a*, 1402*b* may be effective to move the arms 1406*a*, 1406*b* with respect to the sockets 1408*a*, 1408*b* and overcome a restrictive force between the detents 1412 and the grooves 1414 to allow the detents 1412 and/or the grooves 1414 to deform and the degree or level of dilation to be adjusted. The engagement of the detents 1412 with the grooves 1414 may provide a sufficient restrictive force to hold the arms 1406*a*, 1406*b* fixed when provided in a user's nose.

As depicted in FIGS. 14A to 14E, the arms 1406*a*, 1406*b* may each comprise a stopper or catch 1420 provided at their free ends to prevent or hinder the arms 1406*a*, 1406*b* from disengaging from or withdrawing from the respective sockets 1408*a*, 1408*b*. For example, in some embodiments, the catch 1420 comprises a hook portion 1422 which is configured to cooperate with a corresponding notch 1424 disposed in an upper or lower jaw portion 1416, 1418 of the socket 1408*a*, 1408*b*. Application of a relatively large pulling force may be sufficient to cause the catch 1420 to disengage with the notch 1424 and to cause the arms 1406a, 1406b to withdraw from the sockets 1408a, 1408b.

In some embodiments, as best shown in FIGS. 14A and 14B, the sockets 1408a, 1408b may take the form of substantially elongate housings 1426 provided with apertures 1428 or gaps in side walls of the housing 1426. The housings 1426 may be substantially wedge shaped and taper along their length towards opposite or inner surfaces 1410a, 1410b, of the first and second nostril engaging elements 1312a, 1312b to provide a relatively broad opening to receive the arms 1406a, 1406b. The elongate or wedge shaped housing 1426 may provide for an improved engagement between the arms 1406a, 1406b and sockets 1408a, 1408b and more robust releasable attachment mechanisms 1402a, 1402b. For example, the elongate or wedge shaped housing 1426 may allow a face 1430 of the socket housing 1426 to engage with and lie substantially flush to the intermediate sections 1308a, 1308b, rib members 1310a, 1310b, or leg members 1306a, 1306b, when the arms 1306a, 1306b are fully engaged within the sockets 1408a, 1408b, when the nasal dilator device 1400 assumes a closed configuration or state.

The arms 1406a, 1406b may be fully or substantially fully inserted into the respective sockets 1408a, 1408b to enable the nasal dilator device 1400 to adopt or assume a fully closed or substantially fully closed state, to thereby tighten or contract the looped structures 1411a, 1411b. The arms 1406a, 1406b may be partially inserted into the sockets 1408a, 1408b to enable the nasal dilator device 1400 to adopt or assume a partially closed state, to provide for looser or less tight looped structures 1404a, 1404b and accommodate variations in nasal passage sizes.

The particular configuration of the releasable attachment mechanisms 1402a, 1402b allows for self-adjustment of the looped structures, 1404a, and 1404b of the nasal dilator device 1400 whilst the device is in place of the nose of the user. This may be of particular benefit to a user partaking in percussive activities. For example, percussive activities, such as running or cycling, may cause a reduction in mechanical and frictional attachment of the nasal dilator device to a nasal passage of a user, for example, due to motion and/or skin perspiration, causing the device to move from a position intended by the user and therefore requiring readjustment.

As depicted in FIGS. 14A to 14F, the nasal dilator device 1400 may include a series of protrusions 1320 disposed on the nostril engaging members 1312a, 1312b, and/or one or more projections 1322 protruding from the major surface 1324 of the nasal dilator device 1400, as discussed with reference to FIG. 13.

An embodiment of the present invention is illustrated in FIGS. 16 and 17. FIGS. 16 and 17 show a nasal dilator device 1600 with a fume delivery device 1620. The nasal dilator device 1600 comprises a frame, such as a flexible frame, of integrally formed or interconnected members, and comprises similar components and elements to those of nasal dilator device 1400 depicted in FIGS. 14A to 14E.

It will be understood that the nasal dilator device 1600 can be made in different sizes for different users. The nasal dilator device 1600 can be sized and shaped to be suitable for an adult, a child such as a child who is at least seven years old, a teenager, a young adults, for the obese or for the elderly.

The source of the inhalable composition i.e., the material adapted to emit or diffuse an inhalable composition, such as fume emitting material, can include an oil or oil blend such as an aromatic and/or therapeutic oil or blends thereof. In one example, the source of the inhalable composition, such as the fume emitting material, consists or comprises one or more oils or oil blends, such as aromatic essential oil(s) or volatile oil, a liquid and/or a fluid.

In another example, the source of the inhalable composition such as the fume emitting material consists of or comprises a therapeutic oil and/or an oil based composition comprising a medicament. For example, source of the inhalable composition such as the fume emitting material may comprise volatile oil based drugs producing fumes such as nitrate vapours. In one such example, the source of the inhalable composition such as fume emitting material is a volatile oil comprising amyl nitrate emitting nitrate vapours which upon inhalation may produce relaxation of smooth muscles and/or may assist to lower blood pressure and/or assist in treating reflex tachycardia (angina or chest pain).

In one particularly preferred example, the source of the inhalable composition such as the fume emitting material comprises one or more essential oils or blends thereof. Suitable aromatic essential oils include but are not limited to oils derived from *Agonis Fragrans, Ajowan, Amyris* Wood, *Angelica* Root, Basil, Bay Laurel, Bay West Indies, Bergamot, Birch Tar Bi-Rectified, Buddha Wood, Cajeput, Camphor White, *Cananga*, Cape Buchu, Cape Chamomile, Cape *Helichrysum*, Cape Lavender, Cape Peppermint Geranium, Cape Rose Geranium, Cape Snowbush, Cape *Verbena*, Caraway, Cardamom, Carrot Seed, Catnip, Cedarleaf, Cedarwood, Celery Seed, Chamomile, Chilli Seed, Cinnamon Bark, Cinnamon Leaf, Citronella Ceylon, Citronella Java, Clary Sage, Clementine, Clove Bud, Clove Leaf, Coriander, Cubeb, Cumin, Curry Leaf, Cypress, Cypriol, Dill Seed Indian, Elemi, *Eucalyptus*, Fennel Bitter, Fennel Sweet, Fir Needle Siberian, Frankincense, Galangal, Garlic, Geranium, Ginger, Gingergrass, Grapefruit Pink, Grapefruit White, Gurjun, *Helichrysum*, Hiba, Hinoki, Ho Wood, Honey Myrtle, Honey Suckle, Hydecheium, Hyssop, Jamarosa Root, Juniper Leaf, Juniperberry Himalayan, Kanuka, Karanj Seed, Katrafay, *Kunzea Ambigua*, Laurel Berry, Laurel Leaf, Lavandin, Lemon, Lemongrass Cochin, Lentisque Morocco (Mastic), Lican, Lime, *Litsea Cubeba*, Lovage Leaf, Mandarin, Manuka, Marjoram, Melissa Leaf, Menthol Liquid, Mullilam, Myrrh, Myrtle, Nagchampa, Neroli, Nerolina, Niaouli, Nutmeg, Onion, Orange 5 Fold, Orange Bitter, Orange Blood, Orange Sweet, Palmarosa, Parsley Herb, Parsnip, Patchouli, Patchouli Light, Pennyroyal, Pepper Black, Pepper Green, Pepper White, Peppermint, Peru Balsam Rectified, Petitgrain, Pine, Pine Scotch, Plai, Pomelo, Ravensara Wild, Rosalina, Rose Geranium, Rose Otto, Rosemary, Rosewood Natural Blend, Sage Dalmatian, Sandalwood, Savory Winter, Spearmint, Spruce Black, Spruce Hemlock, St Johns Wort, Star Anise, Sugandha Kokila, Sweet Lime, *Tagetes*, Tangerine, Tansy-Blue, Tarragon, Tea Tree, Thyme, Tonka Bean Butter, Turmeric, Turpentine, Ylang Ylang Extra, Vetiver, Wintergreen, Yarrow, Ylang Ylang, or combinations or blends thereof.

In one example, the aromatic essential oil may comprise oil derived from any one or more of: *Mentha Piperita* (peppermint) oil, Menthol oil, *Citrus limon* (lemon) peel oil, *Eucalyptus globulus* leaf oil, *Melaleuca alternifolia* (Tea Tree) leaf oil, *Rosmarinus officinalis* (rosemary) leaf oil, *Lavandula angustifolia* (lavender) oil, *Valeriana officinalis* root oil, *Citrus sinensis* (orange) peel extract oil, *Pelargonium graveolens* oil, *Salvia sclarea* (clary) oil In one example, the source of the inhalable composition such as the fume emitting material may be an aromatic essential oil selected from lavender oil, *eucalyptus* oil, peppermint oil, lemon, menthol, tea tree oil, rosemary oil or medicament oils.

In one embodiment the source of the inhalable composition such as the fume emitting material is a blend of peppermint oil, menthol, lemon, *eucalyptus* oil, tea tree oil and rosemary oil. In an alternative embodiment the fume emitting material is a blend of lavender oil, *eucalyptus* oil, valerian and tea tree oil. In yet a further embodiment, the fume emitting material is a blend of orange, *Pelargonium graveolens* and *Salvia sclarea* oil.

In another embodiment the source of the inhalable composition such as the fume emitting material is a liquid formulation such as an aqueous liquid suspension. In another example, the source of the inhalable composition such as the fume emitting material comprises a semi solid or solid suspension. In another example, the source of the inhalable composition such as the fume emitting material comprises a solid formulation for delivery as an aerosol. A solid formulation may be delivered to a user by inhalation as an aerosol in combination with one or more excipient(s). Suitable excipients are known in the art and include but not limited to sugars, proteins, amino acid. A terpene like menthol or similar compound may also be used to ensure a sustained or controlled delivery of a solid formulation intranasally by inhalation.

In one example, the source of the inhalable composition such as the fume emitting material may be suitable for delivery of the inhalable composition such as in the form of fumes in a continuous manner over time. Alternatively, the source of the inhalable composition such as the fume emitting material may be suitable for delivery of multiple doses of the inhalable composition such as in the form of fumes in a controlled staged manner over a period of time.

In one embodiment, nasal dilator device 1600 may comprise a first and second releasable attachment mechanism 1601a and 1601b, respectively. The first and second releasable attachment mechanism 1601a, 1601b may comprise mating or interlocking components and may be employed to releasably attach the first and second rib members, 1611a and 1611b, respectively, to the U-shaped body 1602, for example to define first and second adjustable looped structures, 1504a, and 1504b, respectively. The first and second releasable attachment mechanisms 1601a, 1601b may allow a user to selectively adjust a degree of dilation or expansion and contraction of the first and second rib members 1504a and 1504b with respect to the U-shaped body 1602.

The first and second releasable attachment mechanisms 1601a, 1601b may comprise respective arms 1606a, 1606b, such as pins, and respective sockets 1608a, 1608b for receiving and/or engaging the respective arms 1606a, 1606b.

The arms 1606a, 1606b may be disposed on and extend from respective first and second leg members 1506a, 1506b toward respective sockets 1608a, 1608b provided on opposite or inner surfaces of the first and second nostril engaging elements 1612a, 1612b. The releasable attachment mechanisms 1601a, 1601b may therefore be arranged to releasably attach or lock the first and second nostril engaging elements 1612a, 1612b to the first and second leg members 1506a, 1506b.

The skilled addressee will recognise that a number of methods can be used to engage the arms 1606a, 1606b to the respective sockets 1608a, 1608b. These include a rack and pinion engagement, a snap-lock or otherwise.

Application of sufficient force by a user to the first and second releasable attachment mechanisms 1601a, 1601b may be effective to move the arms 1606a, 1606b with respect to the sockets 1608a, 1608b and engage the two together and create loops 1504a and 1504b of a suitable size for a particular user.

The particular configuration of the releasable attachment mechanisms 1601a, 1601b allows for self-adjustment of the looped structures, 1504a, and 1504b of the nasal dilator device 1600 whilst the device is in place of the nose of the user. This is particularly useful for increased comfort when the user is resting or asleep. This may be of particular benefit to a user partaking in percussive activities. For example, percussive activities, such as running or cycling, may cause a reduction in mechanical and frictional attachment of the nasal dilator device to a nasal passage of a user, for example, due to motion and/or skin perspiration, causing the device to move from a position intended by the user and therefore requiring readjustment.

The nasal dilator device 1600 may include a series of protrusions 1602 disposed on the nostril engaging members 1612a, 1612b.

The central member 1604 and the first and second leg members 1506a, 1506b of the U-shaped body 1602 include a distal wall member 1605 and mounting elements 1605' that form a recess for attaching or housing an absorbent substrate element 1621 of the fume delivery device 1620. The absorbent substrate element 1621 of the delivery device for providing an inhalable compositional 1620 contains a source of an inhalable composition such as a fume emitting material that is arranged to emit the inhalable composition such as in the form of fumes so that, in use, a user inhales the inhalable composition (e.g., fumes) released from absorbent substrate element 1621 mounted and held by the mounting elements 1605' and the distal wall 1605. The distal wall 1605 is arranged to be external to a user's body in use, abutting the nasal bridge of the user.

The inhalable composition such as in the form of fumes contains at least one of a medicament, a fragrance, an aroma or compound and has been described on detail herein previously.

In one preferred embodiment the absorbent substrate element 1621 of the delivery device 1620 is provided as a wick arranged to hold the fume emitting material and emit fumes for nasal inhalation through evaporation. For example, the wick may comprise a porous plastic or porous fibrous material. In one such example, the wick comprises fibrous material of semi crystalline polymer materials such as PP and nylon. Other suitable fibrous material may include polyester, and organic fibres such as cotton wool.

Where a wick is used, the source material or fume emitting material can be in the form of a fluid, a liquid, a gel or other semi-solid composition, such as those described herein throughout.

In an alternative embodiment the inhalable composition such as in the form of fumes may be arranged to be emitted through ultrasonic diffusion, heat diffusion or using a nebuliser. Where ultrasonic diffusion is used, a vibrating element may be included in the distal wall 1605. Where heat diffusion is used, a heating element may be located in the distal wall 1605. Where a nebuliser is used, a pump or source of pressurised air may be located in the distal wall 1605 to pump fumes out. Preferably, the inhalable compositions such as fumes are emitted from the source material such as a fume emitting material by evaporation.

Where ultrasonic diffusion, heat diffusion or using a nebuliser are used, the source material of the inhalable composition such as fume emitting material can be a liquid, a gel, a semi-solid composition, or a powder.

In an embodiment, delivery device 1620 such as the fume delivery device is arranged to emit the inhalable composition such as in the form of fumes for at least an hour. In an alternative embodiment, the delivery device 1620 is arranged to emit the inhalable composition such as in the form of fumes for at least two hours. In an alternative embodiment, the delivery device 1620 is arranged to emit the inhalable composition such as in the form of fumes for at least three hours. In an alternative embodiment, the delivery device 1620 is arranged to emit the inhalable composition such as in the form of fumes for at least four hours. In an alternative embodiment, the delivery device 1620 is arranged to emit the inhalable composition such as in the form of fumes for at least five hours. In an alternative embodiment, the delivery device 1620 is arranged to emit the inhalable composition such as in the form of fumes for at least six hours. In an alternative embodiment, the delivery device 1620 is arranged to emit the inhalable composition such as in the form of fumes for at least seven hours. In an alternative embodiment, the delivery device 1620 is arranged to emit the inhalable composition such as in the form of fumes for at least eight hours.

In one alternative embodiment, the distal wall 1605 may include a reservoir or receptacle containing a supply of the source material of the inhalable composition such as a fume emitting material for providing additional source material of the inhalable composition (e.g., fume emitting material) to the absorbent substrate element 1621 of the delivery device 1620.

In one embodiment, the delivery device 1620 such as a fume delivery device may be removably mounted on the frame of the nasal device 1600. To this end, the delivery device 1620 may be provided on a removable sub-frame. The removable sub-frame in this embodiment is thus arranged to attach to the U-shaped body 1602 of a nasal device 1600, and particularly to the central portion, external to the nose of the user so that inhalable composition such as in the form of fumes emitted from the delivery device 1620 are directed into at least one nostril.

Inhalable compositions such as fumes are emitted by the delivery device 1620 to the volume surrounding a user's nasal passageways and the user's breathing inhales the inhalable composition such as in the form of fumes in use. Alternatively, the distal wall 1605 encases the delivery device and apertures in the distal wall 1605 limits the release of the inhalable composition such as in the form of fumes from the distal wall. Alternatively, tubes may be attached to the distal wall that extend into the nostrils to minimise loss of the inhalable compositions such as fumes to the environment. The delivery device 1620 may be encased or covered with a film. These films may include foils or plastic films.

A further embodiment of the invention is illustrated in FIG. 18. FIG. 18 show a nasal dilator 1700 with a delivery device 1720 similar to the embodiment of FIGS. 16 and 17.

Nasal dilator device 1700 may comprise a first and second releasable attachment mechanism 1701a and 1701b, respectively. The first and second releasable attachment mechanism 1701a, 1701b may comprise mating or interlocking components and may be employed to releasably attach the first and second rib members, 1711a and 1711b (not shown in the FIG. 18), respectively, to the U-shaped body 1702, to thereby define first and second adjustable looped structures, 1804a, and 1804b, respectively.

The first and second releasable attachment mechanisms 1801a, 1801b may comprise respective arms and respective sockets as disclosed for FIGS. 16 and 17.

The U-shaped body portion 1702 of the nasal device 1700 includes distal housing 1705 including mounting elements 1705' that form a recess for securing an absorbent substrate element 1721 of a delivery device 1720. The absorbent substrate element 1721 contains a source of an inhalable composition such as a fume emitting material that is arranged release the inhalable composition, for example in the form of fumes so that, in use, a user inhales the inhalable composition (e.g., as fumes) released from the distal housing 1705. The distal housing 1705 conforms to the shape of the absorbent substrate element 1721 of the delivery device 1720. The distal housing 1705 is arranged to be external to the user's body in use, abutting the nasal bridge of the user.

In one embodiment, the absorbent substrate element 1721 of the delivery device 1720 is a wick arranged to emit an inhalable composition such as fumes for nasal inhalation through evaporation. In an alternative embodiment, the inhalable composition such as fumes are arranged to emit through ultrasonic diffusion, heat diffusion or using a nebuliser. Where an ultrasonic diffuser is used, a vibrating element may be included in the distal housing 1705. Where heat diffusion is used, a heating element may be provided in the distal housing 1705. Where a nebuliser is used, a pump or source of pressurised air may be provided in the distal wall.

Inhalable compositions e.g., fumes are emitted by the fume delivery device 1720 to the volume surrounding a user's nasal passageways and the user's breathing inhales the inhalable compositions in use. Alternatively, the distal housing 1705 encases a receptacle of the delivery device 1720 for holding the source material such as fume emitting material and apertures in the distal housing 1705 limit the release of the fumes from the receptacle.

A further embodiment of the present invention is illustrated in FIGS. 19 to 23. FIGS. 19 to 23 illustrate a case 1900 for a nasal dilator 1700 having a fume delivery device 1720. Although the case 1900 is illustrated housing the nasal dilator device 1700, the case is also suitable for housing nasal dilator device 1600 or other nasal delivery devices including a number of fume delivery devices.

In the illustrated embodiment, the case 1900 is a clam shell case including cover 1985 and base 1980 pivotally connected together at hinge 1988. Cover 1985 and base 1980 engage together in a snap-locking manner with leaf 1981 on the cover 1985 and complementary protrusion 1983 on the base 1980 engaging in a releasable interlocking manner. The skilled addressee will recognise that the case 1900 could be an alternative type of case, such as a screw lock case, a pressure fit case, a pin locking case or otherwise and still fall within the scope of the current invention.

A clam shell case is to be understood as a hinged cap container. This does not require that the profile of the clam shell case is round or curved.

Insert 1960 sits within the base 1980 and includes a profiled recess 1950 to receive the nasal dilator device 1700. The profiled recess 1950 is shaped to conform to a section of the profile of the nasal dilator device 1700. The profiled recess 1950 includes an aperture to receive a transfer device 1920 through the aperture. The transfer device 1920 serves or operates to transfer the fume emitting material from within a reservoir 1922 located beneath the profiled recess 1950 to the fume delivery device 1720 of the nasal device 1700 held within the recess 1950. In this way, the absorbent substrate element 1721 of the fume delivery device 1720 is able to be charged and/or re-charged with fume emitting material from the reservoir 1922 when the nasal device 1700 is stored in the case 1900.

In an alternative embodiment, the insert 1960 is integrally formed with the base 1980.

In one embodiment, the reservoir 1922 is arranged to hold sufficient fume emitting material to charge the delivery device 1720 at least 10 times. In an alternative embodiment, the reservoir 1922 is arranged to hold sufficient source material of the inhalable composition such as sufficient fume emitting material to charge the delivery device 1920 at least 15 times. In an alternative embodiment the reservoir 1922 is arranged to hold sufficient source material of the inhalable composition such as sufficient fume emitting material to charge the fume delivery device 1720 at least 20 times. In one example the reservoir 1922 is arranged to hold sufficient source material such as fume emitting material to charge the fume deliver device 1720 at least 15 times and this may provide sufficient source material such as fume emitting material for at least 10 continuous uses after 36 months of shelf life storage as result of fume evaporation during the extended storage period prior to use. It is desirable to allow for 10% evaporation per year of the shelf-life of the delivery device.

In one embodiment, the reservoir 1922 may store an amount of the source material of the inhalable composition such as an amount fume emitting material in the range of about 0.5 gram to about 2 gram, preferably about 1 gram.

A retaining wall 1924 extends vertically from the internal base of the base 1980. The reservoir 1922 sits within the retaining wall 1925 and a cap 1926 sits over the reservoir 1922 engaging with the retaining wall 1925. The engagement of the cap 1926 and the retaining wall 1926 seals the reservoir so that unintended release of the inhalable composition such as fumes by evaporation, spilling or otherwise is minimised.

When the nasal dilator 1700 is located in the profiled recess 1950, in one position (seen in FIGS. 21 and 22), the delivery device 1720 engages the transfer device 1920 to draw the source material such as fume emitting material from the reservoir 1922 for later use. Where the transfer device 1920 and delivery device 1720 have been covered with a film or otherwise to minimise loss of the inhalable composition, the films are to be removed first.

In a second position within the profiled recess 1950, however, the nasal dilator 1700 does not provide for engagement of the delivery device 1720 with the transfer device 1920 and thereby prevents transfer of the source material of the inhalable composition such as fume emitting material between the transfer device 1920 and the reservoir 1922 of the source material.

In one embodiment, before the first use there is a film barrier between the transfer device 1920 and the reservoir 1922 of the source material. To access the reservoir, the transfer device 1920 is pushed down to pierce the film barrier and allow the source material to transfer through the transfer device 1920.

In the illustrated embodiment, the transfer device 1920 is configured to transfer the fume emitting material from the reservoir 1922 via capillary action (e.g. a wicking effect) and the reservoir 1922 includes fibrous material in which the source material of the inhalable composition, such as fume emitting material, is stored. To this end, the transfer device 1920 comprises a pin-like member 1921 of fibrous or porous material which extends upwards from the reservoir 1922 for engagement with the absorbent substrate element 1721 in the fume delivery device 1720 of the nasal device 1700. The transfer device 1920 thereby forms a wick for transfer of the source material e.g., fume emitting material. Thus, capillary action causes the source material to transfer from the reservoir 1922 through the transfer device 1920 in the direction of the arrows "A" in FIG. 21 to the delivery device 1720 when the absorbent substrate element 1721 in the delivery device 1720 is sufficiently dry.

In one embodiment, the reservoir 1922 includes fibrous material, for example, of at least 1.7 cubic cm in size, that can store for example up to about 1 gram of a source material such as a liquid or fluid, such as oil e.g., an essential oil.

In one embodiment the fibrous material includes at least 40% or at least 50% or at least 60% or at least 70% or at least 80% pore volume. Preferably, the fibrous material includes at least 40% or at least 50% or at least 60% pore volume. In one example, the fibrous material includes at least 40% pore volume. In another example, the fibrous material includes at least 50% pore volume. In another example, the fibrous material includes at least 60% pore volume. Preferably, the fibrous material includes about 60% pore volume.

In one example, the reservoir material may resemble cotton wool or wadding. Preferably, the fibre material may not be affected by any oil being used in the source material of the inhalable composition such as fume emitting material. Most preferably, the reservoir 1922 includes fibrous material of semi crystalline polymer materials such as PP and nylon. Other suitable fibrous material may include polyester, and organic fibres such as cotton wool.

In one embodiment, the pin-like wick 1921 of the transfer device 1920 is configured so that the capillary sizes in the wick are progressively sized to preferentially facilitate movement of the fume emitting material from the reservoir 1922 to the absorbent substrate 1721 in the delivery device 1720.

In one preferred embodiment, the capillaries are the void spaces in the wick material between the fibres or sintered materials.

In one preferred example, the wick 1921 is a pin-like wick of the transfer device 1920 and may have a volume of 90 mm$^3$. In another preferred example, the open volume in the wick e.g., pin-like wick may be in the order of 50%. According to this example, a single charge of the fume emitting material in the wick may be about 45 mm$^3$. For illustrative purpose only in this example, it would be understood that the total amount of the fume emitting material in the reservoir which may achieve about 15 charges according to this example would be about 675 mm$^3$.

In circumstances where capillary action is unsuitable for transferring the source material such as a fume emitting material, the transfer device 1920 and the delivery device 1720 can be sealed containers with connecting valves. When the nasal dilator 1700 is placed in the profiled recess 1950, the connecting valves may engage such that a transfer of the source material such as the fume emitting material can occur. Transfer can be effected by way of pump, motor, heat or otherwise as understood by the skilled addressee. This type of transfer may be suitable where the delivery device is by way of ultrasonic diffusion, heat diffusion or a nebuliser.

The source material reservoir 1922 can be refilled with source material e.g., fume emitting material, so the case 1900 can be reusable. Where wicks are used, the insert 1960 and cap 1926 can be removable so fume emitting material can be poured into the reservoir 1922. Where sealed containers and valves are used the source material e.g., fume emitting material can be introduced into the reservoir 1922 through the valve in the transfer device 1920.

During assembly, a sealing cap may be placed over the wick 1921 such as a pin-like wick of the transfer device 1920 to protect it and minimise the evaporation of the source material such as a fume emitting material from the reservoir 1922. In one example, the cap may have a connecting piece, e.g., a tether, so it maintains connection to the transfer device 1920 when the cap is removed while the source material is being transferred through the wick. This could allow the user to re-cap the wick 1921 such as a pin-like wick when the transfer device 1920 is not in use throughout the life of delivery device 1720.

With reference to FIGS. 24, 25 and 26 of the drawings, an alternative embodiment of a case 2000 of the invention will now be described. For convenience, the features of the embodiment of the case 2000 shown in FIGS. 24, 25 and 26 that are similar or correspond to features of the embodiment of FIGS. 19 to 23 are referenced with the same or corresponding reference numerals.

FIGS. 24 and 25 illustrate a case 2000 for the nasal dilator 1600 having the delivery device 1620 such as a fume delivery device. Although the case 2000 is illustrated housing the nasal dilator device 1600, it will be appreciated that the case is also suitable for housing the nasal dilator device 1700 or other nasal delivery devices including a number of different delivery devices.

In the illustrated embodiment, the case 2000 is a clam shell case including cover 1985 and base 2080 pivotally connected together at hinge 1988. Cover 1985 and base 2080 are configured to engage together in a snap-locking manner as before, and again comprise a leaf 1981 on the cover 1985 and a complementary protrusion 1983 on the base 1980. The skilled addressee will recognise that the case 2000 could be an alternative type of case, such as a screw lock case, a pressure fit case, a pin locking case or otherwise and still fall within the scope of the current invention.

A clam shell case is to be understood as a hinged cap container. This does not require that the profile of the clam shell case is round or curved.

Insert 2060 sits within the base 2080 and includes a profiled recess 2050 to receive the nasal dilator device 1600. The profiled recess 2050 is shaped to conform to a section of the profile of the nasal dilator device 1600. The profiled recess 2050 includes an aperture to receive a transfer device 2020 through the aperture. As before, the transfer device 2020 serves or operates to transfer a source of the inhalable composition such as a fume emitting material from within reservoir 2022 located beneath the insert 2060 to the delivery device 1620 (such as a fume delivery device) of the nasal device 1600 located within the recess 2050 of the case 2000.

In an alternative embodiment, the insert 2060 is integrally formed with the base 2080.

In one embodiment, the reservoir 2022 is arranged to hold sufficient fume emitting material to charge the fume deliver device 1620 at least 10 times. In an alternative embodiment the reservoir 2022 is arranged to hold sufficient fume emitting material to charge the delivery device 1620 such as a fume delivery device at least 15 times. In an alternative embodiment the reservoir 2022 is arranged to hold sufficient fume emitting material to charge the fume deliver device 1620 at least 20 times.

In one embodiment, the reservoir 2022 may store an amount of fume emitting material in the range of about 0.5 gram to about 2 gram, and preferably stores approximately 1 gram of fume emitting material.

A retaining wall 2024 extends vertically from the internal base of the base 2080. The reservoir 2022 sits within the retaining wall 2024. Capping walls 2061 extend from the insert 2060 towards the base 2080 and sit over the reservoir 2022. The capping walls 2061 serve to enclose the reservoir 2022 and minimise loss of the source material of the inhalable composition such as fume emitting material within the reservoir 2022.

A cap 2055 is arranged to cover the transfer device 2020. With cap 2055 in place over the transfer device 2020, loss of fume emitting material from both the transfer device 2020 and the reservoir 2022 is minimised.

In the illustrated embodiment, the transfer device 2020 comprises a pin-like member 2021 of fibrous or porous material which extends upwards from the reservoir 2022 for engagement with the absorbent substrate element 1621 in the fume delivery device 1620 of the nasal device 1600. The transfer device 2020 thereby forms a wick and the reservoir 2022 includes fibrous material in which the source of eh inhalable composition such as a fume emitting material is stored. In this way, capillary action again causes the source material to transfer from the reservoir 2022 through the transfer device 2020 to the absorbent substrate element 1621 in the delivery device 1620 when the absorbent substrate element 1621 is sufficiently dry.

During assembly, the sealing cap 2055 may be placed over the pin-like wick 2021 to protect it and minimise the evaporation of the fume emitting material from the reservoir 2022. In one example, the cap 2055 may have a connecting piece 2056, e.g., a tether, so it maintains connection to the transfer device 2020 when the cap is removed while the fume emitting material is being refilled in the wick. This could allow the user to recap the pin-like wick when not in use throughout the life of fume delivery device. FIG. 26 illustrates that the case 2000, and particularly the insert 2060, provides a space 2058 in the profiled recess 2050 for receiving the cap 2055 when the pin-like wick member 2021 of the transfer device 2020 is uncovered for re-/charging the absorbent substrate or wick element 1621 of the delivery device 1620.

FIG. 27 illustrates a slightly modified embodiment of the case 2000 in which the fibrous or porous pin-like member 2021 of the transfer device 2020 includes an outer shroud or skirt 2023. That shroud or skirt 2023 surrounds/covers at least a front part of the pin-like wick member 2021 to protect that (re-)charging wick 2021 from damage and/or wear as the cap 2055 is repeatedly placed on it and removed over time. FIG. 28 also illustrates a further slight modification of the embodiment of the case 2000; namely, that the base 2080 includes a footing formed as a raised rib 2082 instead of having a substantially flat bottom as shown in FIGS. 24 to 26.

As exampled herein, it will be understood that the case 2000 allows for the nasal dilator 1600 and/or the delivery device 1620 such as a fume delivery device to be placed in fluid communication with the reservoir 2022 for either recharging the wick 1621 with the source material of the inhalable composition such as a fume emitting material (e.g., when the cap 2055 is not in place and wick is exposed) or just storage (cap 2055 is in place and wick is not exposed).

In one example, this may be achieved by having two positioning places on a middle plate mould for the nasal device 1600 and the fume delivery device 1620 to rest within the profiled recess 2050. For example, in one position (seen in FIG. 25), the nasal device 1600 may positioned be further rearward in the case 2000 such that the delivery device 1620 is spaced from the transfer device 2020. This allows the wick cap 2055 to be placed over the pin-like wick member 2021 and prevents contact between the absorbent substrate element 1621 and the transfer device 2020. For example, in a second position, the cap is removed exposing the wick 2021

(e.g., pin-like wick), and the nasal device 1600 is positioned in the recess 2050 with the wick 1621 in the fume delivery device 1620 coming into contact with the wick 2021 of the transfer device 2020 in the reservoir 2022, such that the fume emitting material may be transferred by capillary action from the reservoir 2022 to the fume delivery device 1620.

FIG. 29 of the drawings shows a partial perspective view of a slightly modified embodiment of the nasal device 1600, 1700, which is illustrated in this view without the absorbent substrate element or wick 1621, 1721 being present within the housing 1605, 1705 or mounting elements 1605', 1705' of the delivery device 1620, 1720. In this slightly modified embodiment, the arms 1606*a*, 1606*b* of the first and second releasable attachment mechanisms 1601*a*, 1601*b* include retention tabs or barbs 1607 to assist the arms 1606*a*, 1606*b* in retaining engagement with the respective sockets 1608*a*, 1608*b*.

Accordingly, as exemplified herein, it would be readily understood that the case 1900, 2000 can have at least two purposes. The first, is to act as a storage or housing device when the nasal device 1600, 1700 and/or delivery device 1620, 1720 (such as fume delivery device) are not in use; and the second is to recharge the delivery device 1620, 1720 with the source material of the inhalable composition such as fume emitting material when the nasal device 1600, 1700 is stored or housed in the case 1900, 2000. Consistent with the above disclosure, it will be also understood that the invention described herein encompasses embodiments where the nasal device and/or delivery device is/are stored in the case without recharging taking place.

The inventions of FIGS. 16 to 18 provide improved nasal dilation, clearance or substance delivery to using a nasal dilator and fume delivery separately. Combining the two together allows a user to inhale desired fumes during normal respiration and during sleep. Having the fume delivery device at a set distance from the nostrils also provides reliable and predictable fume delivery. Having the two together minimises the risks of irritating the nose through accidental placements The invention of FIGS. 19 to 28 provides a storage and recharging solution in a simple assembly that has previously been unavailable.

Exemplary Inhalable Therapeutic Compositions and Nasal Dosage Form Thereof

The inhalable compositions described herein can be comprise therapeutic agents or therapeutically active ingredients (such as a pharmaceutical compound or a drug or a non-pharmaceutical therapeutically active compound such as that contained in fumes or vapours emitted from aromatic oils or compositions comprising mixtures of such pharmaceutical or non-pharmaceutical therapeutically active compounds), delivered or administered to the user by the nasal inhalation route e.g., during respiration of the user, using the device of the invention according to any aspect, embodiment or example described herein to provide therapeutic intervention with reduced adverse effects.

Compositions for inhalation or insufflation include solutions and suspensions in pharmaceutically acceptable, fumes (e.g., gaseous), aqueous or organic solvents, or mixtures thereof, and powders. The liquid or solid compositions may contain suitable pharmaceutically acceptable excipients as set out above. Formulations suitable for inhalation include dry powders or semi-dry powders or aerosolized or vaporized solutions, dispersions, or suspensions capable of being dispensed by an inhaler or nebulizer into the endobronchial or nasal cavity of a subject in need thereof.

The therapeutic agents or actives in the inhalable compositions can be suspended or dissolved in a pharmacologically acceptable inhalation carrier. Examples of such carriers are known in the art and include distilled water, water/ethanol mixtures, and physiological saline solution. Conventional additives including sodium chloride, glucose, citric acid and the like may be employed in these dosage forms to stabilize or to provide isotonic media.

In some embodiments, immediate release of the therapeutic agent or active is through inhalation, such that dissolution occurs in a subject's lungs, as further described herein. Dissolution of less than all of an active includes but is not limited to dissolution of about 50%, 60%, 70%, 80%, 85%, 90%, 95%, 97%, 98%, 99%, 99.1%, 99.2%, 99.35, 99.4%, 99.5%, 99.6%, 99.7%, 99.8% or 99.99% of the active agent. Methods for measuring dissolution profiles are known.

Formulations of pharmaceutical or non-pharmaceutical compositions suitable for inhalations have a particle size for example in the range of 0.001 to 500 microns (including particle sizes in a range between 0.1 and 500 microns in increments microns such as 0.5, 1, 30 microns, 35 microns, etc.), which may be administered by rapid inhalation through the nasal passage to reach the alveolar sacs. Suitable formulations include aqueous or oily solutions of the active ingredients in the formulations.

As used herein the device of the invention can be used to deliver inhalable compositions in bulk or in unit dosage form. The quantity of active ingredient in a unit dose of composition is an effective amount and is varied according to the particular treatment involved. One skilled in the art will appreciate that it is sometimes necessary to make routine variations to the dosage depending on the age and condition of the patient. In a preferred embodiment, the active compound is mixed under sterile conditions with a pharmaceutically acceptable carrier, and with any preservatives, buffers, or propellants that are required.

Agents that that may be included in the inhaled composition include bronchodilators, such as nasally or orally administered bronchodilators, adrenergic agonists such as formoterol, salmeterol, indacaterol, carmoterol and salts thereof, anti-cholinergic agents (e.g., ipratoprium bromide, theophylline compounds or a combination thereof), inhalable anti-cholinergic agents, anticholinergic atropine-like derivatives (such as ipratropium bromide, oxitropium bromide, tiotropium bromide, or glycopyrronium bromide), antimuscarinic M3 inhibitors, or phosphodiesterase 4 (PDE4) inhibitors, oral or nasal steroids, corticosteroids, fluticasone, mucolytic agents (e.g., ambroxol, ergosterin, carbocysteine, iodinated glycerol), antibiotics, antifungals, moisterization by nebulization, anti-tussives, respiratory stimulants (e.g., doxapram, almitrine bismesylate), a-1 antitrypsin, fromoterol, budesonide, and/or fromoterol/budesonide combination therapy.

More specifically, the device of the invention may be used to deliver inhalable therapeutic agents (which may be of pharmaceutical or non-pharmaceutical origin) to the pulmonary system of a subject for the treatment or prevention of pulmonary diseases or disorders such as shortness of breath, asthma, chronic obstructive pulmonary diseases (COPD) cystic fibrosis (CF), tuberculosis, chronic bronchitis, or pneumonia. In certain embodiments, the device may be used to deliver therapeutic agents such as COPD medications, asthma medications, or antibiotics.

In other embodiments, the device of the invention may be used for the systemic delivery of therapeutic agents including small molecules, therapeutic peptides, proteins, antibodies, and other bioengineered molecules via the pulmonary system. By way of non-limiting example, the device may be used to systemically deliver therapeutic agents for the treatment or prevention of indications inducing, e.g., diabetes mellitus, rheumatoid arthritis, plaque psoriasis, Crohn's disease, hormone replacement, neutropenia, nausea, influenza, etc.

By way of non-limiting example, therapeutic peptides, proteins, antibodies, and other bioengineered molecules include: growth factors, insulin, vaccines (Prevnor—Pneumonia, Gardasil—HPV), antibodies (Avastin, Humira, Remicade, Herceptin), Fc Fusion Proteins (Enbrel, Orencia), hormones (Elonva—long acting FSH, Growth Hormone), enzymes (Pulmozyme—rHu-DNAase-), other proteins (Clotting factors, Interleukins, Albumin), gene therapy and RNAi, cell therapy (Provenge—Prostate cancer vaccine), antibody drug conjugates—Adcetris (Brentuximab vedotin for HL), cytokines, anti-infective agents, polynucleotides, oligonucleotides (e.g., gene vectors), or any combination thereof; or solid particles or suspensions such as Flonase (fluticasone propionate) or Advair (fluticasone propionate and salmeterol xinafoate).

In other embodiments, the device of the invention may be used to deliver a solution of nicotine including the water-nicotine azeotrope for the delivery of highly controlled dosages for smoking cessation or a condition requiring medical or veterinary treatment. In addition, the fluid may contain THC, CBD, or other chemicals contained in marijuana for the treatment of seizures and other conditions.

In certain embodiments, the device of the invention may be used to deliver scheduled and controlled substances such as narcotics for the highly controlled dispense of pain medications.

Certain benefits of the pulmonary route for delivery of drugs and other medications include a non-invasive, needle-free delivery system that is suitable for delivery of a wide range of substances from small molecules to very large proteins, reduced level of metabolizing enzymes compared to the GI tract and absorbed molecules do not undergo a first pass effect. Further, medications that are administered orally or intravenously are diluted through the body, while medications given directly into the lungs may provide concentrations at the target site (the lungs) that are about 100 times higher than the same intravenous dose. This is especially important for treatment of drug resistant bacteria, drug resistant tuberculosis for example, and to address drug resistant bacterial infections that are an increasing problem in the ICU.

Another benefit for giving medication directly into the lungs by inhalation through the nose e.g., during respiration of a user using the device of the invention is that high, toxic levels of medications in the blood stream their associated side effects can be minimized. For example intravenous administration of tobramycin leads to very high serum levels that are toxic to the kidneys and therefore limits its use, while administration by inhalation significantly improves pulmonary function without severe side effects to kidney functions.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A nasal dilator device for facilitating or enhancing respiration of a user, comprising:
   (a) a nasal dilator portion comprising
      (i) a substantially U-shaped body including:
   a central portion or member arranged to span a septum of a nose when the device is worn by a user, wherein the central portion or member is located outside the nose when the nasal device is worn by a user, and
   first and second leg members extending from the central portion or member in a first plane (P1); and
      (ii) a first cantilever rib member extending outward from the substantially U-shaped body in a second plane (P2);
      (iii) a second cantilever rib member extending outward from the substantially U-shaped body in a third plane (P3);
   wherein the first and second cantilever rib members extend away from each other;
      (iv) a first intermediate section connecting an end of the first leg member to a proximal end of the first cantilever rib member, wherein the first intermediate section extends between the first plane (P1) and second plane (P2); and
      (v) a second intermediate section connecting an end of the second leg member to a proximal end of the second cantilever rib member, wherein the second intermediate section extends between the first plane (P1) and the third plane (P3);
   wherein the first and second intermediate sections are arranged, in use, to extend along a length of the septum and the first and second cantilever rib members are each arranged, in use, to extend from a floor of a respective nasal passage to an inner wall of a nostril;
   wherein, in use, the first and second leg members, the first and second cantilever rib members, and first and second intermediate sections are fitted fully within the nostrils of the user when the nasal device is worn by the user; and
   (b) a delivery device for providing an inhalable composition for inhalation by the user, the delivery device comprising a holder for a source of the inhalable composition to be received and/or supported on a frame member of the nasal dilator device such that, in use of the nasal dilator device when the dilator nasal device is worn by the user, the source of the inhalable composition is provided in the holder, and is located outside of and adjacent to at least one nostril of the user, wherein the source of the inhalable composition comprises or is configured to emit or diffuse the inhalable composition for inhalation by the user;
   wherein the holder comprises at least one of a receptacle and/or a substrate configured to be filled with the source of the inhalable composition; and
   wherein the holder comprises mounting elements for mounting or attaching the receptacle and/or substrate;
   wherein the frame member is part of the substantially U-shaped body including the central portion or member arranged to span a septum of a nose when worn by the user, and the delivery device is located on the central portion or member external to the nose of the user when the nasal device is in use and is worn by the user, such that the source of the inhalable composition is mounted in the delivery device and extends proximate or adjacent to the septum of the nose of the user and external to the nose;

wherein the delivery device includes a distal wall member and the mounting elements that together form a distal housing comprising a recess for attaching and housing the receptacle and/or the substrate, so that the receptacle and/or substrate is mounted and held in the distal housing by the mounting elements and the distal wall, and wherein the distal wall is arranged to be external to a user's body in use;

wherein the mounting elements and the distal wall together surround the receptacle and/or the substrate and conform to the shape of the receptacle and/or the substrate housed therein; and wherein the mounting elements are not themselves openings or recesses.

2. The nasal dilator device according to claim 1, wherein any one or both of the following occur(s):
(a) wherein the substrate is an absorbent substrate;
(b) wherein the receptacle and/or substrate form(s) a cartridge.

3. The nasal dilator device according to claim 1, wherein mounting elements and the distal wall form a recess for removably receiving and accommodating or housing the receptacle or substrate on in the distal housing or holder.

4. The nasal dilator device according to claim 2, wherein the receptacle and/or substrate form(s) a cartridge, and wherein the cartridge is configured to be re-filled with the source of the inhalable composition and/or wherein the cartridge is a replaceable cartridge of the inhalable composition.

5. The nasal dilator device according to claim 1, wherein the source of the inhalable composition comprises, emits and/or diffuses the inhalable composition, and optionally wherein the source of the inhalable composition comprises a liquid, a gel, a solid, or a semi-solid material that comprises or contains the inhalable composition.

6. The nasal dilator device according claim 1, wherein the frame member is arranged such that the source of the inhalable composition is mounted in the delivery device to extend proximate or adjacent to a septum of the nose of the user and between the nostrils.

7. The nasal dilator device according to claim 1, wherein any one or more of the following occur(s):
(i) the inhalable composition contains at least one of a medicament, a fragrance, oil and/or aromatic oil, optionally wherein the inhalable composition further comprises an excipient, carrier and/or diluent;
(ii) the source of the inhalable composition includes any one or more of: peppermint oil; lavender oil; eucalyptus oil; menthol oil; lemon oil; tea-tree oil; rosemary oil; orange peel oil; valerian oil; clary oil; or *Pelagonium graveolens* oil;
(iii) the source of the inhalable composition comprises a liquid, a gel, or a semi-solid composition that includes a therapeutic compound and/or an aromatic compound, and optionally further comprises an excipient, carrier and/or diluent suitable for inhalation.

8. The nasal dilator device according to claim 1, wherein the delivery device is configured and arranged to emit the inhalable composition in the form of fumes using at least one of: ultrasonic diffusion; heat diffusion; evaporation; evaporative diffusion; and nebulization.

9. The nasal dilator device according to claim 1 wherein one or both of the following occur(s):
(a) wherein, in use, the delivery device is arranged or adapted to clear or enhance clearance of the nostrils of the user, or to alleviate or stop symptoms of nasal congestion or rhinitis in the user;
(b) in use of the device the inhalable composition is adapted to alleviate or clear or stop symptoms of irritated nose, runny nose, blocked nose and/or stuffy nose and/or wherein in use the inhalable composition clears or enhances clearance of blocked or stuffy nose.

10. The nasal dilator device according claim 1, wherein the delivery device comprises a wick, wherein the wick is arranged to receive the source of the inhalable composition.

11. The nasal dilator device according to claim 10, wherein the wick is encased in a cover, and optionally wherein the cover includes one or more apertures arranged to release the inhalable composition in use of the nasal device.

12. The nasal dilator device according to claim 1, arranged to emit the inhalable composition from the source by evaporation; and/or wherein in use the nasal device is arranged to deliver the inhalable composition as fumes to the interior of the nostrils.

13. The nasal dilator device according to claim 1, wherein:
the delivery device is removably or releasably attachable to the nasal device; or
the delivery device is permanently attachable to the nasal device and/or is manufactured integrally with the nasal device.

14. The nasal dilator device according to claim 1, wherein the nasal dilator portion further comprising a first and second releasable attachment mechanism for releasably attaching the distal ends of the first and second cantilever rib members, respectively, to the substantially U-shaped body, or to the first and second leg members respectively, or to the first and second intermediate sections respectively;
wherein the first and second releasable attachment mechanisms each comprise an arm and a socket arranged to receive and engage the arm; and
and wherein the first and second releasable attachment mechanisms are configured to allow a user to selectively adjust a degree of dilation or expansion and contraction of the first and second cantilever rib members with respect to the substantially U-shaped body.

15. The nasal dilator device according to claim 1:
wherein the first and second leg members are inclined towards each other such that a greater distance is provided between the first and second leg members towards the central portion or member to accommodate a columella of a nose when the nasal dilator device is worn by the user; and
wherein the first and second intermediate sections are arcuate intermediate sections, each having a curvature along its length; and
wherein the first and second intermediate sections are inclined away from one another to assist in urging the respective first and second cantilever rib members against inner walls of respective nostrils when the nasal dilator device is worn by the user; and
wherein the first and second cantilever rib members exert an outward force on the inner wall of the nostrils and on the floor of the nose, to thereby dilate the nasal passage of the nose, when the nasal dilator device is donned by the user.

16. A nasal dilator device for facilitating or enhancing respiration of a user, comprising:
(a) a nasal dilator portion comprising
a substantially U-shaped body including: a central portion or member arranged to span a septum of a nose when worn by a user, and first and second leg members extending from the central portion in a first plane (P1);

a first cantilever rib member extending outward or laterally from the substantially U-shaped body in a second plane (P2), wherein the first cantilever rib member is curved or arcuate along its length and extends to a distal end in the second plane;

a second cantilever rib member extending outward or laterally from the substantially U-shaped body in a third plane, wherein the second cantilever rib member is curved or arcuate along its length and extends to a distal end in the third plane (P3);

a first intermediate section connecting an end of the first leg member to a proximal end of the first cantilever rib member, wherein the first intermediate section extends between the first plane (P1) and second plane (P2); and a second intermediate section connecting an end of the second leg member to a proximal end of the second cantilever rib member, wherein the second intermediate section extends between the first plane (P1) and the third plane (P3);

wherein the first and second cantilever rib members extend away from each other at their proximal ends, and wherein the first and second cantilever rib members extend towards each other at their distal ends; and wherein, in use, the first and second leg members, the first and second cantilever rib members, and first and second intermediate sections are fitted fully within the nostrils of the user when the nasal device is worn by the user; and (b) a delivery device for providing an inhalable composition for inhalation by the user, the delivery device comprising a holder for a source of the inhalable composition to be received and/or supported on a frame member of the nasal dilator device such that, in use of the nasal dilator device when the dilator nasal device is worn by the user, the source of the inhalable composition, is provided in the holder, and is located outside of and adjacent to at least one nostril of the user, wherein the source of the inhalable composition comprises or is configured to emit or diffuse the inhalable composition for inhalation by the user;

wherein the holder comprises at least one of a receptacle and/or a substrate configured to be filled with the source of the inhalable composition; and wherein the holder comprises mounting elements for mounting or attaching the receptacle and/or substrate;

wherein the frame member is part of the substantially U-shaped body including the central portion or member arranged to span a septum of a nose when worn by the user, and the delivery device is located on the central portion or member external to the nose of the user when the nasal device is in use and is worn by the user, such that the source of the inhalable composition is mounted in the delivery device and extends proximate or adjacent to the septum of the nose of the user and external to the nose;

wherein the delivery device includes a distal wall member and the mounting elements that together form a distal housing comprising a recess for attaching and housing the receptacle and/or the substrate, so that the receptacle and/or substrate is mounted and held in the distal housing by the mounting elements and the distal wall, and wherein the distal wall is arranged to be external to a user's body in use;

wherein the mounting elements and the distal wall together surround the receptacle and/or the substrate and conform to the shape of the receptacle and/or the substrate housed therein; and wherein the mounting elements are not themselves openings or recesses.

17. The nasal dilator device according to claim 16, wherein the first cantilever rib member extending laterally outward from the substantially U-shaped in the second plane, and the second cantilever rib member extending laterally outward from the substantially U-shaped body in the third plane.

18. The nasal dilator device according to claim 16, wherein any one or more of the following occur(s) in the nasal dilator portion:

(a) wherein the first and second cantilever rib members exhibit an elongate arched profile which approximates at least a portion of one of a circle, ellipse or parabola such that the first and second cantilever rib members extend towards each other at their distal ends;

(b) wherein the first and second leg members are inclined towards each other such that a greater distance is provided between the first and second leg members towards the central portion or member to accommodate a columella of a nose when the nasal dilator device is worn by the user;

(c) wherein the first and second intermediate sections are inclined away from one another to assist in urging the respective first and second cantilever rib members against inner walls of respective nostrils when the nasal dilator device is worn by the user;

(d) wherein the first and second intermediate portions extend obtusely from the ends of the first and second leg members.

19. The nasal dilator device according to claim 16, wherein any one or more of the following occur(s) in the nasal dilator portion:

(a) wherein the first and second intermediate sections are arcuate intermediate sections, each having a curvature along its length;

(b) wherein the first and second intermediate sections are arranged, in use, to extend along a length of the septum and the first and second cantilever rib members are each arranged, in use, to extend from a floor of a respective nasal orifice to follow around an inner wall of the respective nostrils;

(c) wherein the first and second cantilever rib members exert an outward force on the inner wall of the nostrils and on the floor of the nose, to thereby dilate the nasal passage of the nose, when the nasal dilator device is donned by the user.

* * * * *